(12) United States Patent
Park et al.

(10) Patent No.: US 9,880,327 B2
(45) Date of Patent: Jan. 30, 2018

(54) CAMERA MODULE INCLUDING LIQUID LENS, OPTICAL DEVICE INCLUDING THE SAME, AND METHOD OF MANUFACTURING CAMERA MODULE INCLUDING LIQUID LENS

(71) Applicant: LG Innotek Co., Ltd., Seoul (KR)

(72) Inventors: Seung Ryong Park, Seoul (KR); Jung Shik Baik, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 15/651,838

(22) Filed: Jul. 17, 2017

(65) Prior Publication Data

US 2017/0315274 A1 Nov. 2, 2017

Related U.S. Application Data

(63) Continuation of application No. PCT/KR2017/004615, filed on Apr. 28, 2017.

(30) Foreign Application Priority Data

Apr. 29, 2016 (KR) .................. 10-2016-0052778
May 9, 2016 (KR) .................. 10-2016-0056227
(Continued)

(51) Int. Cl.
*H04N 5/225* (2006.01)
*G02B 3/14* (2006.01)
(Continued)

(52) U.S. Cl.
CPC ............ *G02B 3/14* (2013.01); *G02B 26/004* (2013.01); *G03B 13/36* (2013.01); *H04N 5/2253* (2013.01);
(Continued)

(58) Field of Classification Search
CPC .................................. G02B 3/12; G02B 3/14
See application file for complete search history.

(56) References Cited

U.S. PATENT DOCUMENTS 7,573,646 B2    8/2009    Craen et al.
8,260,129 B2    9/2012    Craen et al.
(Continued)

FOREIGN PATENT DOCUMENTS

EP          1884805 A1    2/2008
JP    2008-046597 A    2/2008
(Continued)

OTHER PUBLICATIONS

Office Action dated Jul. 20, 2017 in Korean Application No. 10-2017-0013046.
(Continued)

*Primary Examiner* — Twyler Haskins
*Assistant Examiner* — Dwight C Tejano
(74) *Attorney, Agent, or Firm* — Saliwanchik, Lloyd & Eisenschenk

(57) ABSTRACT

An embodiment of a camera module includes a holder configured such that the upper and lower portions of the holder are open and such that a first hole and a second hole, opposite to the first hole, are formed in the side surface of the holder, a first lens unit coupled to the upper portion of the holder, a second lens unit coupled to the lower portion of the holder, and a liquid lens disposed in the first hole and the second hole of the holder between the first lens unit and the second lens unit, the liquid lens protruding outward from the side surface of the holder, wherein at least a portion of the liquid lens may be spaced apart from the inner surface of the holder.

19 Claims, 39 Drawing Sheets

(30) Foreign Application Priority Data

Sep. 5, 2016 (KR) .......................... 10-2016-0114133
Jan. 26, 2017 (KR) .......................... 10-2017-0013046

(51) Int. Cl.
*H04N 5/232* (2006.01)
*G02B 26/00* (2006.01)
*G03B 13/36* (2006.01)

(52) U.S. Cl.
CPC ....... *H04N 5/2254* (2013.01); *H04N 5/23216* (2013.01); *H04N 5/23287* (2013.01); *H04N 5/23293* (2013.01); *G02B 2207/121* (2013.01)

(56) References Cited

U.S. PATENT DOCUMENTS

| | | | | |
|---|---|---|---|---|
| 2001/0017985 A1* | 8/2001 | Tsuboi | ...................... | G02B 3/14 396/506 |
| 2004/0227838 A1* | 11/2004 | Atarashi | ................... | G02B 3/14 348/340 |
| 2005/0113912 A1* | 5/2005 | Feenstra | ............... | A61B 1/0019 623/6.13 |
| 2006/0028734 A1* | 2/2006 | Kuiper | ..................... | G02B 3/14 359/676 |
| 2006/0164539 A1* | 7/2006 | Van Arendonk | ......... | G02B 7/02 348/340 |
| 2008/0037973 A1* | 2/2008 | Jung | ....................... | G03B 13/32 396/89 |
| 2008/0304160 A1* | 12/2008 | Hendriks | .................. | G02B 3/14 359/666 |
| 2009/0116359 A1* | 5/2009 | Hendriks | .................. | G02B 3/14 369/94 |
| 2009/0190232 A1 | 7/2009 | Craen et al. | | |
| 2011/0176221 A1* | 7/2011 | Tanaka | ................... | G02B 1/041 359/666 |
| 2012/0038815 A1* | 2/2012 | Kato | ....................... | F03G 7/005 348/340 |
| 2012/0113525 A1 | 5/2012 | Kong et al. | | |
| 2014/0036218 A1 | 2/2014 | Yu | | |

FOREIGN PATENT DOCUMENTS

| | | |
|---|---|---|
| KR | 10-2006-0129322 A | 12/2006 |
| KR | 10-2008-0014274 A | 2/2008 |
| KR | 10-0843473 B1 | 7/2008 |
| KR | 10-2010-0109729 A | 10/2010 |
| KR | 10-2013-0013704 A | 2/2013 |

OTHER PUBLICATIONS

International Search Report in International Application No. PCT/KR2017/004615, filed Apr. 28, 2017.

\* cited by examiner

CAMERA MODULE INCLUDING LIQUID LENS, OPTICAL DEVICE INCLUDING THE SAME, AND METHOD OF MANUFACTURING CAMERA MODULE INCLUDING LIQUID LENS

CROSS-REFERENCE TO RELATED APPLICATIONS

This application is a continuation of International Patent Application No. PCT/KR2017/004615, filed Apr. 28, 2017, which claims priority to Korean Application Nos. 10-2016-0052778, filed Apr. 29, 2016; 10-2016-0056227, filed May 9, 2016; 10-2016-0114133, filed Sep. 5, 2016; and 10-2017-0013046, filed Jan. 26, 2017, the disclosures of each of which are incorporated herein by reference in their entirety.

TECHNICAL FIELD

Embodiments relate to a camera module, and more particularly to a camera module including a liquid lens and an optical device including the same.

BACKGROUND ART

People who use portable devices demand optical devices that have high resolution, are small, and have various photographing functions (an auto-focusing (AF) function, a handshake compensation or optical image stabilization (OIS) function, etc.). Such photographing functions may be realized by directly moving a plurality of lenses that are combined. In the case in which the number of lenses is increased, however, the size of the optical devices may be increased.

The auto-focusing and handshake compensation functions are performed by tilting or moving a lens module including a plurality of lenses, which is fixed to a lens holder in the state in which the optical axes of the lens are aligned, along the optical axis or in the direction perpendicular to the optical axis. An additional lens moving apparatus is used to move the lens module. However, the lens moving apparatus has high power consumption, driving members, such as a magnet and a coil, are required to move the lens module, and available space for moving the lens module is needed in amount corresponding to the range in which the lens module is to be moved. As a result, the thickness of a camera module and an optical device is increased.

Therefore, research has been conducted on a liquid lens configured such that the curvature of the interface between two kinds of liquids is electrically adjusted to perform the auto-focusing and handshake compensation functions.

DISCLOSURE

Technical Problem

Embodiments provide a lens having a simple structure and a camera module including the same.

In addition, embodiments provide a lens assembly having a miniaturized structure and a camera module including the same.

In addition, embodiments provide a lens module configured such that a liquid lens is located in the middle of the lens module so as to reduce the size of the module and such that lenses are simultaneously aligned using a single core and a method of manufacturing the lens module.

In addition, embodiments provide a liquid lens configured such that when lenses are inserted, the physical interference between neighboring lenses is minimized and a lens module including the same.

In addition, embodiments provide a camera module and an optical device including a liquid lens and a lens module.

In addition, embodiments provide a camera module and an optical device including a liquid lens, wherein the liquid lens is stably disposed in a lens assembly.

In addition, embodiments provide a camera module and an optical device including a liquid lens, wherein the performance of optical lenses other than the liquid lens is easily evaluated.

It should be noted that the objects of the disclosure are not limited to the objects mentioned above, and other unmentioned objects of the disclosure will be clearly understood by those skilled in the art to which the disclosure pertains from the following description.

Technical Solution

An embodiment of a lens may include a core having therein a hollow, an electrode layer disposed on the core, an upper glass coupled to the upper side of the core, a lower glass coupled to the lower side of the core, and a liquid lens unit disposed in the hollow in the core, wherein the electrode layer may be disposed on the upper surface and the lower surface of the core, and the lens may include a through-hole for connecting the electrode layer disposed on the upper surface of the core and the electrode layer disposed on the lower surface of the core to each other.

The electrode layer may extend to the hollow in the core.

The core may include a pattern unit having a plurality of terminals.

The liquid lens unit may include a first liquid layer, which is made of a conductive liquid and is connected to the electrode layer, and a second liquid layer, which is made of a nonconductive liquid and is disposed so as to abut the first liquid layer.

An embodiment of a lens may further include an insulation layer disposed between the electrode layer and the second liquid layer.

The electrode layer may be deposited on the upper surface and the lower surface of the core, the surface of the hollow, and the surface of the through-hole.

The pattern unit may be formed on the deposited electrode layer.

The pattern unit may be configured such that terminals are separated from each other, and at least one of the terminals may be connected to the electrode layer deposited on the upper surface of the core and the through-hole.

The pattern unit may include a first pattern unit coupled to the lower glass and a second pattern unit exposed from the lower glass.

The second pattern unit may be configured to be exposed at one side of the lower glass.

The second pattern unit may be an external printed circuit board.

Each of the terminals may include the electrode layer formed on the upper surface of the core and a first terminal connected to the electrode layer formed in the through-hole.

An embodiment of a lens may include a core on which an electrode layer is disposed, an upper glass coupled to the upper side of the core, a lower glass coupled to the lower side of the core, a liquid lens unit disposed in a hollow formed in the core, and an insulation layer disposed between the electrode layer and the liquid lens unit, wherein the core may include a through-hole, on the surface of which the electrode layer is disposed, connected to the electrode layer disposed on the upper surface of the core, and a pattern unit formed on the lower surface of the core, the pattern unit being configured such that terminals are separated from each other.

An embodiment of a camera module may include the lens and an image sensor provided so as to be opposite to the lens in the optical-axis direction.

An embodiment of a lens assembly may include a base having therein a through-hole, a first lens unit disposed in the through-hole, a second lens unit disposed in the through-hole so as to be spaced apart from the first lens unit, and a liquid lens unit disposed between the first lens unit and the second lens unit, wherein the base may include an insertion hole, through which the liquid lens unit is inserted.

An embodiment of a lens assembly may further include a printed circuit board connected to the liquid lens unit, at least a portion of the printed circuit board being inserted through the insertion hole.

An embodiment of a lens assembly may further include a cover member for receiving the base and the printed circuit board.

The first lens unit may include an exposure lens exposed outside the base, and the exposure lens may be made of a glass material.

The exposure lens may have a diamond like carbon (DLC) coating layer formed on the exposed portion thereof.

The first lens unit, the second lens unit, and the liquid lens unit may be disposed so as to be opposite to each other in the optical-axis direction The liquid lens unit may be provided with a hollow, which is filled with liquid and through which the light that has passed through the first lens unit is transmitted.

The area of the hollow in the optical-axis direction may be less than the area of the lens constituting the first lens unit or the second lens unit in the optical-axis direction.

The area of the hollow in the optical-axis direction may gradually decrease from the first lens unit to the second lens unit.

Another embodiment of a lens assembly may include a first lens unit disposed at the front thereof, a second lens unit disposed at the rear of the first lens unit, a liquid lens unit disposed between the first lens unit and the second lens unit, a base, in which the first lens unit, the second lens unit 1200, and the liquid lens unit are mounted, the base being provided in the edge thereof with an insertion hole, through which the liquid lens unit is inserted, a printed circuit board connected to the liquid lens unit, one end of the printed circuit board being inserted through the insertion hole, and a cover member for receiving the base and the printed circuit board, wherein the first lens unit may include an exposure lens exposed outside the base, and at least a portion of the exposure lens may be made of a glass material.

An embodiment of a camera module may include the lens assembly and an image sensor provided so as to be opposite to the lens assembly in the optical-axis direction.

An embodiment of a liquid lens may include a core plate having therein a cavity for receiving a conductive liquid and a nonconductive liquid, an electrode unit coated on the surface of the core plate, an insulation unit coated on the electrode unit along the inner surface of the cavity, an upper plate coupled to the core plate at the upper side of the core plate, the upper plate having at least one recess, through which a portion of the upper surface of the core plate is exposed, a lower plate coupled to the core plate at the lower side of the core plate, the lower plate having at least one recess, through which a portion of the lower surface of the core plate is exposed, an upper board located at the upper side of the upper plate, and a lower board located at the lower side of the lower plate, wherein the upper board and the electrode unit may be connected to each other via an upper conductive portion disposed in the recess formed in the upper plate, and the lower board and the electrode unit may be connected to each other via a lower conductive portion disposed in the recess formed in the lower plate.

The recesses formed in the upper plate and the recesses formed in the lower plate may be formed at positions corresponding to the corners of the core plate.

The recesses formed in the upper plate may be formed in the sides of the upper plate, and the recesses formed in the lower plate may be formed in the sides of the lower plate.

The corners of the upper board and the lower board may be located further inward than the corners of the core plate.

The sides of the upper board and the lower board may be located further inward than the sides of the core plate.

The number of recesses formed in the upper plate may be four, and the number of recesses formed in the lower plate may be four.

The recesses may be holes.

The recesses formed in the upper plate may be holes formed through the upper plate, and the recesses formed in the lower plate may be holes formed through the lower plate.

The upper board may be provided at the portion thereof corresponding to the cavity with an upper guide hole extending to one side.

An embodiment of a camera module may include a lens holder having a hole formed therethrough in the upward-downward direction, a liquid lens received in the hole, a first lens unit received in the hole, the first lens unit being disposed on the liquid lens, a second lens unit received in the hole, the second lens unit being disposed under the liquid lens, and an insertion hole formed through a portion of the side surface of the lens holder such that the liquid lens is inserted through the insertion hole, wherein the liquid lens may include a core plate having therein a cavity for receiving a conductive liquid and a nonconductive liquid, an electrode unit coated on the surface of the core plate, an insulation unit coated on the electrode unit along the inner surface of the cavity, an upper plate coupled to the core plate at the upper side of the core plate, the upper plate having at least one recess, through which a portion of the upper surface of the core plate is exposed, a lower plate coupled to the core plate at the lower side of the core plate, the lower plate having at least one recess, through which a portion of the lower surface of the core plate is exposed, an upper board located at the upper side of the upper plate, and a lower board located at the lower side of the lower plate, and wherein the upper board and the electrode unit may be connected to each other via an upper conductive portion disposed in the recess formed in the upper plate, and the lower board and the electrode unit may be connected to each other via a lower conductive portion disposed in the recess formed in the lower plate.

The insertion hole may be formed in the direction perpendicular to the optical-axis direction.

The upper board may be provided at the portion thereof corresponding to the first lens unit with an upper guide hole extending to one side.

An inclined portion may be located along the outer circumference of the lower surface of the lowermost lens of the first lens unit.

The inclined portion may be formed so as to be inwardly inclined downward.

An embodiment of a method of manufacturing a lens module may include a first step of molding a lens holder having a hole formed in the optical-axis direction and an insertion hole formed by opening a portion of the side surface thereof in the direction perpendicular to the optical axis, a second step of inserting a first lens unit into the upper side of the hole in the optical-axis direction, a third step of inserting a liquid lens through the insertion hole such that the liquid lens is located at the lower side of the first lens unit in the hole, and a fourth step of inserting a second lens unit into the lower side of the hole in the optical-axis direction.

An embodiment of a camera module may include a lens holder having a hole formed therethrough in the upward-downward direction, a liquid lens received in the hole, a first lens unit received in the hole, the first lens unit being disposed on the liquid lens, a second lens unit received in the hole, the second lens unit being disposed under the liquid lens, and a main board having an image sensor mounted thereon, the lens holder having an insertion hole formed by opening a portion of the side surface thereof such that the liquid lens is inserted through the insertion hole, wherein the liquid lens may include a core plate having therein a cavity for receiving a conductive liquid and a nonconductive liquid, an electrode unit coated on the surface of the core plate, an insulation unit coated on the electrode unit along the inner surface of the cavity, an upper plate coupled to the core plate at the upper side of the core plate, the upper plate having at least one recess, through which a portion of the upper surface of the core plate is exposed, a lower plate coupled to the core plate at the lower side of the core plate, the lower plate having at least one recess, through which a portion of the lower surface of the core plate is exposed, an upper board located at the upper side of the upper plate, and a lower board located at the lower side of the lower plate, and wherein the upper board and the electrode unit may be connected to each other via an upper conductive portion disposed in the recess formed in the upper plate, and the lower board and the electrode unit may be connected to each other via a lower conductive portion disposed in the recess formed in the lower plate.

The liquid lens may further include an upper connection board for connecting the upper board to the main board and a lower connection board for connecting the lower board to the main board.

The liquid lens may further include an upper and lower connection board for connecting the upper board and the lower board to each other and a lower connection board for connecting the lower board to the main board.

An embodiment may provide a camera module including a holder configured such that the upper and lower portions of the holder are open and such that a first hole and a second hole, opposite to the first hole, are formed in the side surface of the holder, a first lens unit coupled to the upper portion of the holder, a second lens unit coupled to the lower portion of the holder, and a liquid lens disposed in the first hole and the second hole of the holder between the first lens unit and the second lens unit, the liquid lens protruding outward from the side surface of the holder, wherein at least a portion of the liquid lens may be spaced apart from the inner surface of the holder.

The holder may be provided therein with a through-hole for connecting the first hole and the second hole to each other, and the through-hole may be provided therein with a first region, in which the first lens unit is disposed, a second region, in which the liquid lens is disposed, and a third region, in which the second lens unit is disposed.

The camera module may further include a cover for covering a portion of the side surface of the holder and a portion of the upper surface of the holder, wherein the cover may cover the first hole and the second hole.

The horizontal length of the second region may be greater than the horizontal length of the first region and the horizontal length of the third region.

The liquid lens may include a first plate having therein a cavity for receiving a first conductive liquid and a second nonconductive liquid, a first electrode disposed on the first plate, a second electrode disposed under the first plate, a second plate disposed on the first electrode, and a third plate disposed under the second electrode.

The second plate and the third plate may be bonded to the holder using epoxy.

At least one of the second plate and the third plate may be spaced apart from the inner surface of the holder.

The horizontal length of the first lens unit in the region adjacent to the liquid lens may be greater than the horizontal length of the cavity in the region adjacent to the first lens unit.

The horizontal length of the second lens unit in the region adjacent to the liquid lens may be greater than the horizontal length of the cavity in the region adjacent to the second lens unit.

The first lens unit may include a plurality of lenses, and the holder may have a stair structure at the inner wall of the first region, wherein the edges of the lenses contact the stair structure.

The second lens unit may include a plurality of lenses, and the holder may have a stair structure at the inner wall of the third region, wherein the edges of the lenses contact the stair structure.

Another embodiment may provide an optical device including a camera module including a holder configured such that the upper and lower portions of the holder are open and such that a first hole and a second hole, opposite to the first hole, are formed in the side surface of the holder, a first lens unit coupled to the upper portion of the holder, a second lens unit coupled to the lower portion of the holder, and a liquid lens disposed in the first hole and the second hole of the holder between the first lens unit and the second lens unit, the liquid lens protruding outward from the side surface of the holder, wherein at least a portion of the liquid lens is spaced apart from the inner surface of the holder, a controller for converting an image incident through the camera module into an electrical signal, and a display module comprising a plurality of pixels, the colors of which are changed by the electrical signal.

A further embodiment may provide a method of manufacturing a lens module including a liquid lens, the method including a first step of preparing a holder configured such that the upper and lower portions of the holder are open and such that a first hole and a second hole, opposite to the first hole, are formed in the side surface of the holder, a second step of coupling a first lens unit to the upper portion of the holder, a third step of coupling a second lens unit to the lower portion of the holder, and a fourth step of inserting a liquid lens into a gap between the first lens unit and the second lens unit, wherein the liquid lens may protrude further outward than the side surface of the holder.

The method may further include a step of supporting the side surface of the liquid lens disposed so as to protrude further outward than the side surface of the holder to adjust the position of the liquid lens and a step of bonding the liquid lens to the holder.

Advantageous Effects

In embodiments, the deposition layer formed on the upper surface and the lower surface of the core may be connected to an external power supply via the pattern unit formed on the lower surface of the core. Consequently, the lens may have a structure that is simpler than the structure in which the deposition layer formed on the upper surface and the lower surface of the core is connected to the external power supply.

In addition, since the lens has a simple structure, the structure of the lens and the camera module including the same may be simplified and miniaturized. As a result, the time, effort, and cost required to manufacture the lens and the camera module including the same may be reduced.

In addition, the use of an additional cover glass to protect the exposed portion of the lens assembly, i.e. the exposure lens, may be obviated. Consequently, the size of a space in which the lens assembly and the camera module including the same are mounted may be reduced, with the result that the size of a device in which the lens assembly and the camera module are mounted may be effectively reduced.

In addition, the liquid lens unit may be mounted in the base through the insertion hole, whereby the lens assembly may be easily assembled.

In addition, the focus of the liquid lens unit mounted in the base through the insertion hole may be easily aligned with the focus of the first lens unit in the optical-axis direction.

In addition, the lenses of the lens module may be aligned using a single core, whereby optical-axis twisting or optical-axis deviation may be prevented.

In addition, the liquid lens may be inserted into the middle of the lens module, whereby the lens module may have a compact structure.

In addition, no friction may occur between neighboring lenses when the liquid lens is inserted, whereby wear of the liquid lens may be prevented. As a result, the defect rate of the lens module may be reduced.

In addition, in the camera module including the liquid lens according to the embodiment, the interface between the first and second liquids may be changed using electricity, whereby the size of the camera device may be reduced. Furthermore, AF or OIS may be performed using electricity, whereby power consumption may be reduced and the size of the camera device may be smaller than in the case in which the lenses are mechanically moved.

In addition, the liquid lens may be inserted into the holder, whereby the liquid lens may be stably disposed.

In addition, the liquid lens may be inserted after the optical performance of the first and second lens units is evaluated in the state in which the first lens unit and the second lens unit are disposed in the holder.

BEST MODE

Figure 1:
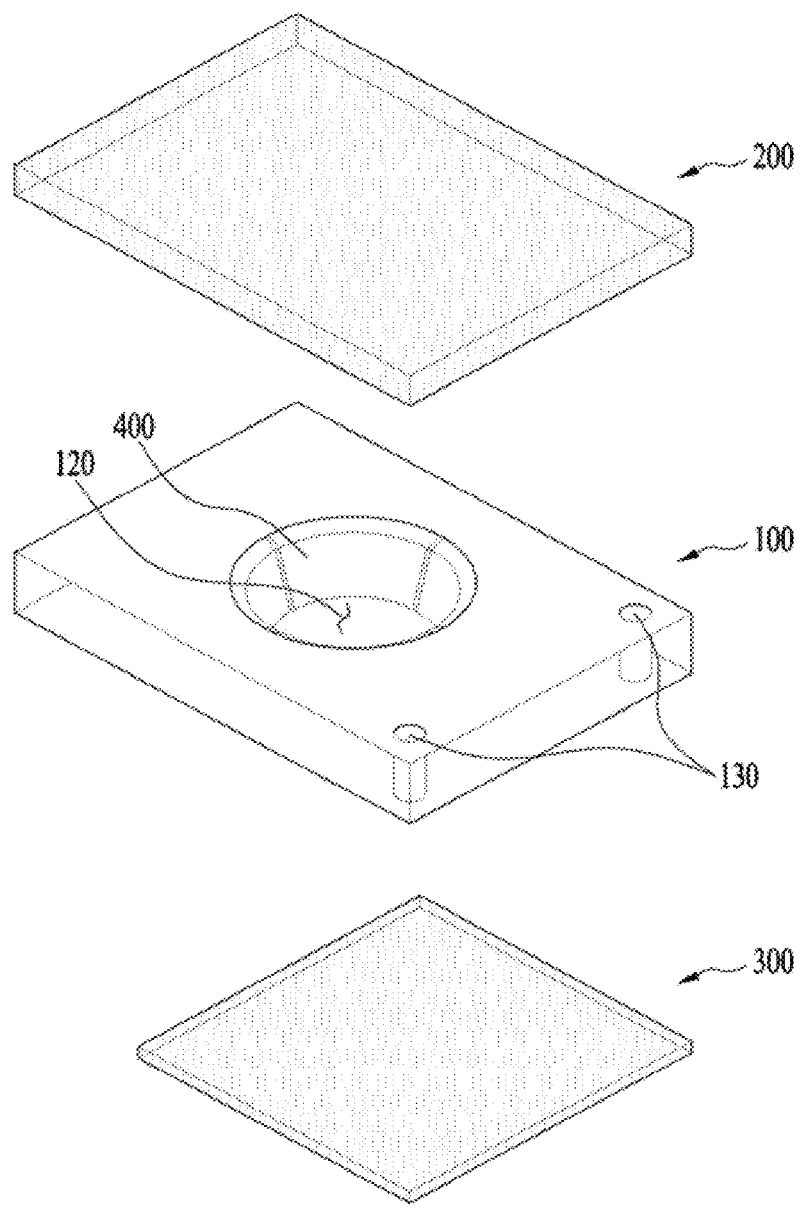
FIG. 1 is an exploded perspective view showing a lens according to an embodiment.

A camera module according to an embodiment may include a holder including a first side surface having a first hole and a second side surface having a second hole facing the first hole, a first lens unit disposed in the holder, a second lens unit disposed in the holder, and a liquid lens disposed between the first lens unit and the second lens unit, at least a portion of the liquid lens being disposed in the first hole and the second hole in the holder, wherein the thickness of the liquid lens may be less than the size of the first hole in the holder in the optical-axis direction.

Mode for Invention

Reference will now be made in detail to the preferred embodiments, examples of which are illustrated in the accompanying drawings. While the disclosure is susceptible to various modifications and alternative forms, specific embodiments thereof are shown by way of example in the drawings. However, the disclosure should not be construed as limited to the embodiments set forth herein, but on the contrary, the disclosure is to cover all modifications, equivalents, and alternatives falling within the spirit and scope of the embodiments.

It may be understood that, although the terms "first," "second," etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under," "under the element" as well as "on the element" may be included based on the element.

In addition, relational terms, such as "on/upper part/above" and "under/lower part/below," are used only to distinguish between one subject or element and another subject or element without necessarily requiring or involving any physical or logical relationship or sequence between such subjects or elements.

The term "optical-axis direction" used herein is defined as the optical-axis direction of a lens module of a camera module. Meanwhile, the "optical-axis direction" may also be referred to as an upward-downward direction or a z-axis direction.

The term "auto focus" used herein is defined as a function of changing the curvature of the interface of a liquid lens to focus a subject. Herein, the term "auto focus" may be used interchangeably with "AF."

The term "handshake compensation" used herein is defined as a function of changing the curvature of the interface of the liquid lens to offset the vibration (the movement) of an image sensor due to external force. Herein, the term "handshake compensation" may be used interchangeably with "optical image stabilization (OIS)."

Figure 2:
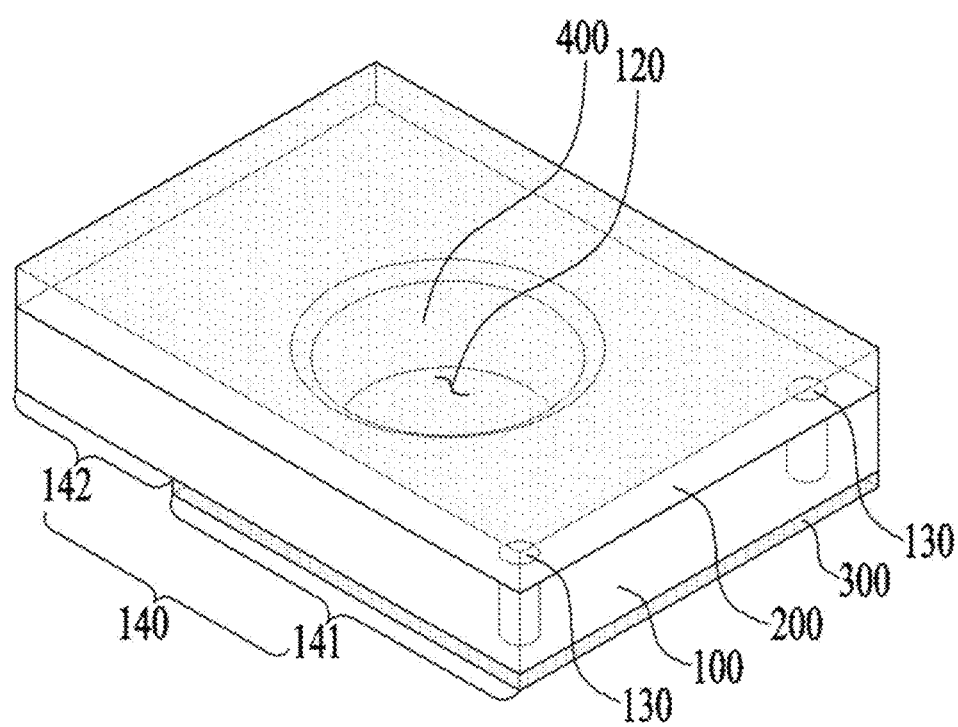
FIG. 2 is a perspective view showing the lens according to the embodiment.

FIG. 1 is an exploded perspective view showing a lens according to an embodiment. FIG. 2 is a perspective view showing the lens according to the embodiment. The lens according to the embodiment may include a core 100, an upper glass 200, a lower glass 300, a liquid lens unit 400, and a insulation layer 500.

The upper glass 200 may be coupled to the upper side of the core 100 to protect the core 100. In addition, the upper glass 200 may prevent the leakage of the liquid from the liquid lens unit 400, provided in the core 100.

The lower glass 300 may be coupled to the lower side of the core 100 to protect the core 100. In addition, the lower glass 300 may prevent the leakage of the liquid from the liquid lens unit 400, provided in the core 100, together with the upper glass 200.

The upper glass 200 and the lower glass 300 may be made of a transparent solid material. For example, the upper glass 200 and the lower glass 300 may be made of a transparent glass or plastic material. Light may be incident on the upper glass 200, may pass through the core 100 and the lower glass 300, and may be incident on an image sensor (not shown). In addition, light may be incident on the lower glass 300, may pass through the core 100 and the upper glass 200, and may be incident on the image sensor (not shown).

At least some of the liquid in the liquid lens unit 400 may be provided in a hollow 120 formed in the core 100 in the optical-axis direction. For example, the liquid may include a plurality of liquids that are not mixed with each other. The shape or curvature of the interface between the respective liquids may be changed such that a camera module including the lens performs auto focusing and handshake compensation. The structure of the liquid lens will be described below in detail with reference to the drawings.

The core 100 may be disposed between the upper glass 200 and the lower glass 300, and may include an electrode layer 110, a hollow 120, through-holes 130, and a pattern unit 140.

The electrode layer 110 may be disposed on the core 100, may be deposited on the core 100 in the shape of a thin film, and may be made of a conductive material. The electrode layer 110 may be disposed on the core 100 using chemical vapor deposition, plasma vacuum deposition, or other methods.

The hollow 120 may formed through the core 100. The liquid lens unit 400 may be provided in at least a portion of the hollow 120. The hollow 120 is a region of the core 100 through which light passes after having passed through the upper glass 200 or the lower glass 300. At least a portion of the electrode layer 110 may extend to the hollow 120 in the core 110.

The through-holes 130 may be formed through the core 100, and an electrode layer 110 connected to the electrode layer 110 deposited on the upper surface of the core 100 may extend through the through-holes 130. The deposited layer may be deposited on the surfaces of the through-holes 130 so as to be connected to the electrode layer 110 on the upper surface of the core 100.

The pattern unit 140 may be formed on the lower surface of the core 100, and may have a plurality of terminals 143. The structure of the pattern unit 140 will be described below in detail with reference to the drawings.

Figure 3:
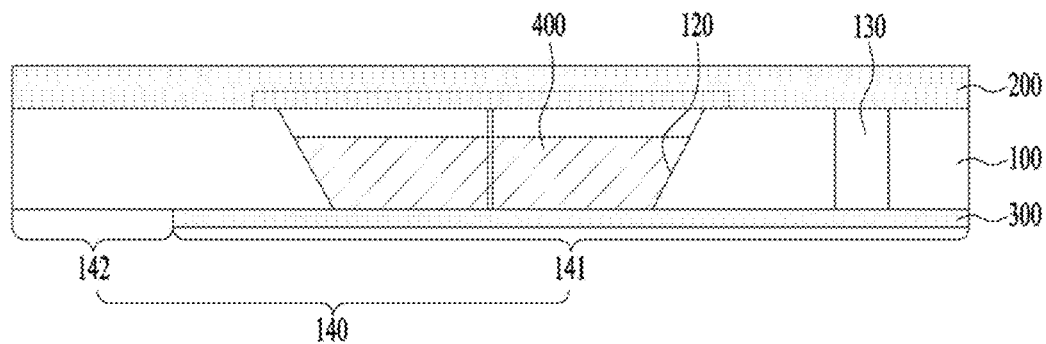
FIG. 3 is a side view showing the lens according to the embodiment.
Figure 4:
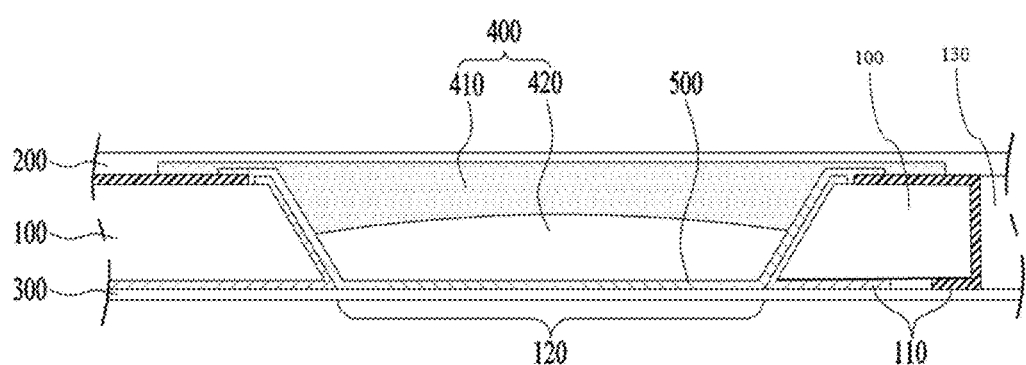
FIG. 4 is a schematic sectional view illustrating the structure of FIG. 3.

FIG. 3 is a side view showing the lens according to the embodiment. FIG. 4 is a schematic sectional view illustrating the structure of FIG. 3.

As shown in FIG. 4, the electrode layer 110 may be disposed on the upper surface and the lower surface of the core 100, the surface of the hollow 120, and the surfaces of the through-holes 130 by deposition.

In this structure, the deposition layers formed on the upper surface and the lower surface of the core 100 may be connected to each other via the deposition layer formed on the surfaces of the through-holes 130. That is, the electrode layers 110 disposed on the upper surface and the lower surface of the core 100 may be connected to each other via the through-holes 130.

As shown in FIG. 4, the liquid lens unit 400 may include a first liquid layer 410 and a second liquid layer 420. The first liquid layer 410 may be made of a conductive liquid, and may be connected to the electrode layer 110. The second liquid layer 420 may be made of a nonconductive liquid, and may be disposed so as to abut the first liquid layer 410. The hollow 120 may be filled with at least a portion of the first liquid layer 410 and the second liquid layer 420.

In addition, the first liquid layer 410 and the second liquid layer 420 may abut each other in the state of not being mixed with each other. The first liquid layer 410 may be connected to the electrode layer 110 to receive current from an external power supply via the electrode layer 110.

When voltage is applied to the first liquid layer 410 or when current is supplied to the first liquid layer 410, the shape or curvature of the interface between the first liquid layer 410 and the second liquid layer 420 may be changed. Consequently, the shape or curvature of the interface between the first liquid layer 410 and the second liquid layer 420 may be adjusted by controlling the voltage applied to the first liquid layer 410 or the current supplied to the first liquid layer 410, whereby the camera module including the lens according to the embodiment may perform auto focusing and handshake compensation.

The insulation layer 500 may be disposed between the electrode layer 110 and the second liquid layer 420. Specifically, as shown in FIG. 4, the insulation layer 500 may be formed on a portion of the upper surface of the core 100, the surface of the hollow 120, and a portion of the upper surface of the lower glass 300. The insulation layer 500 may be stacked on the surface of the electrode layer 110 in the upper surface of the core 100 and the surface of the hollow 120.

The insulation layer 500 may prevent the first liquid layer 410, made of a conductive material, from coming into direct contact with the electrode layer 110 formed on the lower surface of the core 100. To this end, the insulation layer 500 may be stacked on the entirety of the region in which the first liquid layer 410 may directly contact the electrode layer 110 on the lower surface of the core 100, as described above.

As the insulation layer 500 is disposed as described above, the first liquid layer 410 may be connected to the electrode layer 110 on the lower surface of the core 100 through the through-holes 130.

Meanwhile, the core 100 of the embodiment shown in FIG. 4 may be formed through the following processes.

First, a hollow 120 and through-holes 130 are formed in the core 100. Subsequently, an electrode layer 110 is deposited on the upper surface and the lower surface of the core 100, the surface of the hollow 120, and the surfaces of the through-holes 130. As will be described below, a pattern unit 140 may be formed on the electrode layer 110 deposited on the lower surface of the core 100.

Subsequently, a lower glass 200 is coupled to the lower surface of the core 100 by fusion. Subsequently, an insulation layer is stacked on the core 100.

Subsequently, liquid is poured into the core 100 to form a liquid lens unit 400 including a first liquid layer 410 and a second liquid layer 420. Finally, an upper glass 200 is coupled to the upper surface of the core 100 by fusion, whereby the core 100 is assembled.

Voltage is applied to the lens or current is supplied to the lens in order to operate the lens. In the case in which the electrode layer 110 on the upper surface of the core 100 and the electrode layer 110 on the lower surface of the core 100 are not connected to each other, additional connectors for connection with the external power supply may be connected to the electrode layers 110 on the upper surface and the lower surface of the core 100.

In the structure in which such additional connectors are connected, however, the structure of the lens and the camera module including the same is complicated and has a large size. As a result, the time, effort, and cost required to manufacture the lens and the camera module including the same are increased. Hereinafter, the structure of an embodiment that is capable of solving the above problem will be described in detail.

Figure 5:
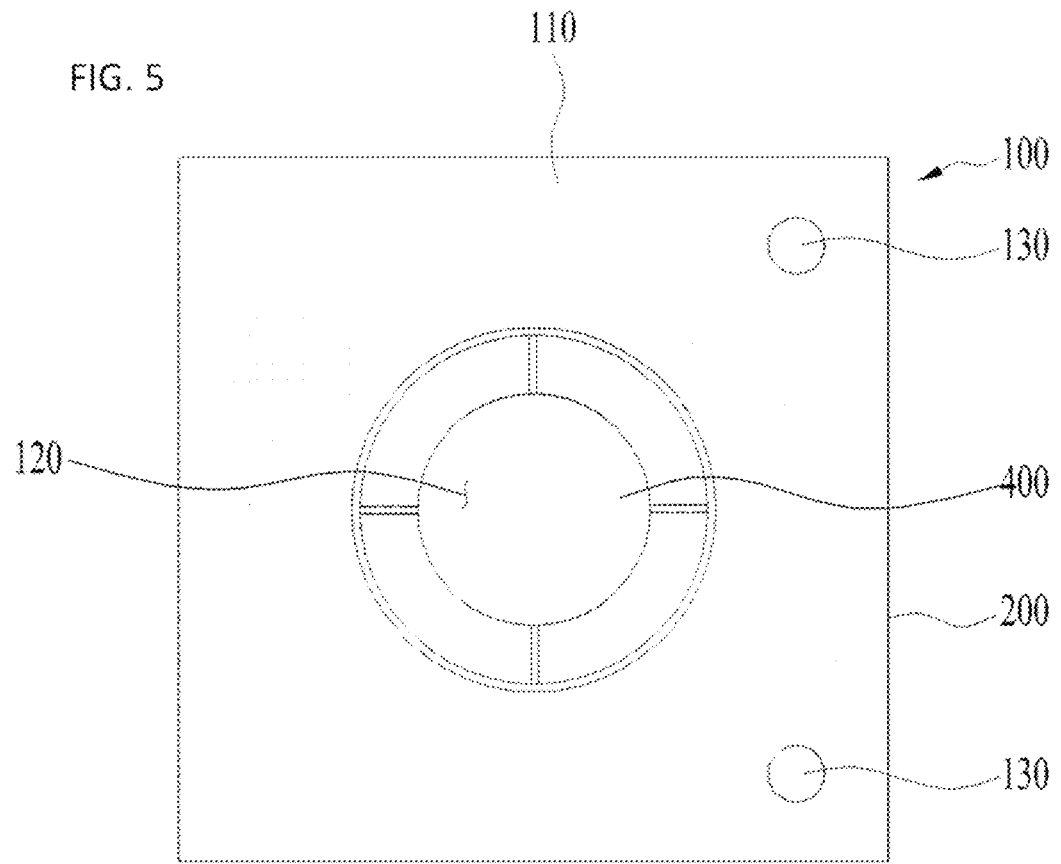
FIG. 5 is a plan view showing a lens according to an embodiment.
Figure 6:
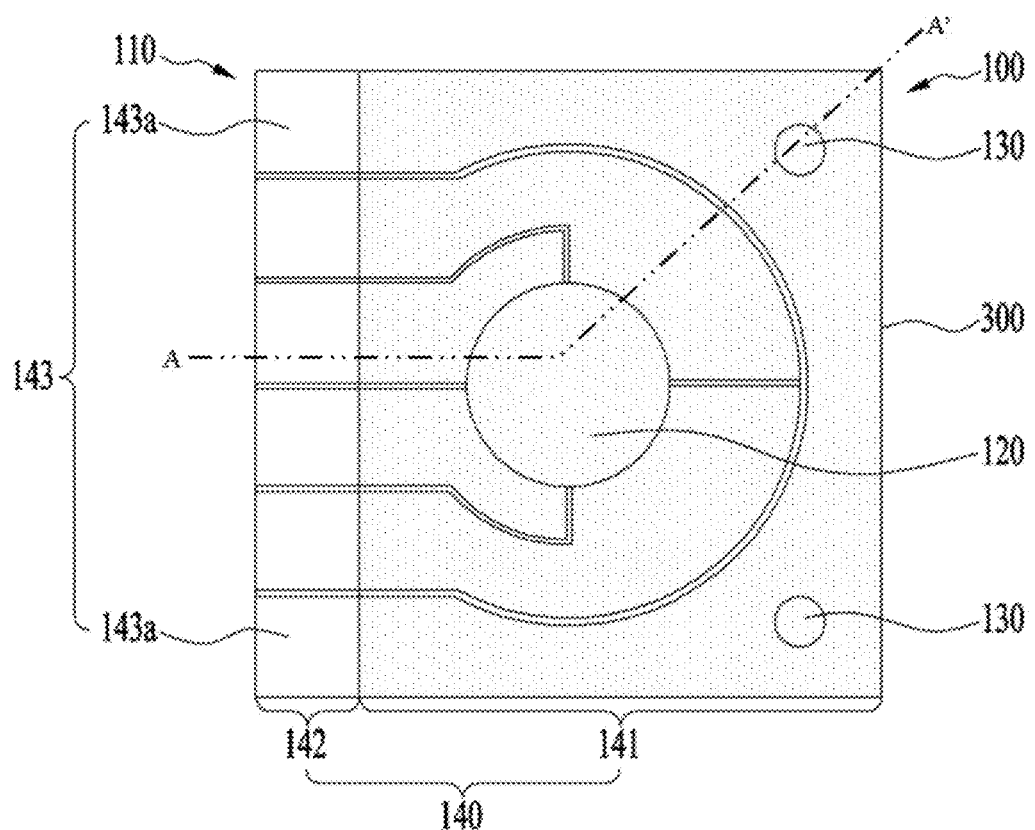
FIG. 6 is a bottom view showing the lens according to the embodiment.

FIG. 5 is a plan view showing a lens according to an embodiment (see the solid line of the figure). FIG. 6 is a bottom view showing the lens according to the embodiment. As shown in FIGS. 5 and 6, the through-holes 130, having the electrode layer 110 formed on the surfaces thereof, may connect the electrode layer 110 on the upper surface of the core 100 and the pattern unit 140 on the lower surface of the core 100 to each other.

The sectional view of FIG. 4 may correspond to a sectional view taken along line A-A' of FIG. 6.

The pattern unit 140 may be formed on the deposited electrode layer 110. That is, the electrode layer 110 deposited on the lower surface of the core 100 may be patterned by etching to form the pattern unit 140.

As shown in FIG. 6, the pattern unit 140 may be configured such that terminals 143 are separated from each other, and at least one of the terminals 143 may be connected to the electrode layer 110 deposited on the upper surface of the core 100 and the through-holes 130.

In this structure, the terminals 143 may be connected to the electrode layers 110 on both the upper surface and the lower surface of the core 100. In addition, according to this embodiment, at least some of the terminals 143 may be connected to the first liquid layer 410 via the electrode layer 110 on the upper surface of the core 100.

As shown in FIG. 6, the pattern unit 140 may include a first pattern unit 141 and a second pattern unit 142. The first pattern unit 141 is a region that is coupled to the lower glass 300, and the second pattern unit 142 is a region that is exposed at one side of the lower glass 300.

The second pattern unit 142 may be connected to an external printed circuit board 10. Consequently, the second pattern unit 142 may be spaced apart from the external printed circuit board 10 by a predetermined distance so as to be easily connected to the external printed circuit board 10, and may be constituted by portions of the terminals 143 having the same or similar shapes.

Meanwhile, the terminals 143 may include first terminals 143a. As shown in FIG. 6, for example, the first terminals 143a may be connected to the electrode layer 110 formed on the upper surface of the core 100 and the electrode layer 110 formed in the through-holes 130.

The electrode layer 110 on the upper surface of the core 100 may be disposed on the upper surface of the core 100 about the hollow 120 in a circular shape. The electrode layer 110 on the upper surface of the core 100 may be connected to the first terminals 143a via the electrode layer 110 formed in the through-holes 130 so as to receive the same current from the external power supply. The electrode layer 110 connected to the first terminals 143a may be defined as a common electrode.

The other terminals 143 excluding the first terminals 143a may be connected to the electrode layers 110 that divide the circumference of the hollow 120 into four regions in the pattern unit 140 on the lower surface of the core 100. The electrode layers 110 corresponding to the four regions may be disposed under the insulation layer 500 along the inclined surface of the hollow 120. The electrode layers 110 corresponding to the four regions may receive current through the other terminals 143, excluding the first terminals 143*a*. The electrode layers 110 connected to the other terminals 143 excluding the first terminals 143*a* may be defined as individual electrodes. When current is supplied from the external power supply via the terminals 143 including the first terminals 143*a*, therefore, the shape or curvature of the interface between the first liquid layer 410 and the second liquid layer 420 may be changed.

Consequently, the camera module including the lens may perform auto focusing and handshake compensation.

Figure 7:
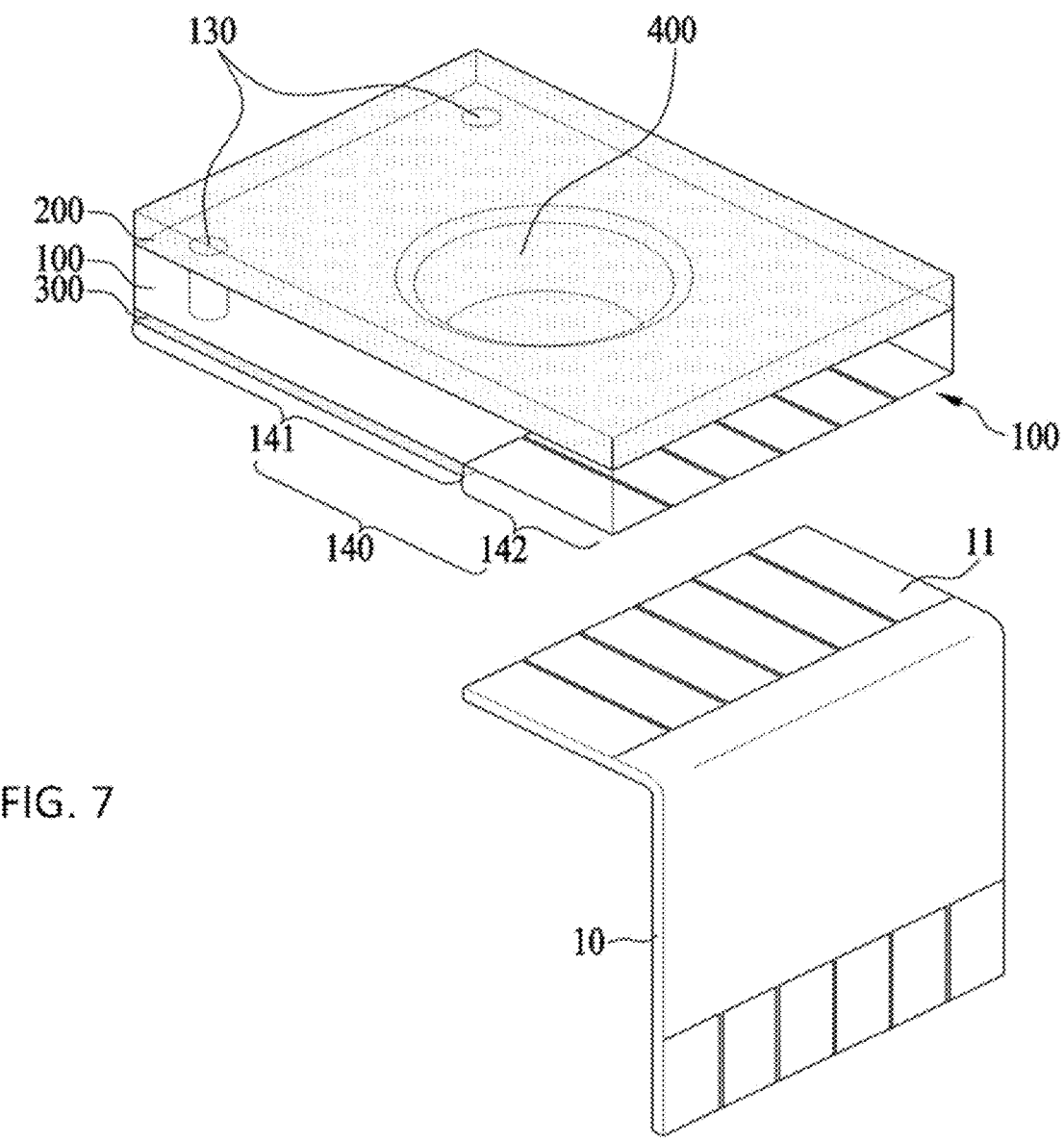
FIGS. 7 and 8 are views illustrating a coupling structure between the lens according to the embodiment and an external printed circuit.
Figure 8:
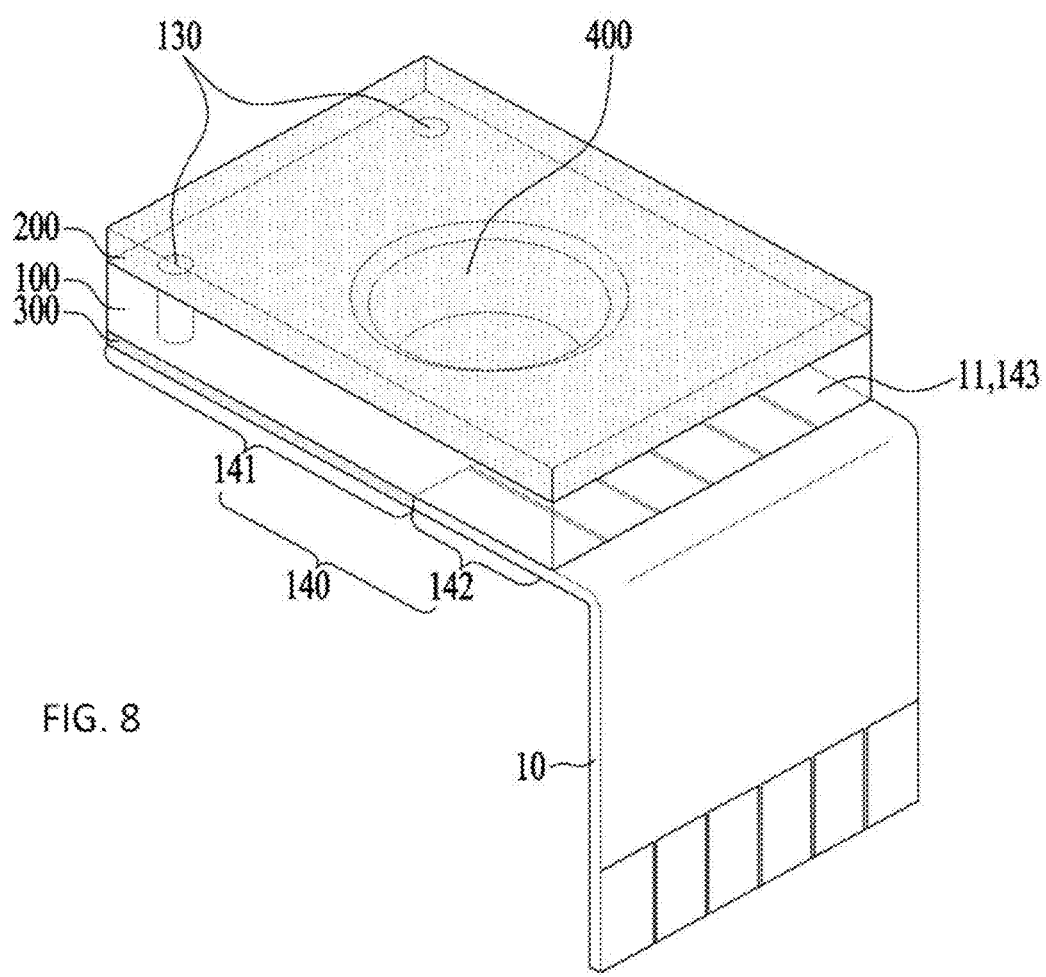

FIGS. 7 and 8 are views illustrating a coupling structure between the lens according to the embodiment and an external printed circuit.

As shown in FIGS. 7 and 8, the terminals 143 of the pattern unit 140 may be connected to the external printed circuit board 10 in the second pattern unit 142, which is exposed at one side of the lower glass 300.

The external printed circuit board 10 may be provided on both ends thereof with external terminals 11. One of the external terminals 11 may be connected to the lens, and the other may be connected to the external power supply.

In the second pattern unit 142 of the lens, the terminals 143 may be coupled to the external terminals 11 of the external printed circuit board 10. The terminals 143 may be coupled and connected to the external terminals 11 by soldering or fusion or using a conductive film or an adhesive.

In the embodiment, the deposition layer formed on the upper surface and the lower surface of the core 100 may be connected to the external power supply only in the pattern unit 140 formed on the lower surface of the core 100. Consequently, the above structure is simpler than the structure in which the deposition layer on the upper surface and the lower surface of the core 100 is connected to the external power supply.

Since the lens has a simple structure, as described above, the structure of the lens and the camera module including the same may be simplified and miniaturized. As a result, the time, effort, and cost required to manufacture the lens and the camera module including the same may be reduced.

The camera module including the lens may further include an image sensor (not shown). The image sensor may be provided so as to be opposite to the lens in the optical-axis direction.

Consequently, light may be incident on the image sensor after passing through the lens, and images of a subject may be formed on the image sensor.

Meanwhile, an infrared cutoff filter may be provided between the lens and the image sensor so as to be opposite to the lens and the image sensor in the optical-axis direction. The infrared cutoff filter may improve the quality of images formed on the image sensor.

The core 100, the electrode layer 110 on the upper surface of the core 100, the electrode layer 110 on the lower surface of the core 100, the hollow 120, the upper glass 200, the lower glass 300, described with reference to FIGS. 1 to 6, may also be defined as a first plate, a first electrode, a second electrode, a cavity, a second plate, and a third plate, respectively.

Figure 9:
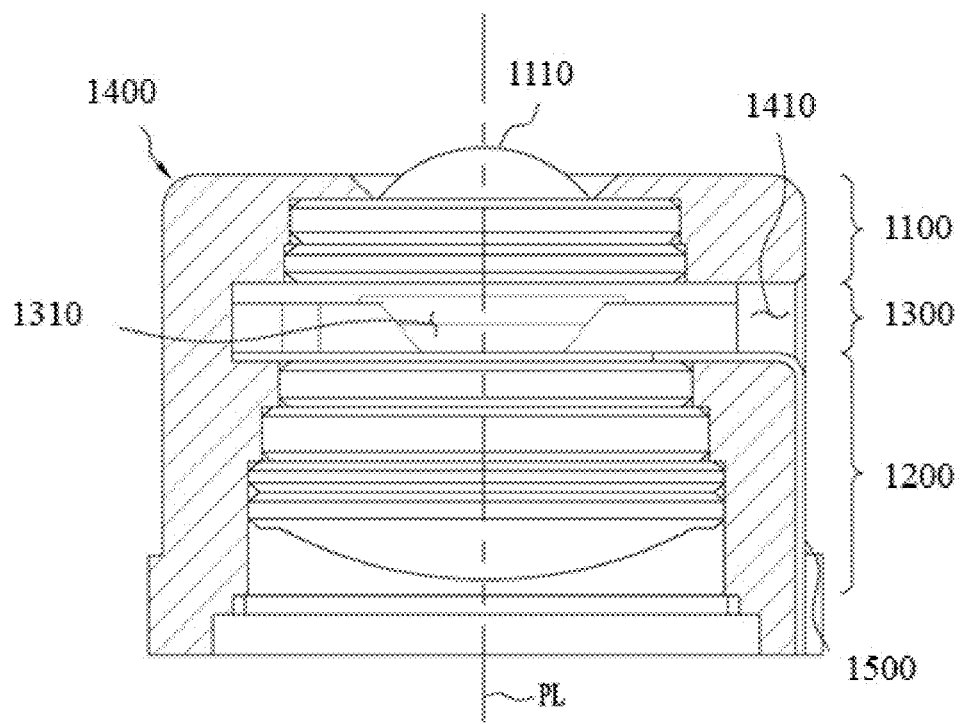
FIG. 9 is a side sectional view showing a lens assembly according to an embodiment.

FIG. 9 is a side sectional view showing a lens assembly according to an embodiment. The lens assembly according to the embodiment may include a first lens unit 1100, a second lens unit 1200, a liquid lens unit 1300, a base 1400, a printed circuit board 1500, and a cover member 1600.

The first lens unit 1100 is a front part of the lens assembly, on which light is incident from outside the lens assembly. The first lens unit 1100 may be constituted by at least one lens. Alternatively, two or more lenses may be aligned in the optical-axis direction to constitute an optical system.

The first lens unit 1100 may be mounted in the base 1400. A through-hole may be formed in the base 1400, and the first lens unit 1100 may be disposed in the through-hole.

The first lens unit 1100 may include an exposure lens 1110. The exposure lens 1110 is a lens that protrudes out of the base 1400 so as to be exposed to the outside. Since the exposure lens 1110 is exposed to the outside, the surface of the lens may be easily damaged.

In the case in which the surface of the lens is damaged, the quality of images taken by the camera module may be deteriorated. Consequently, it is necessary to prevent or restrain damage to the surface of the exposure lens 1110.

In order to prevent damage to the surface of the exposure lens 1110, a cover glass may be disposed in front of the exposure lens 1110. In the case in which the cover glass is disposed, however, the size of the space in which the lens assembly and the camera module including the same are mounted may be increased, with the result that the size of a device in which the lens assembly and the camera module including the same are mounted may be increased.

In the embodiment, therefore, a structure for preventing or restraining damage to the surface of the exposure lens 1110 without using the cover glass is provided by way of example.

In the embodiment, at least a portion of the exposure lens 1110 may be made of a wear-resistant material, such as a glass material, in order to prevent or restrain damage to the surface of the exposure lens 1110.

For example, the entirety of the exposure lens 1110 may be made of a glass material, which exhibits high wear resistance. In the case in which the exposure lens 1110 is made of a glass material, which exhibits high wear resistance, damage to the surface of the exposure lens 1110 is more effectively prevented or restrained than in the case in which the exposure lens 1110 is made of a plastic material.

In another embodiment, the exposure lens 1110 may have a wear-resistant coating layer formed on the exposed portion thereof. For example, the wear-resistant coating layer may be a diamond like carbon (DLC) coating layer.

DLC coating is performed to deposit a coating layer on the surface of an object using carbon gas, carbon being the main component of diamonds. The deposited coating layer may have a structure and properties similar to those of diamonds.

Since the DLC coating layer exhibits high hardness similar to that of diamonds, therefore, the exposure lens 1110 having the DLC coating layer formed thereon may exhibit high wear resistance.

In the embodiment, the use of an additional cover glass to protect the exposed portion of the lens assembly, i.e. the exposure lens 1100, is obviated. Consequently, the size of a space in which the lens assembly and the camera module including the same are mounted may be reduced, with the result that the size of a device in which the lens assembly and the camera module including the same are mounted may be effectively reduced.

The second lens unit 1200 may be disposed at the rear of the first lens unit 1100 and the liquid lens unit 1300. Light incident on the first lens unit 1100 from the outside may pass through the liquid lens unit 1300, and may be incident on the second lens unit 1200. The second lens unit 1200 may be disposed in the through-hole formed in the base 1400 so as to be spaced apart from the first lens unit 1100.

The second lens unit 1200 may be constituted by at least one lens. Alternatively, two or more lenses may be aligned in the optical-axis direction to constitute an optical system. The second lens unit 1200 may be mounted in the base 1400.

The liquid lens unit 1300 may be disposed between the first lens unit 1100 and the second lens unit 1200, and may be mounted in the base 1400. The liquid lens unit 1300 may be provided with a hollow 1310 formed in the optical-axis direction. The hollow 1310 is a region through which light is transmitted after passing through the first lens unit 1100. At least a portion of the hollow may be filled with liquid.

In addition, as shown in FIG. 9, the hollow 1310 may be configured such that the area of the hollow in the optical-axis direction gradually decreases from the first lens unit 1100 to the second lens unit 1200.

For example, the hollow 1310 may be filled with two kinds of liquids, i.e. a conductive liquid and a nonconductive liquid. The conductive liquid and the nonconductive liquid may abut each other in the state of not being mixed with each other.

When the conductive liquid is connected to the external power supply and current from the external power supply is supplied to the conductive liquid, the shape or curvature of the interface between the conductive liquid and the nonconductive liquid may be changed. The liquid lens unit 1300 and the lens assembly and the camera module including the same may perform auto focusing and handshake compensation by controlling the shape or curvature of the interface between the conductive liquid and the nonconductive liquid.

As shown in FIG. 9, the first lens unit 1100, the second lens unit 1200, and the liquid lens unit 1300 may be disposed so as to be opposite to each other in the optical-axis direction. In addition, the focuses of the first lens unit 1100, the second lens unit 1200, and the liquid lens unit 1300 may be aligned with each other in the optical-axis direction such that the camera module takes a high-quality image.

That the focuses are aligned with each other in the optical-axis direction may mean that the focuses of the first lens unit 1100, the second lens unit 1200, and the liquid lens unit 1300 are arranged on the same line or are located at least within a designed range, when viewed in the optical-axis direction.

That is, referring to FIG. 9, in the case in which the focus of the first lens unit 1100 is located on a phantom line PL that is parallel to the optical axis, the second lens unit 1200 and the liquid lens unit 1300 may be located on the phantom line PL or may deviate from the phantom line PL within a designed range such that the focuses of the lens units may be aligned with each other in the optical-axis direction.

If the focuses of the lens units deviate from the designed range, the quality of a taken image may be deteriorated. Consequently, a focus alignment structure is required. This may be realized by the structure of the base 1400 provided in the embodiment. Hereinafter, the structure of the base 1400 of the embodiment will be described in detail.

The first lens unit 1100, the second lens unit 1200, and the liquid lens unit 1300 may be mounted in the base 1400 so as to be opposite to each other in the optical-axis direction. The base 1400 may be provided with a space formed therethrough in the optical-axis direction, and the lens units may be disposed in the space.

Figure 10:
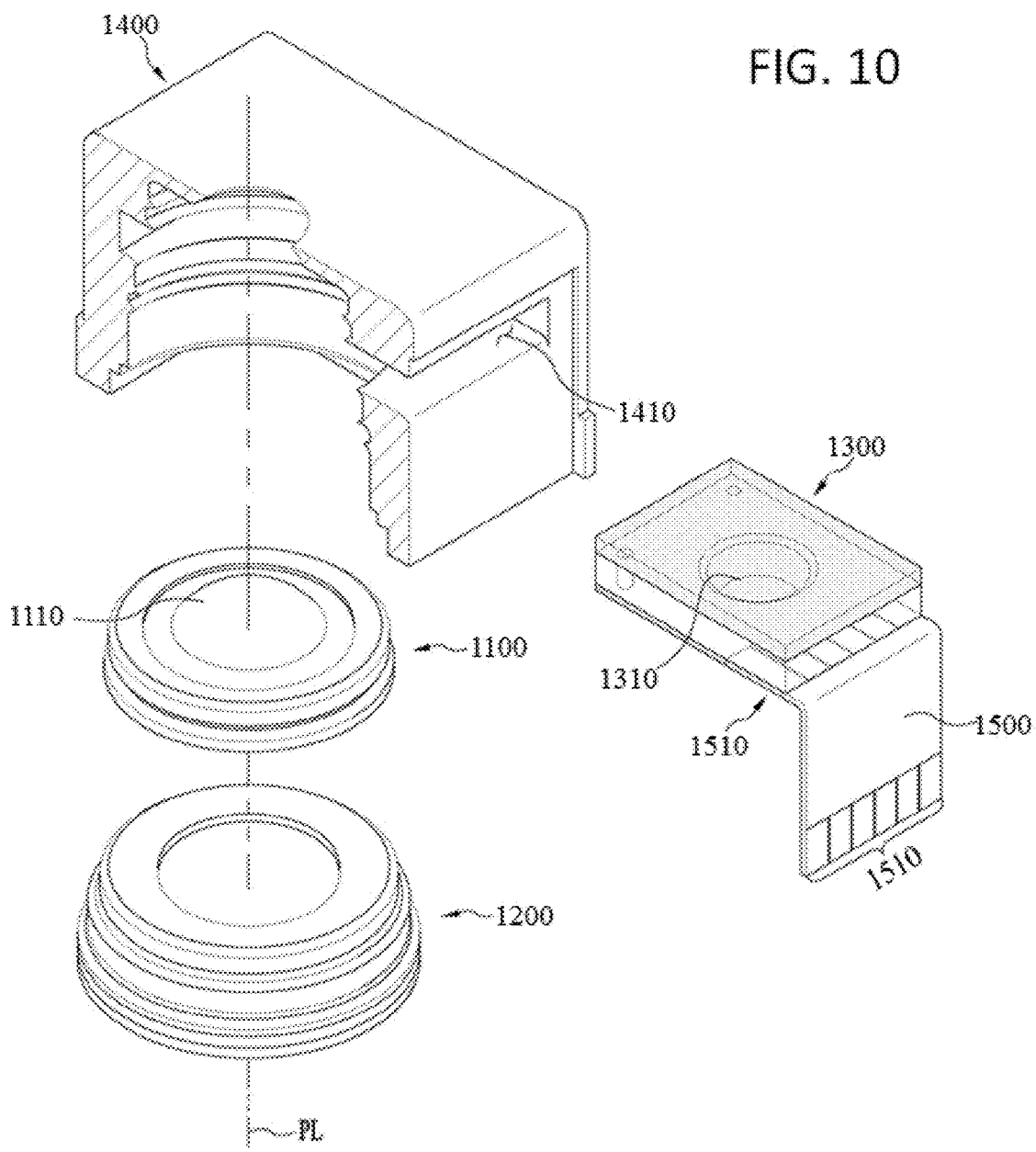
FIG. 10 is an exploded perspective view of FIG. 9.

The base 1400 may be provided with an insertion hole 1410, through which the liquid lens unit 1300 is inserted. That is, the insertion hole 1410, through which the liquid lens unit 1300 is inserted, may be formed in the edge of the base 1400. As shown in FIG. 9 and FIG. 10, a description of which will follow, the insertion hole 1410 may be formed in one side of the base 1400 so as to communicate with the space in the base 1400.

As shown in FIG. 9, the liquid lens unit 1300 may be configured such that the area of the liquid lens unit in the optical-axis direction is greater than the area of the first lens unit 1100 or the second lens unit 1200 in the optical-axis direction.

The reason for this is that, in consideration of the structure of the liquid lens unit 1300, the area of the hollow 1310, which is filled with liquid, in the optical-axis direction may be less than the area of the first lens unit 1100 or the second lens unit 1200. When the entire area of the liquid lens unit 1300 in the optical-axis direction is reduced, the area of the hollow 1310 may also be reduced, with the result that the area of light that is transmitted through the liquid lens unit 1300 may also be reduced.

When the area of the liquid lens unit 1300 through which light is transmitted is reduced, the amount of light that is transmitted through the liquid lens unit is reduced, by which the brightness of images that are taken may be considerably reduced. As a result, there is a limitation on the extent to which both the area of the liquid lens unit 1300 through which light is transmitted and the area of the hollow 1310 in the optical-axis direction can be reduced.

For the above reason, the area of the liquid lens unit 1300 in the optical-axis direction may be greater than the area of the first lens unit 1100 or the second lens unit 1200 in the optical-axis direction. As a result, it is difficult to mount the liquid lens unit 1300 in the base 1400 upward from the open bottom of the space in the base 1400, unlike the first lens unit 1100 or the second lens unit 1200.

In the embodiment, the liquid lens unit 1300 may be mounted in the base 1400 through the insertion hole 1410, whereby the lens assembly may be easily assembled. In addition, the printed circuit board 1500, which is coupled to the liquid lens unit 1300, may also be easily mounted in the base 1400.

In addition, the focus of the liquid lens unit 1300 mounted in the base 1400 through the insertion hole 1410 may be easily aligned with the focus of the first lens unit 1100 in the optical-axis direction.

That is, the liquid lens unit 1300 may be moved in the direction that is perpendicular to the optical-axis direction such that the focus of the liquid lens unit 1300 is located on the phantom line PL or is located within the designed range even though the focus of the liquid lens unit 1300 deviates from the phantom line PL.

The printed circuit board 1500 may be connected to the liquid lens unit 1300, and at least a portion of the printed circuit board 1500 may be inserted through the insertion hole 1410. The printed circuit board 1500 may be provided at both ends thereof with terminals 1510, and may be bent so as to be mounted in the cover member 1600.

The terminals 1510 provided at one end of the printed circuit board 1500 may be coupled and connected to the liquid lens unit 1300, and the terminals 1510 provided at the other end of the printed circuit board 1500 may be connected to the external power supply.

For connection with the external power supply, the terminals 1510 provided at the other end of the printed circuit board may be connected to a sensor holder 1010, a detailed description of which will follow.

FIG. 10 is an exploded perspective view of FIG. 9. A method of assembling the lens assembly according to the embodiment and a method of aligning the focuses of the lens units will be described with reference to FIG. 10.

First, the first lens unit 1100 is mounted in the base 1400. At this time, the first lens unit 1100 may be disposed in the space in the base 1400 through the opening formed in the lower portion of the base 1400. At this time, the focus of the first lens unit 1100 may be located on the phantom line PL.

When the first lens unit 1100 is disposed in the space in the base 1400 at a designed position, the first lens unit 1100 is coupled to the base 1400 using an adhesive.

Subsequently, the liquid lens unit 1300 is mounted in the base 1400. The liquid lens unit 1300, to which the printed circuit board 1500 is coupled, may be disposed in the space in the base 1400 through the insertion hole 1410. At this time, as described above, the liquid lens unit 1300 may be moved in the direction that is perpendicular to the optical-axis direction to align the focus of the liquid lens unit 1300 with the focus of the first lens unit 1100 in the optical-axis direction.

When the focus alignment is completed, the liquid lens unit 1300 is finally disposed in the space in the base 1400, and the liquid lens unit 1300 is coupled to the base 1400 using an adhesive.

Subsequently, the second lens unit 1200 is mounted in the base 1400. At this time, the second lens unit 1200 may be disposed in the space in the base 1400 through the opening formed in the lower portion of the base 1400. The second lens unit 1200 may be moved in the direction that is perpendicular to the optical-axis direction to align the focus of the second lens unit 1200 with the focus of the first lens unit 1100 and the focus of the liquid lens unit 1300 in the optical-axis direction.

When the focus alignment is completed, the second lens unit 1200 is finally disposed in the space in the base 1400, and the second lens unit 1200 is coupled to the base 1400 using an adhesive.

Through the assembly method and the focus alignment method described above, the liquid lens unit 1300 may be disposed such that the focus of the liquid lens unit is aligned with the focus of the first lens unit 1100 in the optical-axis direction. In addition, the second lens unit 1200 may be disposed such that the focus of the second lens unit is aligned with the focus of the first lens unit 1100 and the focus of the liquid lens unit 1300 in the optical-axis direction.

In this structure, the focuses of the first lens unit 1100, the second lens unit 1200, and the liquid lens unit 1300, disposed and mounted in the base 1400, may be aligned with each other in the optical-axis direction.

Meanwhile, the area of the hollow 1310 formed in the liquid lens unit 1300 may be less than the area of the lens constituting the first lens unit 1100 or the second lens unit 120 in the optical-axis direction.

The reason for this is that the lenses constituting the first lens unit 1100 and the second lens unit 120 are configured such that light is incident on the entire area of each lens in the optical-axis direction, whereas the liquid lens unit 1300 is configured such that light is incident only on the hollow 1310 thereof. In order to miniaturize the lens assembly, therefore, the area of the hollow 1310 may be less than the area of the first lens unit 1100 or the second lens unit 1200.

The smaller the area of the hollow 1310 in the optical-axis direction, the smaller the amount of light that passes through the hollow 1310. In the case in which the liquid lens unit 1300 is disposed in front of the first lens unit 1100, therefore, the amount of light that is incident on the lens assembly is smaller than in the disposition according to the embodiment, i.e. in the case in which the liquid lens unit 1300 is disposed between the first lens unit 1100 and the second lens unit 1200, with the result that the quality of a taken image may be deteriorated.

Meanwhile, in the case in which the liquid lens unit 1300 is disposed at the rear of the second lens unit 1200, unlike the disposition of the lens units according to the embodiment, the view angle of the camera module may be reduced, since the hollow 1310 has a small area.

In the disposition of the lens units according to the embodiment, i.e. in the case in which the liquid lens unit 1300 is disposed between the first lens unit 1100 and the second lens unit 1200, light that has been transmitted through the hollow 1310 in the liquid lens unit 1300 may be refracted while passing through the second lens unit 1200, which has a large area. As a result, the view angle may be greater than in the case in which the liquid lens unit 1300 is disposed at the rear of the second lens unit 1200.

For the above reason, the liquid lens unit 1300 may be disposed between the first lens unit 1100 and the second lens unit 1200, as in the embodiment, thereby realizing a lens assembly configured such that the amount of incident light is not reduced while the view angle is not reduced.

Figure 11:
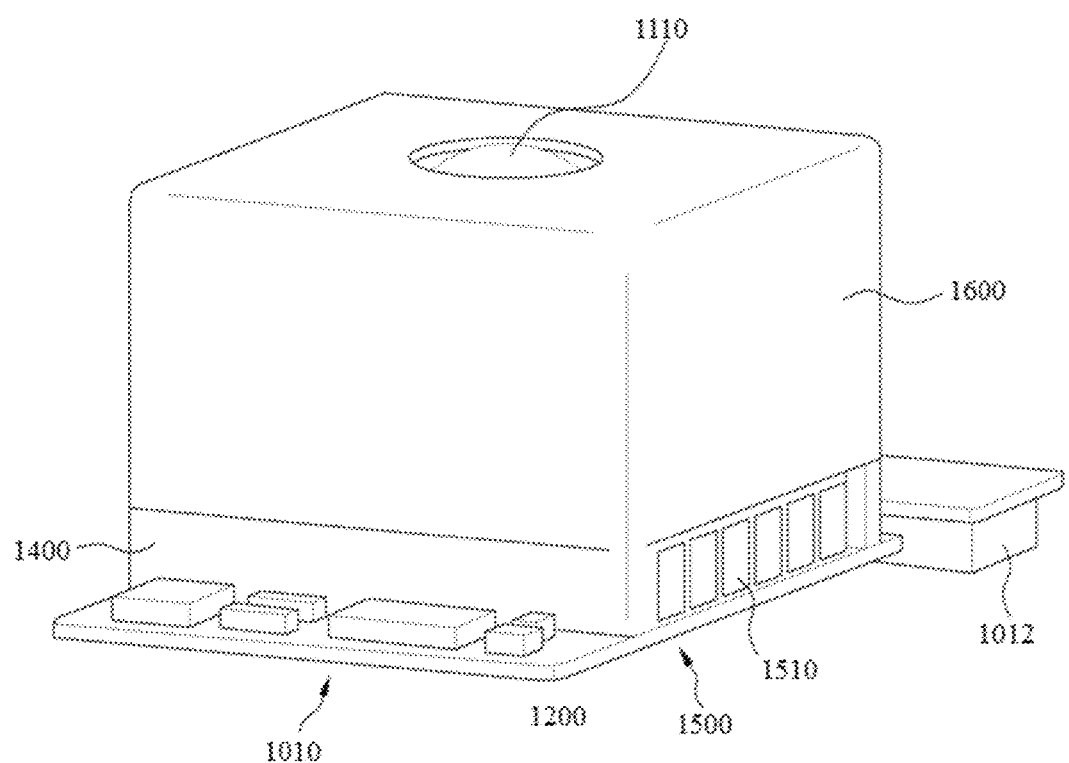
FIG. 11 is a perspective view showing a camera module according to an embodiment.
Figure 12:
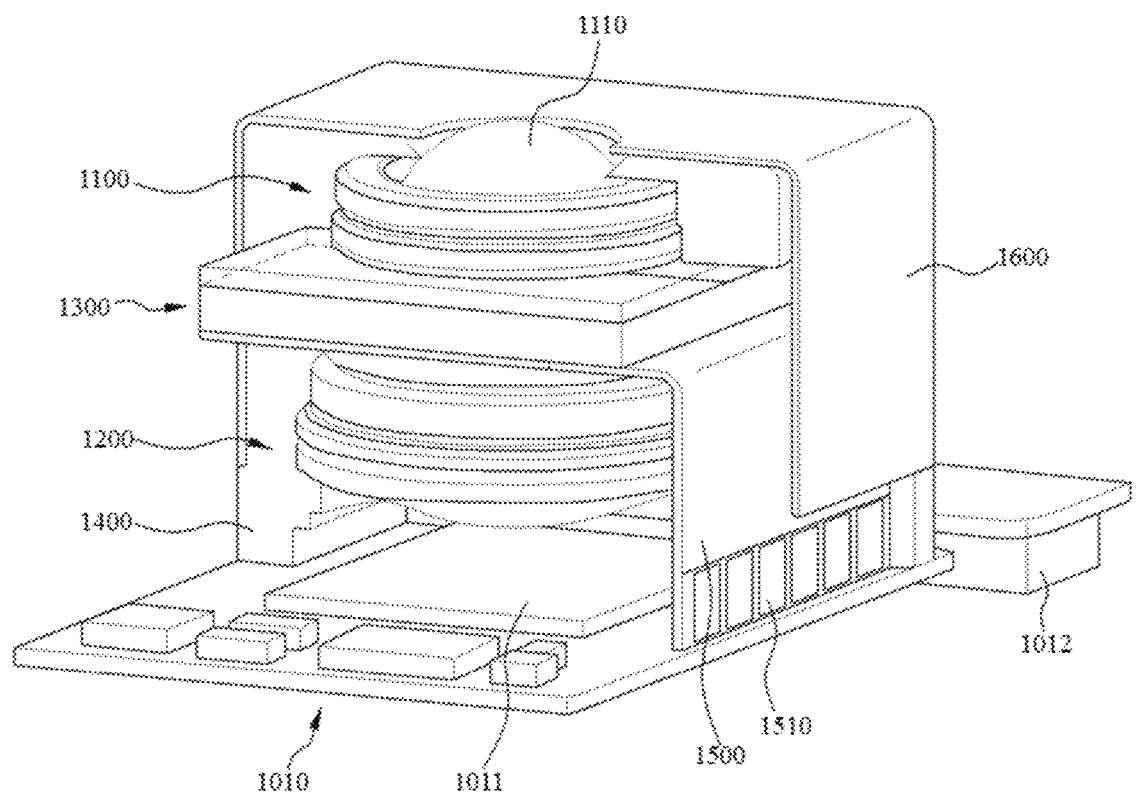
FIG. 12 is a view showing the internal structure of FIG. 11.

FIG. 11 is a perspective view showing a camera module according to an embodiment. FIG. 12 is a view showing the internal structure of FIG. 11. As shown in FIGS. 11 and 12, the lens assembly of the embodiment may further include a cover member 1600.

The cover member 1600 may receive the base 1400 and the printed circuit board 1500. Consequently, the cover member may receive the first lens unit 1100, the second lens unit 1200, and the liquid lens unit 1300, mounted in the base 1400, to protect the lens units.

In an embodiment, the cover member 1600 may be formed in a hollow shape having an open lower portion and a through-hole, through which the front portion of the first lens unit 1100 is exposed.

As shown in FIGS. 11 and 12, the camera module according to the embodiment may include the lens assembly having the above structure, an image sensor 1011, and a sensor holder 1010.

The image sensor 1011 is a region which is disposed opposite to the lens assembly in the optical-axis direction and on which light that has been sequentially transmitted through the first lens unit 1100, the liquid lens unit 1300, and the second lens unit 1200 is incident to form images.

Meanwhile, although not shown, a filter for improving the quality of a taken image may be provided between the second lens unit 1200 and the image sensor 1011. For example, the filter may be an infrared cutoff filter.

The image sensor 1011 may be mounted on the sensor holder 1010, and may be coupled to the base 1400. In addition, various elements for operating the camera module may be mounted to the sensor holder 1010. In addition, the sensor holder 1010 may be connected to the printed circuit board 1500.

That is, connection portions (not shown) configured to be connected to the terminals 1510 formed at the printed circuit board 1500 may be formed at the sensor holder 1010. The terminals 1510 and the connection portions may be coupled to each other by soldering or using a conductive adhesive.

In addition, the sensor holder 1010 may be provided with a connector 1012 for connection with the external power supply. Consequently, the liquid lens unit 1300 may be connected to the external power supply via the printed circuit board 1500, the sensor holder 1010, and the connector 1012 so as to be driven by current from the external power supply.

Figure 13:
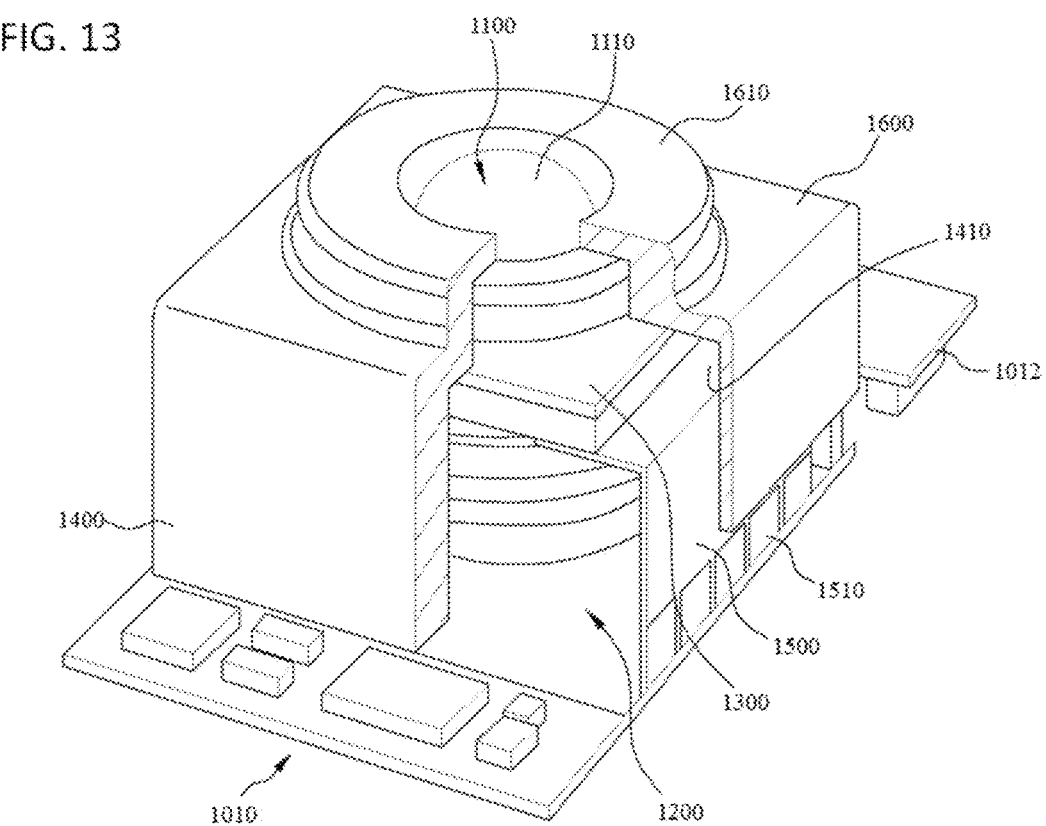
FIG. 13 is a perspective view showing a camera module provided with a cover member according to another embodiment.
Figure 14:
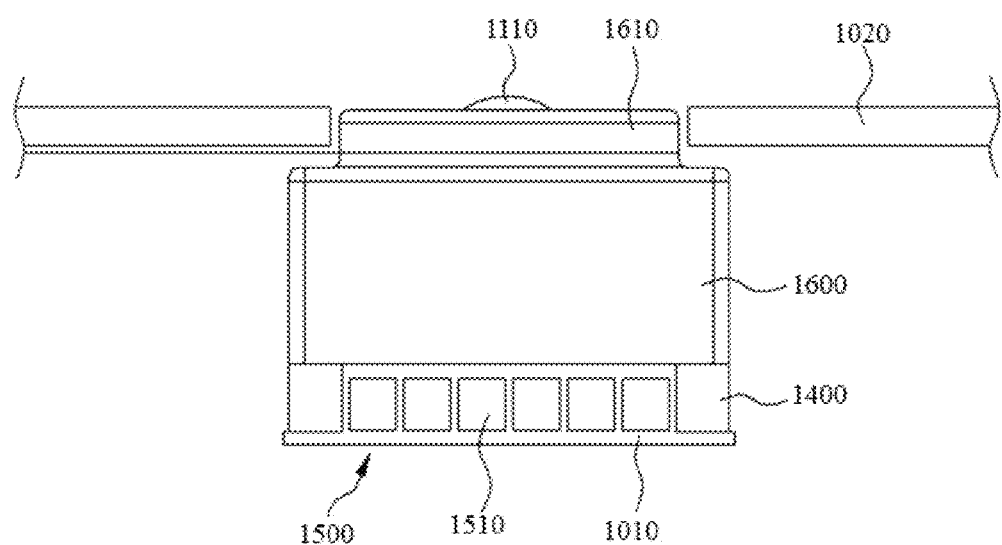
FIG. 14 is a view showing the state in which the camera module of FIG. 13 is mounted in a device.

FIG. 13 is a perspective view showing a camera module provided with a cover member 1600 according to another embodiment. FIG. 14 is a view showing the state in which the camera module of FIG. 13 is mounted in a device.

As shown in FIGS. 13 and 14, the cover member 1600 may be provided with a protrusion core 1610. The protrusion core 1610 may be configured to have a structure in which the circumference of the through-hole formed in the cover member 1600 protrudes in the optical-axis direction such that the exposed portion of the first lens unit 1100, i.e. the exposure lens 1110, is exposed to the outside.

Meanwhile, the front portion of the base 1400 may protrude in response to the shape of the protrusion core 1610. As shown in FIG. 13, a space may be defined in the protrusion core 1610, and the first lens unit 1100 may be mounted in the space.

As shown in FIG. 14, the protrusion core 1610 may be inserted into an opening formed in a cover 1020 of the device. In this structure, the space in the device in which the lens assembly and the camera module including the same are disposed may be reduced by changing the shape of the cover member 1600 and the shape of the base 1400 without reducing the overall length of the lens assembly of the embodiment in the optical-axis direction, in contrast with the structure of the lens assembly described with reference to FIGS. 9 to 12.

The base 1400 described with reference to FIGS. 9 to 14 may be defined as a holder. In the case in which the insertion hole 1410 includes two holes that face each other, the holes may be defined as a first hole and a second hole.

Hereinafter, an optical device according to this embodiment will be described.

The optical device may be a mobile phone, a smartphone, a portable smart device, a digital camera, a laptop computer, a digital broadcasting terminal, a personal digital assistant (PDA), a portable multimedia player (PMP), or a navigator. However, the disclosure is not limited thereto. Any device that takes video or still images may be used.

The optical device may include a main body (not shown), a display unit (not shown), and a camera module 2000 or 2001.

The main body may define the external appearance of the optical device. In an example, the main body may be formed in the shape of a rectangular cube. However, the disclosure is not limited thereto. In another example, at least a portion of the main body may be round. The main body may receive the camera module 2000 or 2001. The display unit may be disposed at one surface of the main body.

The camera module 2000 or 2001 may be disposed at the main body. The camera module 2000 or 2001 may be disposed at one surface of the main body. At least a portion of the camera module 2000 or 2001 may be received in the main body. The camera module 2000 or 2001 may take images of a subject.

The display unit may be disposed at the main body. The display unit may be disposed at one surface of the main body. That is, the display unit may be disposed at the same surface as the camera module 2000 or 2001. Alternatively, the display unit may be disposed at a surface different from the one surface of the main body.

The display unit may be disposed at the surface that is opposite to the surface at which the camera module 2000 or 2001 is disposed. The display unit may output the image taken by the camera module 2000 or 2001.

Hereinafter, the structure of a camera module 2000 according to a first embodiment will be described with reference to the drawings.

Figure 16:
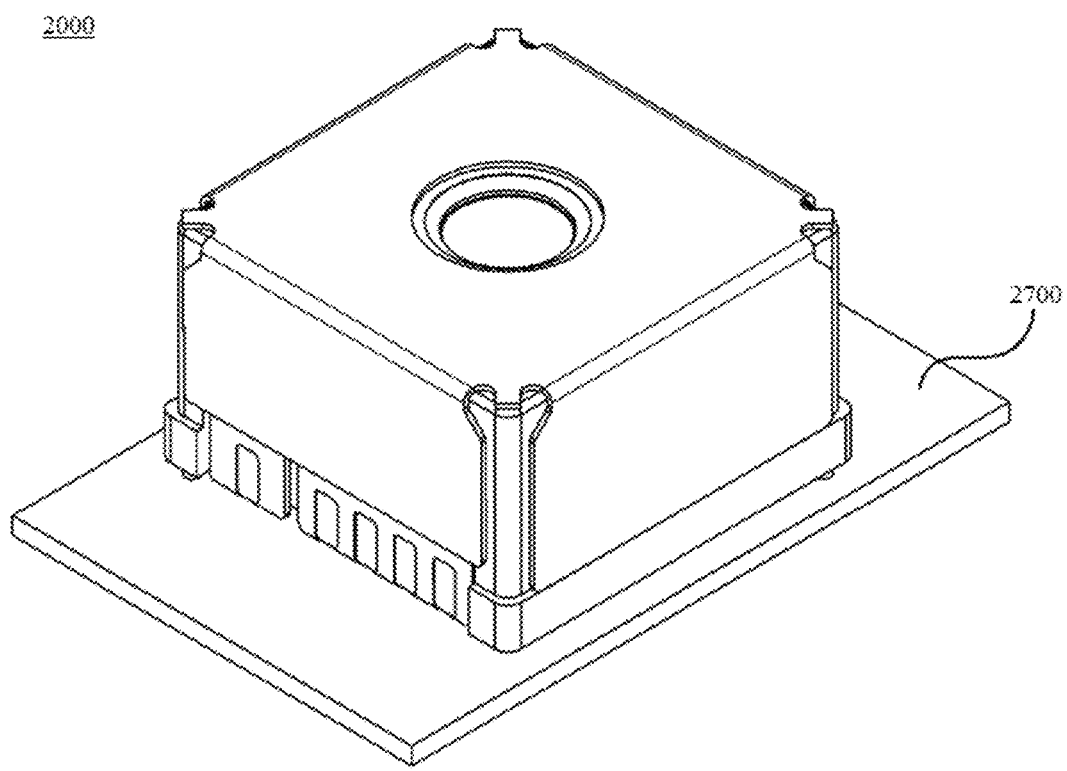
FIG. 16 is a perspective view showing a camera module according to a first embodiment.
Figure 17:
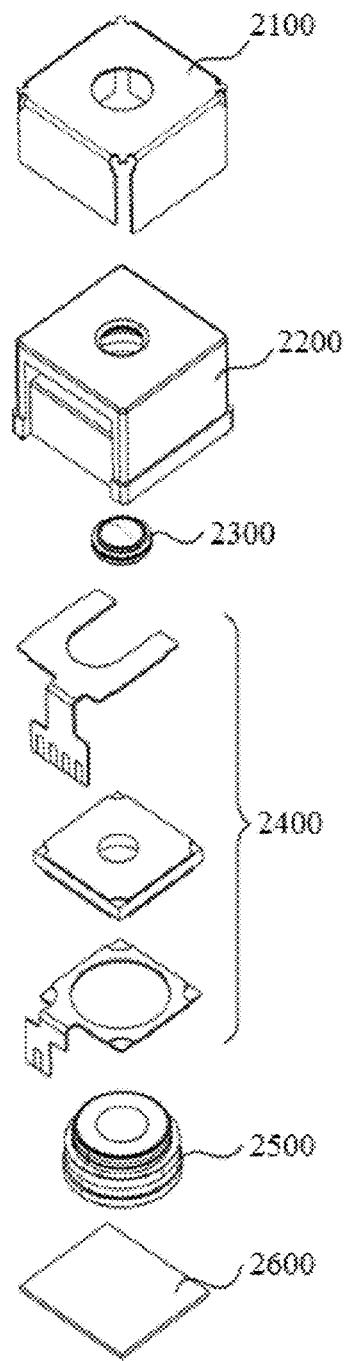
FIG. 17 is an exploded perspective view showing the camera module according to the first embodiment.
Figure 18:
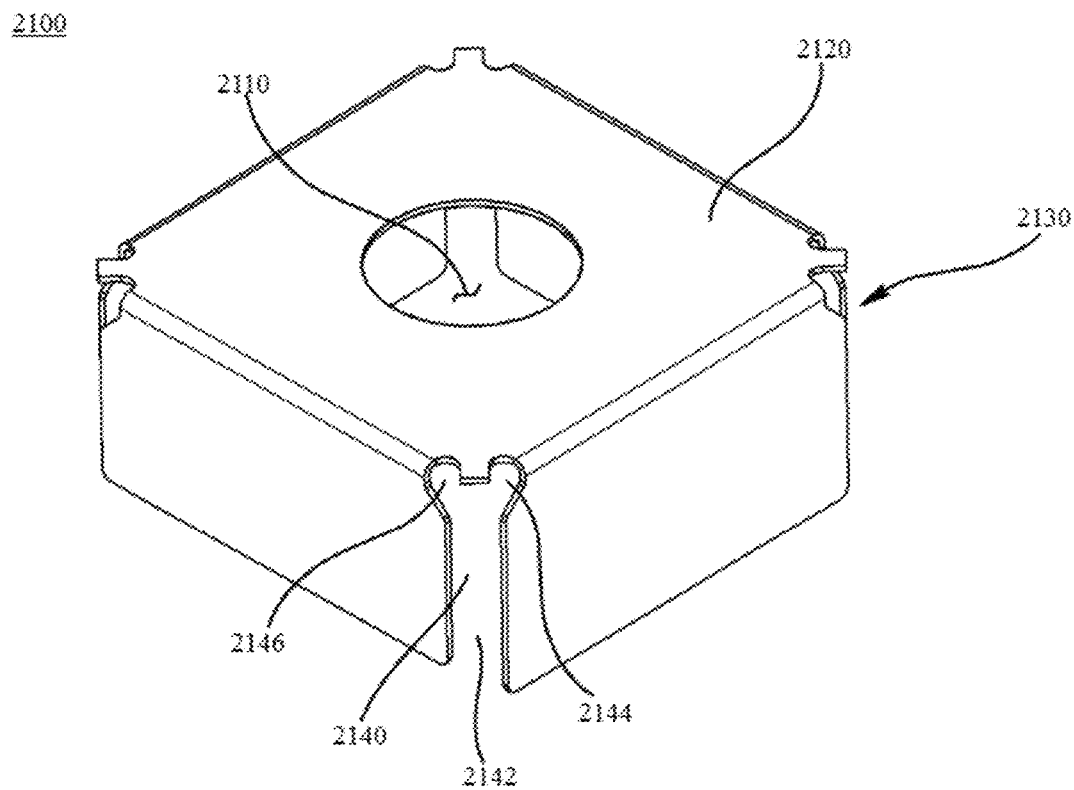
FIG. 18 is a perspective view showing a shield can according to a first embodiment.
Figure 19:
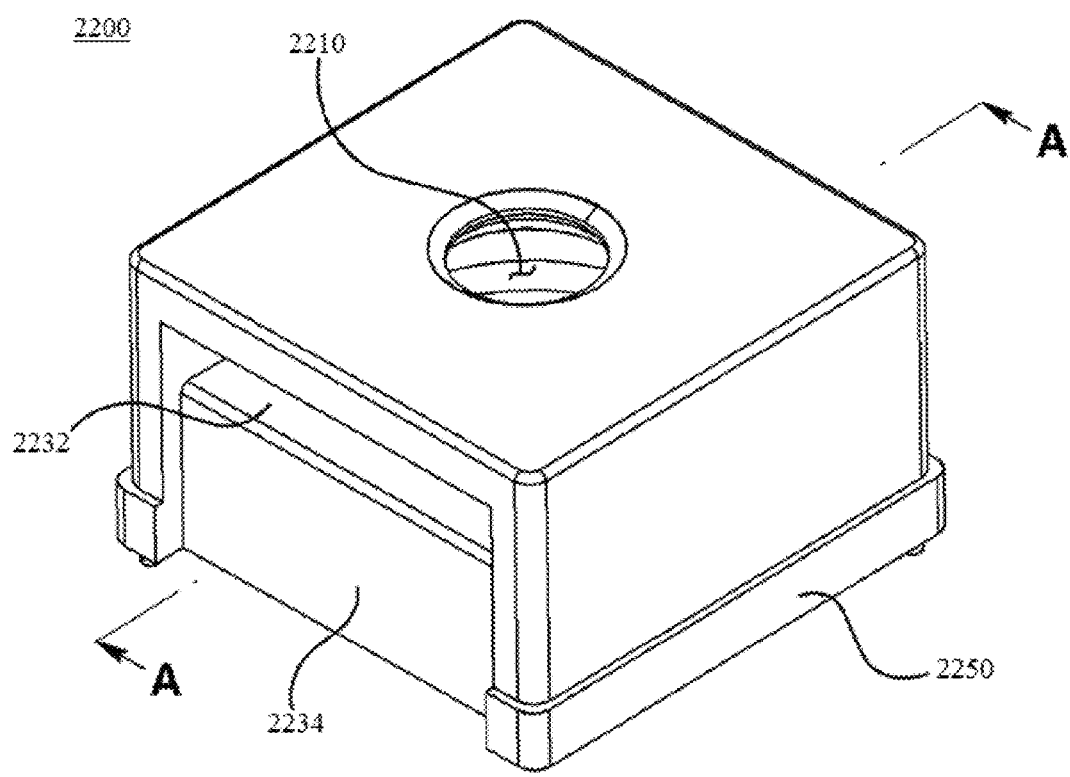
FIG. 19 is a perspective view showing a lens holder according to a first embodiment.
Figure 20:
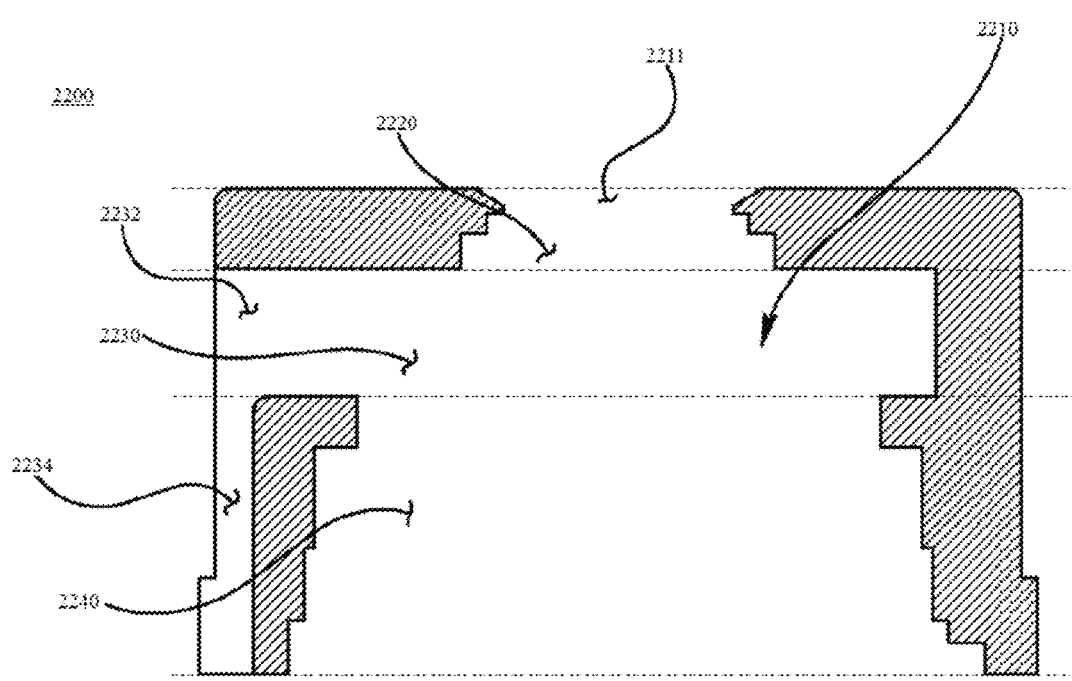
FIG. 20 is a sectional view showing the lens holder according to the first embodiment.
Figure 21:
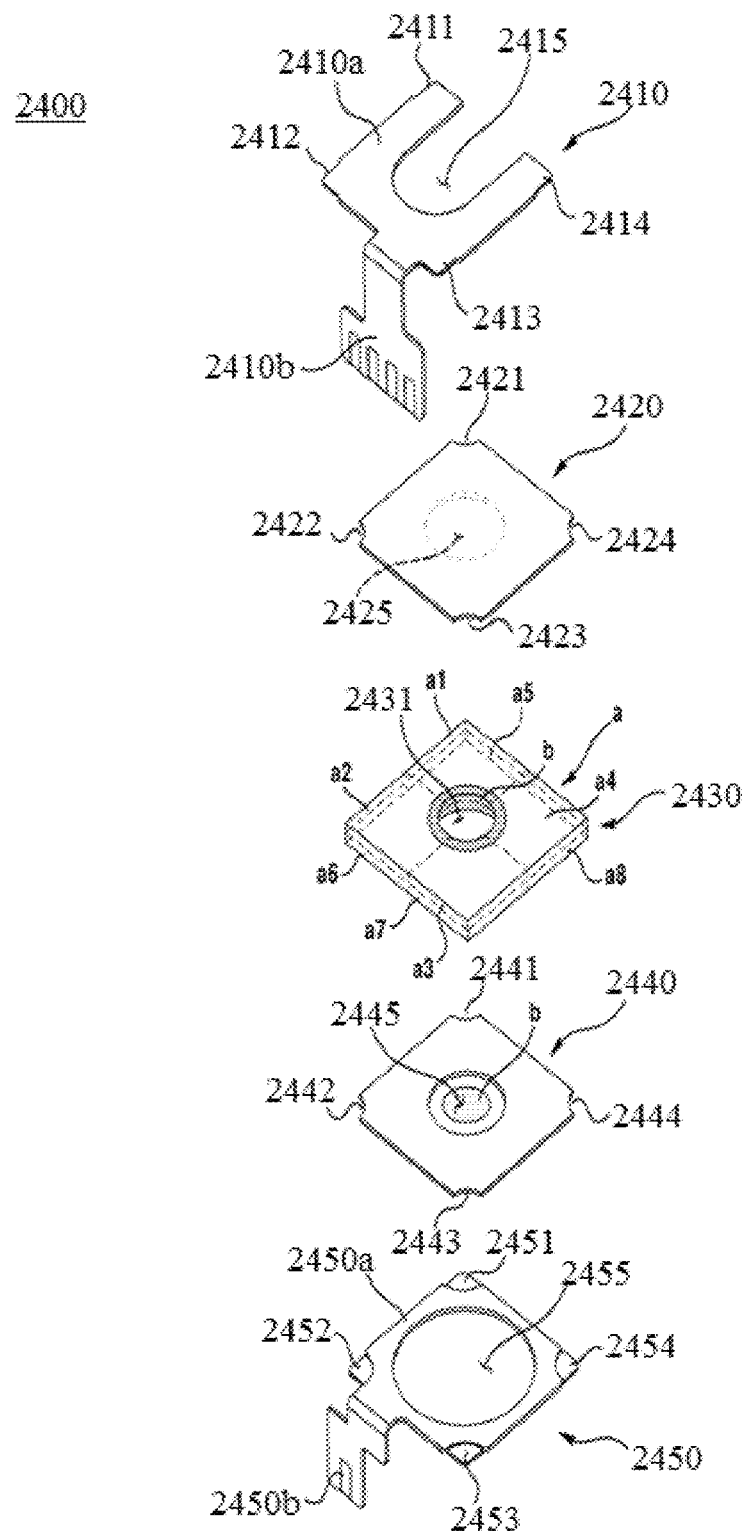
FIG. 21 is an exploded perspective view showing a liquid lens according to a first embodiment.
Figure 22:
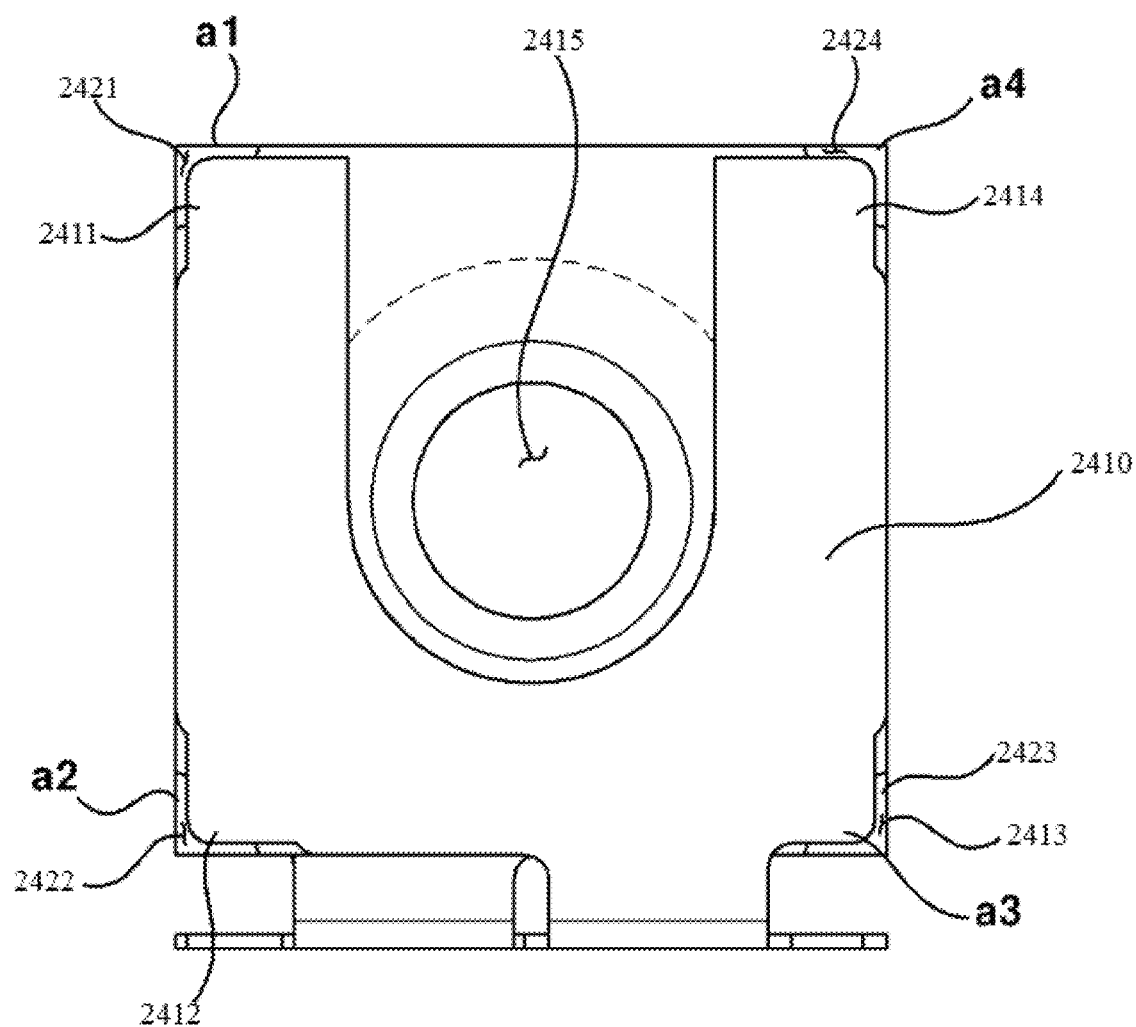
FIG. 22 is a plan view showing the liquid lens according to the first embodiment.
Figure 23A:
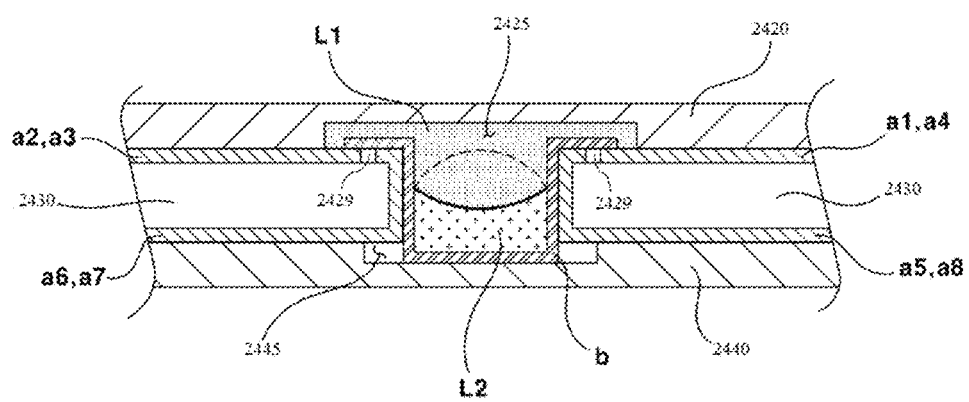
FIGS. 23A through 23L are conceptual sectional views showing that a conductive liquid and a nonconductive liquid are received in a cavity in first and second embodiments.
Figure 23B:
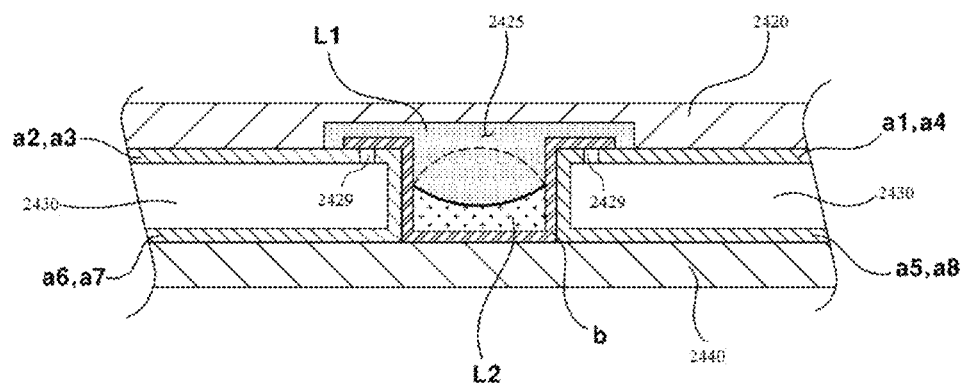
Figure 23C:
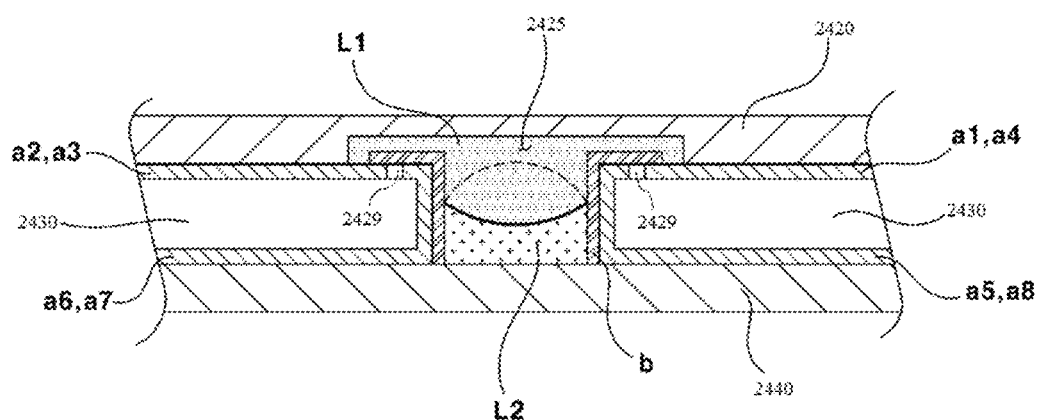
Figure 23D:
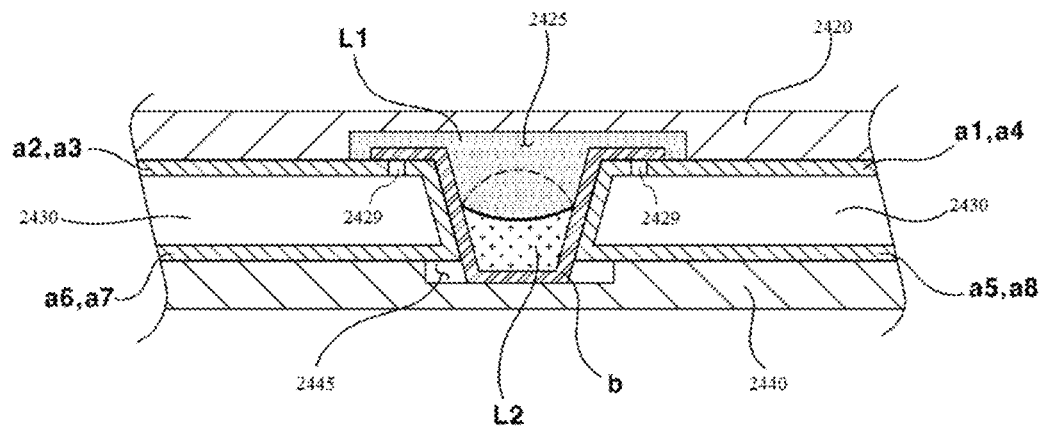
Figure 23E:
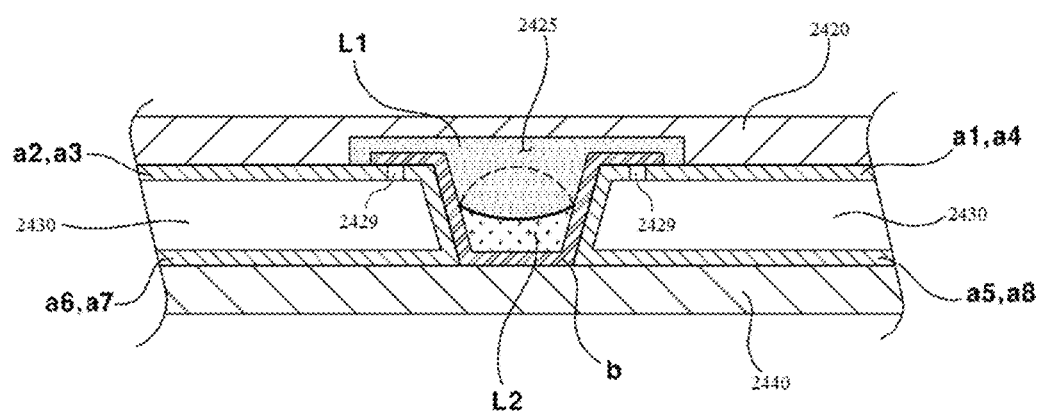
Figure 23F:
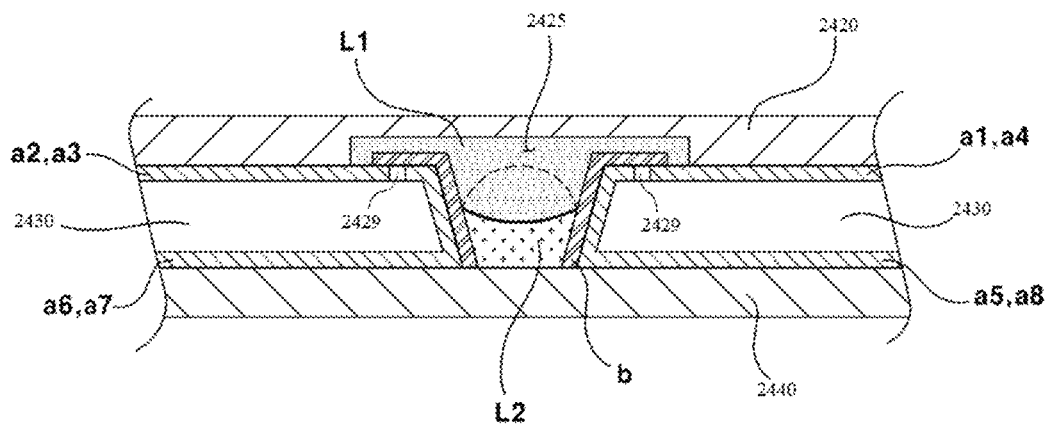
Figure 23G:
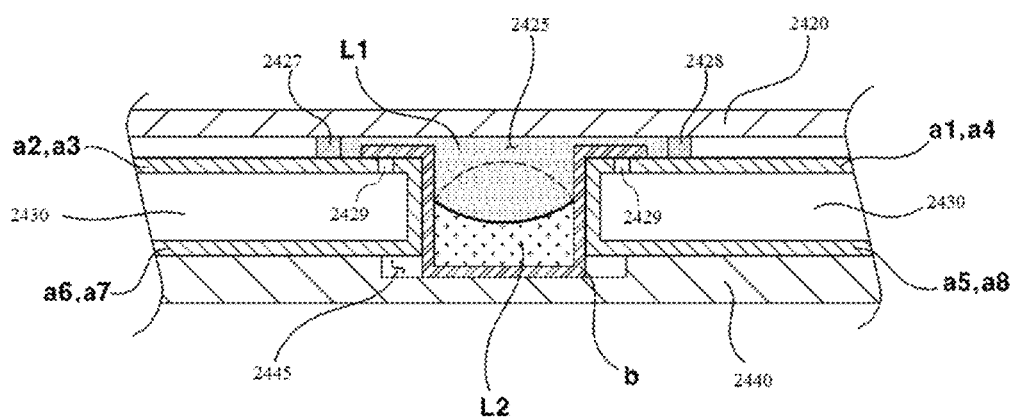
Figure 23H:
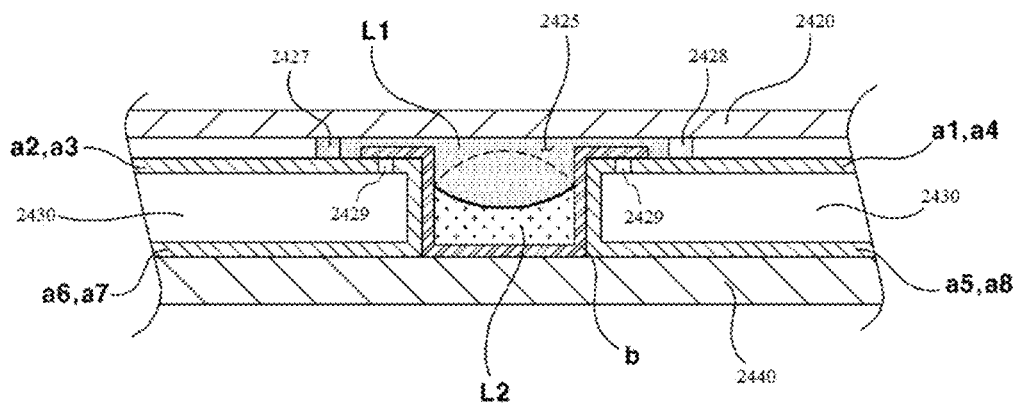
Figure 23I:
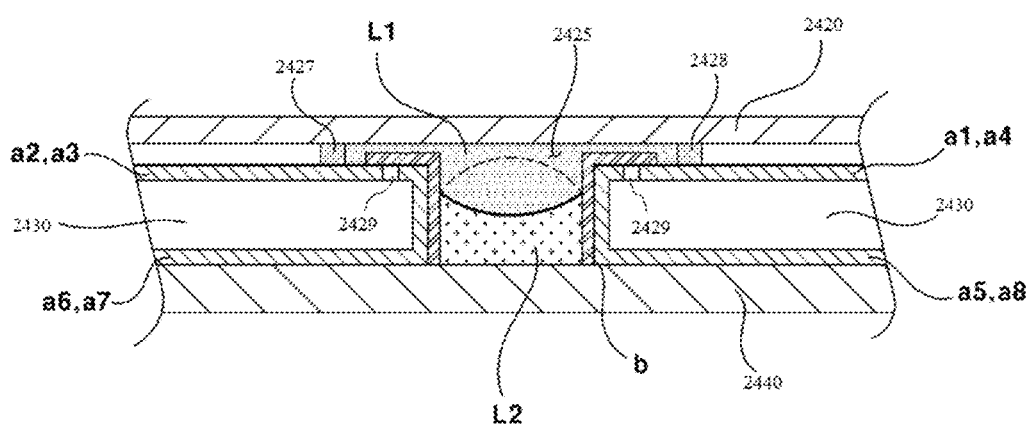
Figure 23J:
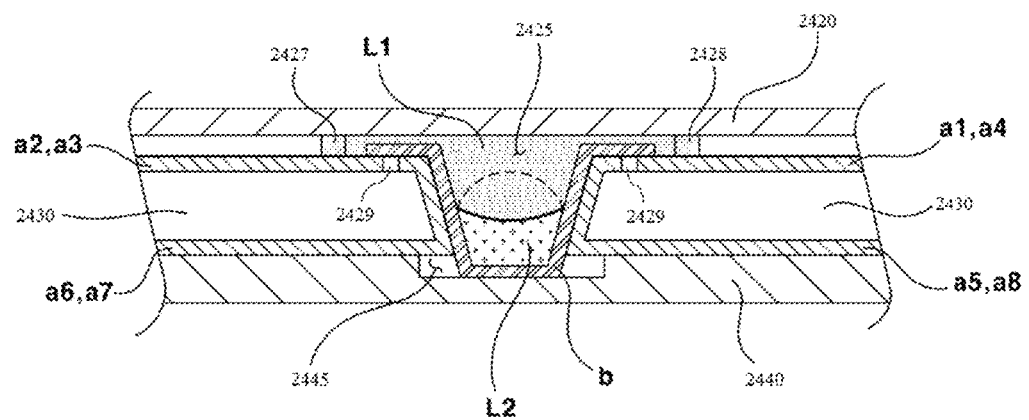
Figure 23K:
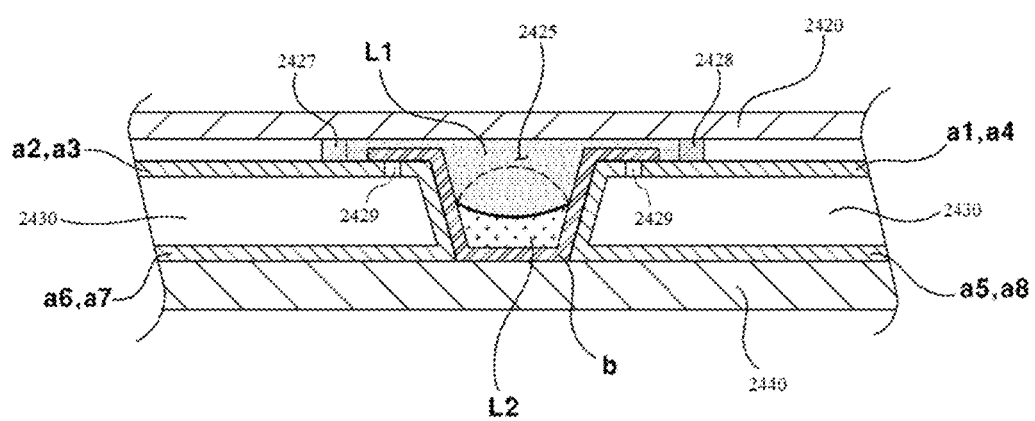
Figure 23L:
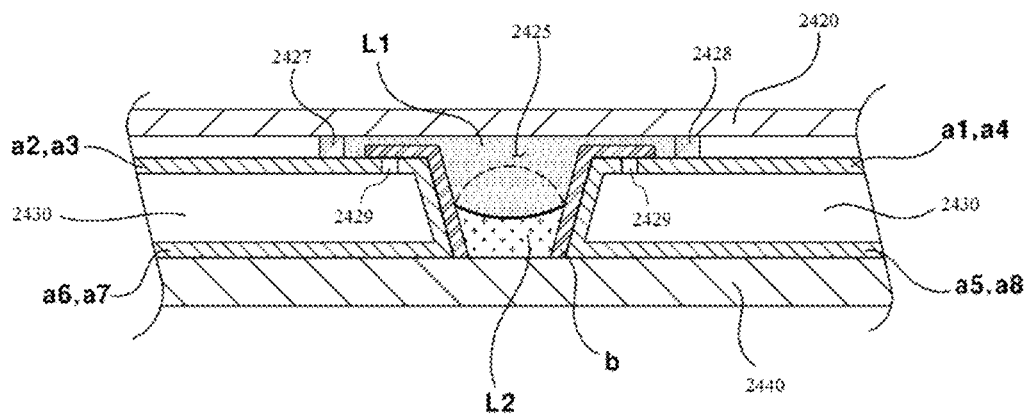
Figure 24:
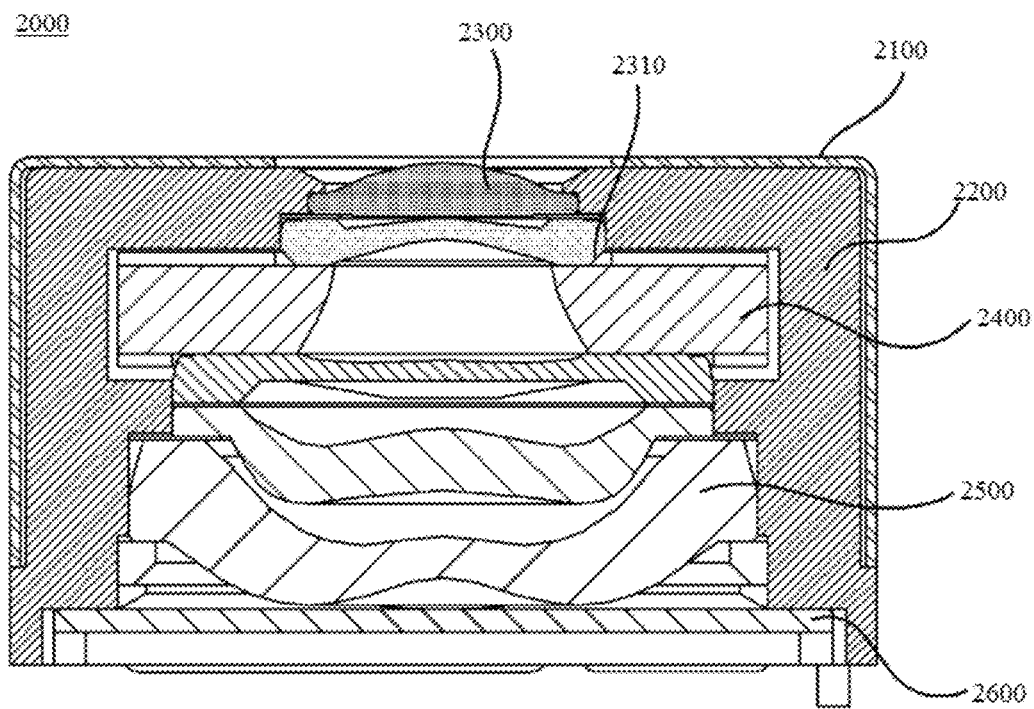
FIG. 24 is a sectional view showing the camera module according to the first embodiment.

FIG. 16 is a perspective view showing a camera module according to first and second embodiments, FIG. 17 is an exploded perspective view showing the camera module according to the first embodiment, FIG. 18 is a perspective view showing a shield can according to a first embodiment, FIG. 19 is a perspective view showing a lens holder according to a first embodiment, FIG. 20 is a sectional view showing the lens holder according to the first embodiment, FIG. 21 is an exploded perspective view showing a liquid lens according to a first embodiment, FIG. 22 is a plan view showing the liquid lens according to the first embodiment, FIGS. 23A to 23L are conceptual sectional views showing that a conductive liquid and a nonconductive liquid are received in a cavity in first and second embodiments, and FIG. 24 is a sectional view showing the camera module according to the first embodiment.

The camera module 2000 according to the first embodiment may be a camera module for AF. The camera module 2000 may be referred to as an "AF camera module." Alternatively, the camera module 2000 may be configured as a camera module for OIS.

The camera module 2000 may include a cover member 2100, a lens module, an infrared filter 2600, a main board 2700, an image sensor (not shown), and a controller (not shown). However, one or more selected from among the cover member 2100, the infrared filter 2600, the main board 2700 and the image sensor (not shown) may be omitted from the camera module 2000, or may be changed.

The cover member 2100 may define the external appearance of the camera module 2000. The cover member 2100 may be formed in the shape of a hexahedron having an open lower portion. However, the disclosure is not limited thereto. The cover member 2100 may be a nonmagnetic body. Alternatively, the cover member 2100 may be made of a metal sheet. In this case, the cover member 2100 may shield electromagnetic interference (EMI). Because of this characteristic of the cover member 2100, the cover member 2100 may be referred to as an "EMI shield can." The cover member 2100 may prevent electromagnetic waves generated outside the camera module 2000 from being introduced into the inside of the cover member 2100. In addition, the cover member 2100 may prevent electromagnetic waves generated inside the cover member 2100 from being discharged to the outside of the cover member 2100. However, the material for the cover member 2100 is not limited to the metal sheet.

The cover member 2100 may include an upper plate 2120 and a plurality of side plates 2130. The cover member 2100 may include an upper plate 2120 and a plurality of side plates 2130 extending downward from the outside of the upper plate 2120. The cover member 2100 may be located at the outer surface of the lens holder 2200. The cover member 2100 may abut the outer surface of the lens holder 2200. The lower ends of the side plates 2130 of the cover member 2100 may be mounted to the lens holder 2200. The lower ends of the side plates 2130 of the cover member 2100 may be mounted to a stair portion 2250 formed at the lower portion of the lens holder 2200.

The upper plate 2120 may be formed in the shape of a plate. The side plates 2130 may extend downward from respective sides of the upper plate 2120. In this case, the side plates 2130 may be integrally formed with the upper plate 2120. The upper plate 2120 may be provided in the center thereof with a first transmission window 2110. The first transmission window 2110 may be a circular hole formed in the center of the upper plate 2120, and the optical axis of the lens module, a description of which will follow, may extend through the center of the first transmission window 2110.

Consequently, the light reflected by a subject may be radiated to the lens module through the first transmission window 2110.

Several side plates 2130 may be provided. The side plates 2130 may extend downward from four sides of the upper plate 2120. Consequently, the number of side plates 2130 may be four. In addition, the side plates 2130 may be spaced apart from each other. The lower ends of the side plates 2130 may be mounted to the stair portion 2250, formed at the lower portion of the lens holder 2200.

Slits 2140 may be spaces between the respective side plates 2130. That is, the slits 2140 may be located between neighboring ones 2130 of the side plates 2130. The slits 2140 may be located along four vertical sides of the cover member 2100.

Each slit 2140 may include first, second, and third gaps 2142, 2144, and 2146. The first gap 2142 may be formed along each vertical side of the cover member 2100. In addition, the upper end of the first gap 2142 may be divided into two parts at each upper corner of the cover member 2100 in order to form the second and third gaps 2144 and 2146. The upper ends of the second and third gaps 2144 and 2146 may be round. As a result, the cover member 2100 may be formed from a single flat sheet in a developed state, and the side plates 2130 may be bent downward to form the cover member 2100. In this case, the side plates 2130 may be easily bent, since the upper ends of the second and third gaps 2144 and 2146 are round. Furthermore, stress is prevented from being concentrated at both ends of the bent portions of the side plates 2130, thereby preventing the occurrence of cracks.

The lens module may include a lens holder 2200, a first lens unit 2300, a liquid lens 2400, and a second lens unit 2500. The main board 2700 may be located at the lower side of the lens module. The lens module may be supported by the main board 2700. The lower end of the lens module may be mounted to the main board 2700. The lower end of the lens module may be mounted to the outside of the upper surface of the main board 2700. Light that has been transmitted through the lens module may be radiated to the image sensor, which is mounted on the inside of the upper surface of the main board 2700. In a modification (not shown), the lens module may include a base plate. In this case, the lower end of the lens module may be mounted to the base plate so as to be supported by the base plate. In addition, the main board may be located under the base plate. Furthermore, the base plate may be mounted to the outside of the upper surface of the main board.

The lens holder 2200 may be a block-shaped plastic mold. The lens holder 2200 may be manufactured by hole molding. The lens holder 2200 may be provided in the center thereof with a hole 2210 formed in the optical-axis direction. The lens holder 2200 may be provided with a hole 2210 formed through the center of the lens holder 2200 in the optical-axis direction.

The hole 2210 may be located in the lens holder 2200. The hole 2210 may be formed in the center of the lens holder 2200 in the optical-axis direction. The hole 2210 may be formed through the lens holder 2200 in the upward-downward direction. Consequently, the upper side and the lower side of the lens holder 2200 may be open through the hole 2210. The first lens unit 2300, the liquid lens 2400, and the second lens unit 2500 may be received in the hole 2210.

The hole 2210 may include a second transmission window 2211, a first lens receiving hole 2220, a second lens receiving hole 2230, an insertion hole 2232, and a third lens receiving hole 2240. The hole 2210 may be configured such that the second transmission window 2211, the first lens receiving hole 2220, the second lens receiving hole 2230, and the third lens receiving hole 2240 are sequentially located in that order from top and bottom. The first lens unit 2300, the liquid lens 2400, and the second lens unit 2500 may be sequentially received in the hole 2210 in that order from top and bottom. In this case, the optical axes of the first lens unit 2300, the liquid lens 2400, and the second lens unit 2500 may be aligned with one another.

The second transmission window 2211 may be located at the uppermost side of the hole 2210. The second transmission window 2211 may be circular. The second transmission window 2211 may be located under the first transmission window 2110 so as to be spaced apart from the first transmission window 2110. The first lens receiving hole 2220 may be located at the lower side of the second transmission window 2211.

The second transmission window 2211 and the first lens receiving hole 2220 may communicate with each other in the upward-downward direction. The second transmission window 2211 may be integrally formed with the first lens receiving hole 2220. That is, the second transmission window 2211 may be a portion of the first lens receiving hole 2220. In this case, the uppermost lens of the first lens unit 2300 may protrude through the second transmission window 2211.

The first lens receiving hole 2220 may be located in the center of the hole 2210. The second transmission window 2211 may be located at the upper side of the first lens receiving hole 2220. The second lens receiving hole 2230 may be located at the lower side of the first lens receiving hole 2220. The second transmission window 2211, the first lens receiving hole 2220, and the second lens receiving hole 2230 may communicate with each other in the upward-downward direction. The second transmission window 2211, the first lens receiving hole 2220, and the second lens receiving hole 2230 may be aligned with one another in the optical-axis direction. The first lens unit 2300 may be received in the first lens receiving hole 2220.

The second lens receiving hole 2230 may be located at the middle of the hole 2210. The first lens receiving hole 2220 may be located at the upper side of the second lens receiving hole 2230. The third lens receiving hole 2240 may be located at the lower side of the second lens receiving hole 2230. The first lens receiving hole 2220, the second lens receiving hole 2230, and the third lens receiving hole 2240 may communicate with each other in the upward-downward direction. The first lens receiving hole 2220, the second lens receiving hole 2230, and the third lens receiving hole 2240 may be aligned with one another in the optical-axis direction. The liquid lens 2400 may be received in the second lens receiving hole 2230. As a result, the optical axes of the first lens unit 2300 and the liquid lens 2400 may be aligned with each other.

The insertion hole 2232 may be formed in the side surface of the lens holder 2200. The insertion hole 2232 may be formed in the lens holder 2200 so as to be inclined with respect to the optical-axis direction. The insertion hole 2232 may be formed from the surface of the lens holder 2200 to the hole 2210 so as to be inclined with respect to the optical-axis direction. The insertion hole 2232 may be formed from the surface of the lens holder 2200 to the hole 2210 so as to be perpendicular to the optical-axis direction. The insertion hole 2232 may be formed through one side of the lens holder 2200 so as to be inclined with respect to the optical-axis direction. The insertion hole 2232 may be formed through one side of the lens holder 2200 so as to be perpendicular to the optical-axis direction. That is, a portion of one side of the lens holder 2200 may be open through the insertion hole 2232. The insertion hole 2232 may communicate with the hole 2210. The insertion hole 2232 may communicate with the second lens receiving hole 2230. As a result, the liquid lens 2400 may be laterally inserted into the lens holder 2200 through the insertion hole 2232 so as to be received in the second lens receiving hole 2230. A board receiving recess 2234 extending downward to communicate with the insertion hole 2232 may be formed in one side of the lens holder 2200 through which the insertion hole 2232 is formed. An upper connection board 2410*b* and a lower connection board 2450*b*, a description of which will follow, may be received in the board receiving recess 2234. The board receiving recess 2234 may extend to the lower end of the lens holder 2200. Since the upper connection board 2410*b* and the lower connection board 2450*b* are located along the board receiving recess 2234, the upper connection board 2410*b* and the lower connection board 2450*b* may be connected to the main board 2700 located under the lens holder 2200.

The third lens receiving hole 2240 may be disposed in the hole 2210. The second lens receiving hole 2230 may be located at the upper side of the third lens receiving hole 2240. The second lens receiving hole 2230 and the third lens receiving hole 2240 may communicate with each other in the upward-downward direction. The second lens receiving hole 2230 and the third lens receiving hole 2240 may be aligned with each other in the optical-axis direction. The second lens unit 2500 may be received in the third lens receiving hole 2240. As a result, the optical axes of the liquid lens 2400 and the second lens unit 2500 may be aligned with each other.

Generally, the size of the liquid lens 2400 is greater than the size of each of the other lenses. When the liquid lens 2400 is inserted through the lower opening of the hole 2210, therefore, an upper hole for receiving the first lens unit 2300 and the liquid lens 2400 and a lower hole for receiving the second lens unit 2500 are needed. Since the holes are formed through separate hole molding processes, the optical axes of the upper hole and the lower hole may not be aligned with each other. In the first embodiment, however, the liquid lens 2400 is inserted laterally through the insertion hole 2232. As a result, all of the first lens unit 2300, the liquid lens 2400, and the second lens unit 2500 may be received in a single hole 2210. That is, all lenses are received in a single hole 2210 formed through a single hole molding process, with the result that optical-axis twisting does not occur.

The first lens unit 2300 may include one or more lenses. The first lens unit 2300 may include two lenses. The lenses of the first lens unit 2300 may be located in the state of being stacked. The first lens unit 2300 may be received in the first lens receiving hole 2220. The lenses of the first lens unit 2300 may be configured such that the upper portion of each lens abuts the stair of the first lens receiving hole 2220 or an O-ring and such that the lower portion of each lens is supported and fixed by the lower lens or an O-ring. The lower portion of the lowermost lens of the first lens unit 2300 may abut the upper surface of an upper plate 2420 of the liquid lens 2400, a description of which will follow. The lower portion of the lowermost lens of the first lens unit 2300 may be supported and fixed by the upper surface of the upper plate 2420 of the liquid lens 2400, a description of which will follow.

An inclined portion 2310 may be located along the outer circumference of the lower surface of the lowermost lens of the first lens unit 2300. In this case, the inclined portion 2310 may be formed so as to be inclined downward toward the side of the lens holder 2200. In the case in which the outer circumference of the lower surface of the lowermost lens is angled, there may be friction with the upper plate 2420 when the liquid lens 2400 is inserted. In order to prevent this, the inclined portion 2310 is required.

Figure 15:
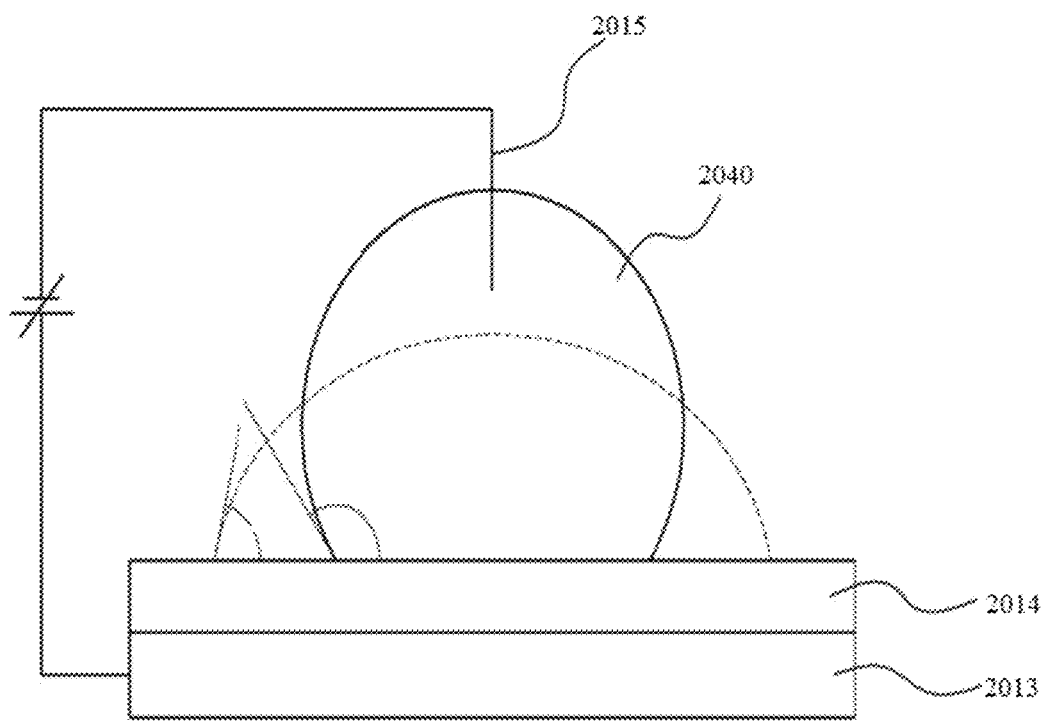
FIG. 15 is a conceptual view showing an electrowetting phenomenon.

The liquid lens 2400 is a lens that controls the curvature of the interface between a conductive liquid and a nonconductive liquid to perform AF and OIS functions. When the conductive liquid and the nonconductive liquid are received, an electrode and an insulator are stacked, and voltage is applied to the electrode, an electrowetting phenomenon, in which the contact angle between the conductive liquid and the inner surface of the cavity coated with the insulator is changed depending on the magnitude of the applied voltage, occurs. The electrowetting phenomenon will be described in more detail with reference to FIG. 15. When a conductive liquid drop 2040 is dropped to the upper surface of an insulation film 2014, which is electrically insulated, the conductive liquid drop has a spherical shape, as indicated by the solid line in FIG. 15. When voltage is applied to a second electrode 2015 between a first electrode 2013 under the insulation film 2014 and the conductive liquid drop 2040, an electrowetting phenomenon, in which the contact angle between the conductive liquid drop 2040 and the upper surface of the insulation film 2013 is changed, occurs, as indicated by the dotted line in FIG. 15. Furthermore, when the position to which voltage is applied is changed, the position at which the electrowetting phenomenon occurs is changed. In the liquid lens 2400, the curvature of the interface between the conductive liquid and the nonconductive liquid is changed due to the electrowetting phenomenon, and the AF and OIS functions may be performed by controlling the curvature of the interface.

In the following description, the liquid lens 2400 according to the first embodiment is configured such that an upper electrode unit includes first to fourth electrodes a1, a2, a3, and a4 and such that an inner wall electrode unit includes fifth to eighth electrodes a5, a6, a7, and a8.

The liquid lens 2400 may be located in the lens holder 2200. The liquid lens 2400 may be received in the hole 2210. The liquid lens 2400 may be received in the second lens receiving hole 2230 through the insertion hole 2232. The liquid lens 2400 may be configured such that the upper portion of the liquid lens abuts the lower surface of the lowermost lens of the first lens unit 2300 and the upper surface of the second lens receiving hole 2230 and such that the lower portion of the liquid lens is supported and fixed by the upper surface of the uppermost lens of the second lens unit 2500 and the lower surface of the second lens receiving hole 2230. The liquid lens 2400 may be inserted through one side of the lens holder 2200 so as to be received in the hole 2210. The liquid lens 2400 may be received in the second lens receiving hole 2230 through the insertion hole 2232. The liquid lens 2400 may be connected to the main board 2700. The curvature of the interface of the liquid lens 2400 may be controlled.

The liquid lens 2400 may be located in the lens holder 2200. The liquid lens 2400 may be received in the hole 2210. The liquid lens 2400 may be received in the second lens receiving hole 2230 through the insertion hole 2232. The liquid lens 2400 may be configured such that the upper portion of the liquid lens abuts the lower surface of the lowermost lens of the first lens unit 2300 and the upper surface of the second lens receiving hole 2230 and such that the lower portion of the liquid lens is supported and fixed by the upper surface of the uppermost lens of the second lens unit 2500 and the lower surface of the second lens receiving hole 2230. The liquid lens 2400 may be inserted through one side of the lens holder 2200 so as to be received in the hole 2210. The liquid lens 2400 may be received in the second lens receiving hole 2230 through the insertion hole 2232. The liquid lens 2400 may be connected to the main board 2700. The curvature of the interface of the liquid lens 2400 may be controlled.

The liquid lens 2400 may be configured such that boards and plates are stacked. The liquid lens 2400 may include an upper board 2410, an upper plate 2420, a core plate 2430, a lower plate 2440, and a lower board 2450.

The upper board 2410 may be an upper portion of the liquid lens 2400. The upper plate 2420 may be located under the upper board 2410. The upper plate 2420 may be located between the upper board 2410 and the core plate 2430. The upper surface of the upper board 2410 may abut the upper inner wall of the second lens receiving hole 2230. The upper board 2410 may be connected to electrodes disposed on the core plate 2430. The upper board 2410 may be connected to the main board 2700. The upper board 2410 may supply power to an electrode unit a of the core plate 2430, a description of which will follow, under the control of the main board 2700. The upper board 2410 may change the direction, intensity, and wavelength of the current that is supplied to the electrode unit a and the position to which the current is supplied.

The upper board 2410 may include an upper circuit board 2410a and an upper connection board 2410b.

The upper circuit board 2410a may be a printed circuit board (PCB). The upper circuit board 2410a may be formed in the shape of a plate. The upper circuit board 2410a may be formed in the shape of a quadrangular plate.

The upper circuit board 2410a may be provided at a portion thereof corresponding to (opposite to) a cavity 2431, a description of which will follow, or a portion thereof radially extending from the portion thereof corresponding to (opposite to) the cavity 2431 with an upper guide hole 2415 extending to one side. The one side may be the side located at the entrance in the direction in which the liquid lens 2400 is inserted through the insertion hole 2232. When the liquid lens 2400 is inserted, therefore, the friction between the lower surface of the lowermost lens of the first lens unit 2300 and the upper circuit board 2410a may be minimized. The lower surface of the lowermost lens of the first lens unit 2300 may be supported by the upper guide hole 2415 in the state of abutting the upper plate 2420. As a result, the lens of the first lens unit 2300, which has already been inserted, may be fixed at a predetermined position without moving. Furthermore, the upper circuit board 2410a may be prevented from being worn or from being separated from the upper plate 2420 or the core plate 2430 due to friction caused when the liquid lens 2400 is inserted.

The upper circuit board 2410a may be provided with a first upper corner 2411, a second upper corner 2412, a third upper corner 2413, and a fourth upper corner 2414, which are arranged in the counterclockwise direction. The first to fourth upper corners 2411, 2412, 2413, and 2414 may be located further inward than the corners of the core plate 2430. That is, the corners of the upper board 2410 may be located inward from the corners of the core plate 2430. When the liquid lens 2400 is inserted, therefore, the friction between the first to fourth upper corners 2411, 2412, 2413, and 2414 and the upper inner wall and the side wall of the second lens receiving hole 2230 may be minimized. As a result, the first to fourth upper corners 2411, 2412, 2413, and 2414 may be prevented from being separated from the core plate 2430, whereby the upper circuit board 2410a may be prevented from being separated from the core plate 2430. In a modification (not shown), the sides of the upper circuit board 2410a may be located further inward than the sides of the core plate 2430.

The first to fourth upper corners 2411, 2412, 2413, and 2414 may be connected to the core plate 2430. The first to fourth upper corners 2411, 2412, 2413, and 2414 may be connected to the electrode unit a of the core plate 2430 corresponding thereto (opposite thereto). The first upper corner 2411 may be connected to the first electrode a1. The second upper corner 2412 may be connected to the second electrode a2. The third upper corner 2413 may be connected to the third electrode a3. The fourth upper corner 2414 may be connected to the fourth electrode a4. The first to fourth upper corners 2411, 2412, 2413, and 2414 may be connected to the first to fourth electrodes a1, a2, a3, and a4 via four upper conduction portions (not shown). In this case, the upper conduction portions (not shown) may extend through first to fourth upper recesses 2421, 2422, 2423, and 2424 corresponding to (opposite to) the first to fourth upper corners 2411, 2412, 2413, and 2414, a description of which will follow. In addition, each of the upper conduction portions may be conductive epoxy. As a result, the first to fourth upper corners 2411, 2412, 2413, and 2414 may be adhered to the first to fourth electrodes a1, a2, a3, and a4 via the conductive epoxy. In addition, each of the upper conduction portions may be an electrode pad.

In a modification (not shown), recesses may be formed in the sides of the upper plate. The recesses formed in the upper plate may be concave toward the inside of the core plate.

The upper connection board 2410b may be a flexible printed circuit board (FPCB). The upper connection board 2410b may be connected to the upper circuit board 2410a. The upper connection board 2410b may be connected to the main board 2700. As a result, the main board 2700 may supply power to the first to fourth electrodes a1, a2, a3, and a4 via the upper connection board 2410b and the upper circuit board 2410a.

The upper connection board 2410b may extend downward from the other side of the upper circuit board 2410a. The other side may be a side located at the end in the direction in which the liquid lens 2400 is inserted through the insertion hole 2232. The junction between the upper connection board 2410b and the upper circuit board 2410a may be round. The upper connection board 2410b may be received in the board receiving recess 2234, and may extend downward. In this case, the upper connection board 2410b may be protected from the outside, since the cover member 2100 is located outside the upper connection board.

The upper plate 2420 may be located under the upper board 2410. The upper plate 2420 may abut the upper board 2410. The upper plate 2420 may be located on the core plate 2430. The upper plate 2420 may abut the core plate 2430. The upper surface of the upper plate 2420 may abut the lower surface of the lowermost lens of the first lens unit 2300 extending through a first guide hole 2415. As a result, the lowermost lens of the first lens unit 2300 may be supported by the upper plate 2420.

The upper plate 2420 may be made of a transparent material. The upper plate 2420 may be insulative. The upper plate 2420 may be made of a glass material. The upper plate 2420 may have an antireflection coating surface. The upper plate 2420 may cover the upper portion of the cavity 2431, a description of which will follow. Consequently, the upper plate 2420 may be referred to as a cover glass. A fifth upper recess 2425 may be located in the center of the lower surface of the upper plate 2420. As will be described below, in the first embodiment, a conductive liquid L1 is located in the upper portion of the cavity 2431 and a nonconductive liquid L2 is located in the lower portion of the cavity 2431, with the result that the fifth upper recess 2425 may be filled with the conductive liquid L1 received in the cavity 2431. The fifth upper recess 2425 may correspond to (may be opposite to) an insulation portion b coated in a ring shape on the upper surface of the middle plate 2430, a description of which will follow. The area of the fifth upper recess 2425 may be greater than the area of the insulation portion b coated in the ring shape on the upper surface of the middle plate 2430. As a result, the conductive liquid in the fifth upper recess 2425 may abut the first to fourth electrodes a1, a2, a3, and a4.

The upper plate 2420 may be provided at the angular points, the outer circumference, or the corners thereof with a first upper recess 2421, a second upper recess 2422, a third upper recess 2423, and a fourth upper recess 2424, which are arranged in the counterclockwise direction. The corners of the upper plate 2420 may be cut inward to form the first upper recess 2421, the second upper recess 2422, the third upper recess 2423, and the fourth upper recess 2424 in the counterclockwise direction. The first to fourth upper recesses 2421, 2422, 2423, and 2424 may be located between the first to fourth upper corners 2411, 2412, 2413, and 2414 and the first to fourth electrodes a1, a2, a3, and a4. The first to fourth upper corners 2411, 2412, 2413, and 2414 may be connected to the first to fourth electrodes a1, a2, a3, and a4 via the first to fourth upper recesses 2421, 2422, 2423, and 2424. The first to fourth upper corners 2411, 2412, 2413, and 2414 may be connected to the first to fourth electrodes a1, a2, a3, and a4 via the upper conduction portions (not shown) extending through the first to fourth upper recesses 2421, 2422, 2423, and 2424. In this case, each of the upper conduction portions may be conductive epoxy. In addition, each of the upper conduction portions may be an electrode pad.

The core plate 2430 may be located under the upper plate 2420. The core plate 2430 may abut the upper plate 2420. The core plate 2430 may be located on the lower plate 2440. The core plate 2430 may abut the lower plate 2440. The core plate 2430 may be provided in the center thereof with a cavity 2431. A first liquid L1 and a second liquid L2 may be received in the cavity 2431. The core plate 2430 may be provided with a cavity 2431 formed through the center of the core plate 2430. An electrode unit a may be coated on the surface of the core plate 2430 and on the inner surface of the cavity 2431. The upper electrode unit may be disposed at the upper portion of the core plate 2430. The upper electrode unit may include first to fourth electrodes a1, a2, a3, and a4, which are separated from each other. An inner wall electrode unit, which extends to the upper portion of the core plate 2430 and the lower portion of the core plate 2430, may be disposed on the inner wall of the cavity 2431. The inner wall electrode unit may include fifth to eighth electrodes a5, a6, a7, and a8, which are separated from each other. The upper electrode unit and the inner wall electrode unit may be interrupted at the upper portion (the upper surface) of the core plate 2430. The electrode unit a on the inner wall of the cavity 2431 may be coated with an insulation layer b. In addition, the electrode unit a on the upper surface of the core plate 2430 around the cavity 2431 may be coated with an insulation layer b. The core plate 2430 may be connected to the upper board 2410. The core plate 2430 may be connected to the lower board 2450.

The cavity 2431 may be located in the core plate 2430. The cavity 2431 may be located in the center of the core plate 2430. The cavity 2431 may be formed through the core plate 2430. The cavity 2431 may be configured such that the width of the cavity decreases from top to bottom. The cavity 2431 may be configured such that the horizontal sectional area of the cavity decreases from top to bottom. The first liquid L1 and the second liquid L2 may be received in the cavity 2431. The electrode unit a may be coated on the inner wall of the cavity 2431. The inner wall electrodes a5, a6, a7, and a8 may be coated on the inner wall of the cavity 2431.

The electrode unit a may be made of a conductive metal. The electrode unit a may include an upper electrode unit and an inner wall electrode unit. The upper electrode unit may include first to fourth electrodes a1, a2, a3, and a4. The inner wall electrode unit may include fifth to eighth electrodes a5, a6, a7, and a8. The electrode unit a may be coated on the surface of the core plate 2430. The electrode unit a may be connected to the upper board 2410. The electrode unit a may be connected to the upper board 2410 via upper conduction portions (not shown). In this case, each of the upper conduction portions may be conductive epoxy. In addition, each of the upper conduction portions may be an electrode pad. The electrode unit a may be connected to the lower board 2450. The electrode unit a may be connected to the lower board 2450 via lower conduction portions (not shown). In this case, each of the lower conduction portions may be conductive epoxy or an electrode pad.

The first to fourth electrodes a1, a2, a3, and a4 (the upper electrode unit) may be disposed on the upper portion (the upper surface) of the core plate 2430. Furthermore, the first to fourth electrodes a1, a2, a3, and a4 may abut the first liquid L1 to apply voltage to the first liquid L1. The first to fourth electrodes a1, a2, a3, and a4 may divide the upper portion (the upper surface) of the core plate 2430 into four sectors in the counterclockwise direction.

The fifth to eighth electrodes a5, a6, a7, and a8 (the inner wall electrode unit) may be disposed on the inner wall of the cavity 2431 and the lower surface and the upper surface of the core plate 2430. The fifth to eighth electrodes a5, a6, a7, and a8 may divide the inner wall of the cavity 2431 and the lower surface and the upper surface of the core plate 2430 into four sectors in the counterclockwise direction. The insulation layer b may be interposed between the fifth to eighth electrodes a5, a6, a7, and a8 (the inner wall electrode unit) and the first and second liquids L1 and L2. That is, the fifth to eighth electrodes a5, a6, a7, and a8 (the inner wall electrode unit) do not abut the first and second liquids L1 and L2.

The first to fourth electrodes a1, a2, a3, and a4 (the upper electrode unit) and the fifth to eighth electrodes a5, a6, a7, and a8 (the inner wall electrode unit) may not be connected to each other on the upper portion (the upper surface) of the core plate 2430. That is, the first to fourth electrodes a1, a2, a3, and a4 (the upper electrode unit) and the fifth to eighth electrodes a5, a6, a7, and a8 (the inner wall electrode unit) may be interrupted on the upper portion of the core plate 2430.

The corners of the first to fourth electrodes a1, a2, a3, and a4 may correspond to (may be opposite to) the first to fourth upper corners 2411, 2412, 2413, and 2414 of the upper board 2410, respectively. The first to fourth upper corners 2411, 2412, 2413, and 2414 of the upper board 2410 may be connected to corners of the first to fourth electrodes a1, a2, a3, and a4 corresponding thereto (opposite thereto) via the four upper conduction portions. In this case, the first electrode a1 and the first upper corner 2411 may be connected to each other via the upper conduction portion extending (passing) through the first upper recess 2421. In addition, the second electrode a2 and the second upper corner 2412 may be connected to each other via the upper conduction portion extending (passing) through the second upper recess 2422. In addition, the third electrode a3 and the third upper corner 2413 may be connected to each other via the upper conduction portion extending (passing) through the third upper recess 2423. In addition, the fourth electrode a4 and the fourth upper corner 2414 may be connected to each other via the upper conduction portion extending (passing) through the fourth upper recess 2424. In this case, each of the upper conduction portions may be conductive epoxy or an electrode pad. As a result, power may be supplied to the first to fourth electrodes a1, a2, a3, and a4 via the upper board 2410. Furthermore, power may be supplied to only some of the first to fourth electrodes a1, a2, a3, and a4. In addition, the intensity and polarity of the power supplied to the first to fourth electrodes a1, a2, a3, and a4 may be controlled.

The corners of the fifth to eighth electrodes a5, a6, a7, and a8 may correspond to (may be opposite to) first to fourth lower corners 2451, 2452, 2453, and 2454 of the lower board 2450, respectively. The first to fourth lower corners 2451, 2452, 2453, and 2454 of the lower board 2450 may be connected to the corners of the fifth to eighth electrodes a5, a6, a7, and a8 corresponding thereto (opposite thereto) via four lower conduction portions (not shown). In this case, the fifth electrode a5 and the first lower corner 2451 may be connected to each other via a lower conduction portion extending (passing) through a first lower recess 2441. In addition, the sixth electrode a6 and the second lower corner 2452 may be connected to each other via a lower conduction portion extending (passing) through a second lower recess 2442. In addition, the seventh electrode a7 and the third lower corner 2453 may be connected to each other via a lower conduction portion extending (passing) through a third lower recess 2443. In addition, the eighth electrode a8 and the fourth lower corner 2454 may be connected to each other via a lower conduction portion extending (passing) through a fourth lower recess 2444. In this case, each of the lower conduction portions may be conductive epoxy or an electrode pad. As a result, power may be supplied to the fifth to eighth electrodes a5, a6, a7, and a8 via the lower board 2450. Furthermore, power may be supplied to only some of the fifth to eighth electrodes a5, a6, a7, and a8. In addition, the intensity and polarity of the power supplied to the fifth to eighth electrodes a5, a6, a7, and a8 may be controlled.

The insulation layer b may be made of an insulative polymer. The insulation layer b may be a parylene coating. The insulation layer b may be made of an insulative (non-conductive) oxide. The insulation layer b may be coated on the electrode unit a. The insulation layer b may be coated on the electrode unit a by stacking. The insulation layer b may be coated on the electrode unit a along the inner wall of the cavity 2431. The insulation layer b may be coated on the lower plate 2440 opposite to the cavity 2431. In this case, the insulation layer b may abut the upper surface of the lower plate 2440. In addition, the insulation layer b may abut a fifth lower recess 2445 of the lower plate 2440, a description of which will follow. The insulation layer b may be coated on the electrode unit a along the circumference of the cavity 2431 on the upper surface of the core plate 2430. The insulation layer b disposed on the inner wall of the cavity 2431, the insulation layer b disposed on the lower plate 2440, and the insulation layer b disposed along the circumference of the cavity 2431 on the upper surface of the core plate 2430 may be integrally formed. As a result, the insulation layer b may abut the first liquid L1 and the second liquid L2, and may receive the first liquid L1 and the second liquid L2. The thickness of the insulation layer b may be 200 nm or more. Particularly, if the thickness of the insulation layer b disposed on the lower plate 2440 is less than 200 nm, the insulation layer b may be worn during the use thereof, which is undesirable. The light transmittance of the insulation layer b may be 85% or more. In particular, for light having a wavelength of 430 nm to 680 nm, the transmittance of the insulation layer b may be 85% or more. If the transmittance of the insulation layer is less than 85%, the amount of light that is radiated to the image sensor is not sufficient, whereby the resolution of output images or video is reduced.

The lower plate 2440 may be located on the lower board 2450. The lower plate 2440 may abut the lower board 2450. The lower plate 2440 may be located under the core plate 2430. The lower plate 2440 may abut the core plate 2430. The lower surface of the lower plate 2440 may abut the upper surface of the uppermost lens of the second lens unit 2500 extending through a second guide hole 2455. As a result, the uppermost lens of the second lens unit 2500 may be supported by the lower plate 2440. In a modification (not shown), recesses may be formed in the sides of the lower plate. The recesses formed in the upper plate may be concave toward the inside of the core plate.

The lower plate 2440 may be made of a transparent material. The lower plate 2440 may be insulative. The lower plate 2440 may be made of a glass material. The lower plate 2440 may have an antireflection coating surface. The lower plate 2440 may cover the upper portion of the cavity 2431, a description of which will follow. Consequently, the lower plate 2440 may be referred to as a cover glass. An insulation layer b may be formed on the lower plate 2440. The portion of the upper surface of the lower plate 2440 opposite to the cavity 2431 may be coated with the insulation layer b. A fifth lower recess 2445 may be located in the center of the lower surface of the lower plate 2440. The fifth lower recess 2445 in the lower plate 2440 may be coated with the insulation layer b. As a result, the second liquid L2 in the fifth lower recess 2445 does not abut the fifth to eighth electrodes a5, a6, a7, and a8.

The lower plate 2440 may be provided at the corners thereof with a first lower recess 2441, a second lower recess 2442, a third lower recess 2443, and a fourth lower recess 2444, which are arranged in the counterclockwise direction. The corners of the lower plate 2440 may be cut inward to form the first lower recess 2441, the second lower recess 2442, the third lower recess 2443, and the fourth lower recess 2444 in the counterclockwise direction. The first to fourth lower recesses 2441, 2442, 2443, and 2444 may be located between the first to fourth lower corners 2451, 2452, 2453, and 2454 and the fifth to eighth electrodes a5, a6, a7, and a8. The first to fourth lower corners 2451, 2452, 2453, and 2454 may be connected to the fifth to eighth electrodes a5, a6, a7, and a8 via the first to fourth lower recesses 2441, 2442, 2443, and 2444. The first to fourth lower corners 2451, 2452, 2453, and 2454 may be connected to the fifth to eighth electrodes a5, a6, a7, and a8 via lower conduction portions (not shown) extending through the first to fourth lower recesses 2441, 2442, 2443, and 2444. In this case, each of the lower conduction portions may be conductive epoxy.

The lower board 2450 may be the lowermost portion of the liquid lens 2400. The lower plate 2440 may be located on the lower board 2450. The lower surface of the lower board 2450 may abut the lower inner wall of the second lens receiving hole 2230. The lower board 2450 may be connected to the core plate 2430. The lower board 2450 may be connected to the main board 2700. The lower board 2450 may supply power to the fifth to eighth electrodes a5, a6, a7, and a8 of the core plate 2430, a description of which will follow, under the control of the main board 2700. The lower board 2450 may change the direction, intensity, and wavelength of the current that is supplied to the fifth to eighth electrodes a5, a6, a7, and a8 and the position to which the current is supplied.

The lower board 2450 may include a lower circuit board 2450a and a lower connection board 2450b.

The lower circuit board 2450a may be a printed circuit board (PCB). The lower circuit board 2450a may be formed in the shape of a plate. The lower circuit board 2450a may be formed in the shape of a quadrangular plate.

The lower circuit board 2450a may be provided at the portion thereof corresponding to (opposite to) the cavity 2431, a description of which will follow, or the portion thereof radially extending from the portion thereof corresponding to (opposite to) the cavity 2431 with a lower guide hole 2445. Consequently, the upper surface of the uppermost lens of the second lens unit 2500 may be fixed by the lower guide hole 2445 in the state of abutting the lower plate 2440. That is, the uppermost lens of the second lens unit 2500 may not be fixed in the state of abutting the lower circuit board 2450a, which is important from the aspect of electrical control and which may be worn or separated due to friction, but may be fixed in the state of abutting the lower plate 2440.

The lower circuit board 2450a may be provided with a first lower corner 2451, a second lower corner 2452, a third lower corner 2453, and a fourth lower corner 2454, which are arranged in the counterclockwise direction. The first to fourth lower corners 2451, 2452, 2453, and 2454 may be located further inward than the corners of the core plate 2430. That is, the corners of the lower board 2450 may be located inward from the corners of the core plate 2430. When the liquid lens 2400 is inserted, therefore, the friction between the first to fourth lower corners 2451, 2452, 2453, and 2454 and the lower inner wall and the side wall of the third lens receiving hole 2240 may be minimized. As a result, the first to fourth lower corners 2451, 2452, 2453, and 2454 may be prevented from being separated from the core plate 2430, whereby the lower circuit board 2450a may be prevented from being separated from the core plate 2430.

The first to fourth lower corners 2451, 2452, 2453, and 2454 may be connected to the core plate 2430. The first to fourth lower corners 2451, 2452, 2453, and 2454 may be connected to the electrode unit a of the core plate 2430 corresponding thereto (opposite thereto). The first lower corner 2451 may be connected to the fifth electrode a5. The second lower corner 2452 may be connected to the sixth electrode a6. The third lower corner 2453 may be connected to the seventh electrode a7. The fourth lower corner 2454 may be connected to the eighth electrode a8. The first to fourth lower corners 2451, 2452, 2453, and 2454 may be connected to the fifth to eighth electrodes a5, a6, a7, and a8 via four lower conduction portions (not shown). In this case, the lower conduction portions (not shown) may extend through the first to fourth lower recesses 2441, 2442, 2443, and 2444 corresponding to (opposite to) the first to fourth lower corners 2451, 2452, 2453, and 2454, a description of which will follow. In addition, each of the lower conduction portions may be conductive epoxy. As a result, the first to fourth lower corners 2451, 2452, 2453, and 2454 may be adhered to the fifth to eighth electrodes a5, a6, a7, and a8 via the conductive epoxy. In addition, the first to fourth lower corners 2451, 2452, 2453, and 2454 may be adhered to the fifth to eighth electrodes a5, a6, a7, and a8 via electrode pads.

The lower connection board 2450b may be a flexible printed circuit board (FPCB). The lower connection board 2450b may be connected to the lower circuit board 2450a. The lower connection board 2450b may be connected to the main board 2700. As a result, the main board 2700 may supply power to the fifth to eighth electrodes a5, a6, a7, and a8 via the lower connection board 2450b and the lower circuit board 2450a.

The lower connection board 2450b may extend downward from the other side of the lower circuit board 2450a. The other side may be a side located at the end in the direction in which the liquid lens 2400 is inserted through the insertion hole 2232. The junction between the lower connection board 2450b and the lower circuit board 2450a may be round. The lower connection board 2450b may be received in the board receiving recess 2234, and may extend downward. In this case, the lower connection board may be protected from the outside, since the cover member 2100 is located outside the lower connection board.

Hereinafter, various examples of the liquid lens 2400 according to the first embodiment will be described with reference to FIGS. 23A through 23L. In the following description, light reflected by a subject is transmitted through the liquid lens 2400 from top to bottom. In addition, an upper board 2410 and a lower board 2450 having the same technical concept as in the above description will be omitted from various examples of the liquid lens 2400, and a description thereof will be omitted.

In the liquid lens 2400 of FIG. 23A, the fifth upper recess 2425 may be formed in the upper plate 2420, and the fifth lower recess 2445 may be formed in the lower plate 2440. The electrode unit a is disposed on the inner wall of the cavity 2431 and the upper surface and the lower surface of the core plate 2430. The upper electrode unit a1, a2, a3, and a4 may be disposed on the upper surface of the core plate 2430, and may be interrupted at the circumference of the cavity 2431 on the upper surface of the core plate 2430. The inner wall electrode unit a5, a6, a7, and a8 may be disposed on the upper surface of the core plate 2430 at the circumference of the cavity 2431, the inner wall of the cavity 2431, and the lower surface of the core plate 2430, and may be interrupted at the circumference of the cavity 2431 on the upper surface of the core plate 2430. That is, the upper electrode unit a1, a2, a3, and a4 and the inner wall electrode unit a5, a6, a7, and a8 may be interrupted on the upper surface of the core plate 2430, and thus may not be connected to each other. The insulation layer b may be disposed on the electrode unit a along the circumference of the cavity 2431 in the core plate 2430. In this case, the insulation layer b may extend through the gap between the upper electrode unit a1, a2, a3, and a4 and the inner wall electrode unit a5, a6, a7, and a8. In addition, the insulation layer b may be disposed on the upper surface of the fifth lower recess 2445. As a result, the lower surface of the insulation layer b may be disposed in the fifth lower recess 2445. The insulation layer b may extend from the lower surface thereof along the inner wall of the cavity 2431 so as to be disposed on the inner wall electrode unit a5, a6, a7, and a8. The insulation layer b may extend through the inner wall electrode unit a5, a6, a7, and a8 from the inner wall of the cavity 2431 along the upper surface of the core plate 2430 so as to be located on the upper electrode unit a1, a2, a3, and a4. The second liquid L2 may be disposed in the lower portion of the cavity 2431 so as to be received in the lower portion of the insulation layer b. The first liquid L1 may be disposed in the upper portion of the cavity 2431 so as to be received in the upper portion of the insulation layer b and the fifth upper recess 2425. In this case, the first liquid L1 may abut the upper electrode unit a1, a2, a3, and a4.

The first liquid L1 may be a conductive liquid, and the second liquid L2 may be a nonconductive liquid. The first liquid L1 may include water, and the second liquid L2 may include oil.

The first liquid L1 may be located on the second liquid L2. The first liquid L1 and the second liquid L2 may have different indices of refraction, and may contact each other to form an interface therebetween. When voltage is applied to the electrode unit a, the interface may move along the inner wall of the cavity 2431.

In the initial state, in which no voltage is applied to the electrode unit a, the liquid lens 2400 may have a negative (−) diopter. When voltage is applied to the electrode unit a, the liquid lens 2400 may have a positive (+) diopter. That is, in the initial state, the interface may be convex downward. In this case, the liquid lens 2400 may serve as a concave lens. As voltage is applied to the electrode unit a, the interface may gradually become convex upward, whereby the liquid lens 2400 may serve as a convex lens. In addition, the radius of curvature of the interface that is convex downward in the initial state may be greater than the radius of curvature of the interface that is convex upward in the state in which the maximum voltage is applied to the electrode unit a.

The liquid lens 2400 of FIG. 23A may be analogous with the liquid lens 2400 of FIG. 23B. Compared with the liquid lens 2400 of FIG. 23A, however, the fifth lower recess 2445 is omitted. As a result, the insulation layer b may be directly disposed on the upper surface of the lower plate 2440 opposite to the cavity 2431.

The liquid lens 2400 of FIG. 23A may be analogous with the liquid lens 2400 of FIG. 23C. Compared with the liquid lens 2400 of FIG. 23A, however, the fifth lower recess 2445 is omitted. Furthermore, no insulation layer b may be disposed on the lower plate 2440.

The liquid lens 2400 of FIG. 23A may be analogous with the liquid lens 2400 of FIG. 23D. However, the cavity 2431 may be inclined. In this case, the width of the cavity 2431 may gradually decrease downward. That is, the horizontal sectional area of the cavity 2431 may gradually decrease downward. Furthermore, the liquid lens 2400 of FIG. 23E is configured such that the cavity 2431 in the liquid lens 2400 of FIG. 23B is inclined, and the liquid lens 2400 of FIG. 23F is configured such that the cavity 2431 in the liquid lens 2400 of FIG. 23C is inclined.

The liquid lens 2400 of FIG. 23A may be analogous with the liquid lens 2400 of FIG. 23G. However, no fifth upper recess 2425 is formed in the liquid lens 2400 of FIG. 23H. Instead, the upper plate 2420 and the core plate 2430 may be coupled to each other using a first adhesive member 2427 and a second adhesive member 2428. That is, the upper plate 2420 and the core plate 2430 may be spaced apart from each other by the first adhesive member 2427 and the second adhesive member 2428. The gap between the upper plate and the core plate may be filled with the second liquid L2, which may abut the upper electrodes a1, a2, a3, and a4. In this case, each of the first adhesive member 2427 and the second adhesive member 2428 may be a nonconductive material. The liquid lens 2400 of FIG. 23H is configured such that the first and second adhesive members 2427 and 2428 are disposed in place of the upper recess 2425 in the liquid lens 2400 of FIG. 23B. The liquid lens 2400 of FIG. 23I is configured such that the first and second adhesive members 2427 and 2428 are disposed in place of the upper recess 2425 in the liquid lens 2400 of FIG. 23C. The liquid lens 2400 of FIG. 23J is configured such that the first and second adhesive members 2427 and 2428 are disposed in place of the upper recess 2425 in the liquid lens 2400 of FIG. 23D. The liquid lens 2400 of FIG. 23K is configured such that the first and second adhesive members 2427 and 2428 are disposed in place of the upper recess 2425 in the liquid lens 2400 of FIG. 23E. The liquid lens 2400 of FIG. 23L is configured such that the first and second adhesive members 2427 and 2428 are disposed in place of the fifth upper recess 2425 in the liquid lens 2400 of FIG. 23F.

Gaps 2429 shown in FIGS. 23A to 23L mean that upper electrodes and inner wall electrodes that are adjacent to each other (e.g. a2/a3 and a6/a7) are separated from each other. In an embodiment, the gaps 2429 may be filled with the insulation layer b through the process of disposing the insulation layer b. As a result, the adjacent electrodes may be more securely separated from each other. In another embodiment, the gaps 2429 may be realized as empty spaces in the case in which the insulation layer b is made of an insulation film.

The liquid lens 2400 according to the first embodiment may be disposed in the lens module in the inverted state (see FIG. 24). In this case, the liquid lens 2400 may have a positive (+) diopter in the initial state, in which no voltage is applied to the electrode unit a, and the liquid lens 2400 may have a negative (−) diopter when voltage is applied to the electrode unit a. That is, in the initial state, the interface may be convex upward. In this case, the liquid lens 2400 may serve as a convex lens. As voltage is applied to the electrode unit a, the interface may gradually become convex downward, whereby the liquid lens 2400 may serve as a concave lens. In addition, the radius of curvature of the interface that is convex upward in the initial state may be greater than the radius of curvature of the interface that is convex downward in the state in which the maximum voltage is applied to the electrode unit a.

The second lens unit 2500 may include one or more lenses. The second lens unit 2500 may include three lenses. The lenses of the second lens unit 2500 may be located in the state of being stacked. The second lens unit 2500 may be received in the second lens receiving hole 2240. The lenses of the second lens unit 2500 may be configured such that the upper portion of each lens abuts the stair of the second lens receiving hole 2240 or an O-ring and such that the lower portion of each lens is supported and fixed by the lower lens or an O-ring. The upper portion of the uppermost lens of the second lens unit 2500 may be fixed in the state of abutting the lower surface of the lower plate 2440 of the liquid lens 2400, The infrared filter 2600 may prevent infrared light from being incident on the image sensor. The infrared filter 2600 may be located between the lens module and the main board 2700. The infrared filter 2600 may be located between the lens module and the image sensor. The infrared filter 2600 may be made of a film material or a glass material. The infrared filter 2600 may be formed by coating a plate-shaped optical filter, such as a cover glass for protecting an image plane, with infrared cutoff material. The infrared filter 2600 may be an infrared cutoff filter or an infrared absorption filter.

The main board 2700 may be a printed circuit board (PCB). The main board 2700 may support the lens holder 2200. The image sensor may be mounted on the main board 2700. In an example, the image sensor may be located at the inside of the upper surface of the main board 2700, and the lens holder 2200 may be located at the outside of the upper surface of the main board 2700. In this structure, light that has passed through the lens module may be radiated to the image sensor mounted on the main board 2700. The main board 2700 may supply power to the liquid lens 2400. The main board 2700 may supply power to the first to fourth electrodes a1, a2, a3, and a4 via the upper plate 2410. The main board 2700 may supply power to the fifth to eighth electrodes a5, a6, a7, and a8 via the lower plate 2450. Meanwhile, the controller may be located at the main board 2700. Consequently, the direction, intensity, and wavelength of current that is supplied to the first to eighth electrodes a1, a2, a3, a4, a5, a6, a7, and a8 and the position to which the current is supplied may be controlled.

The image sensor may be mounted on the main board 2700. The image sensor may be located such that the optical axis of the image sensor is aligned with the optical axis of the lens module. As a result, the image sensor may acquire light that has passed through the lens module. The image sensor may output radiated light as an image. The image sensor may be a charge coupled device (CCD), metal oxide semiconductor (MOS), CPD, or CID. However, the kind of image sensor is not limited thereto.

The controller may be mounted on the main board 2700. The controller may control the direction, intensity, and wavelength of current that is supplied to the first to eighth electrodes a1, a2, a3, a4, a5, a6, a7, and a8. The controller may control the liquid lens 2400 to perform at least one of the AF and OIS functions of the camera module 2000. That is, the controller may control the liquid lens 2400 to change the curvature of the interface of the liquid lens 2400.

As shown in FIG. 21, the lower board 2450 may receive a single control signal from the controller via a lower connection board 2450*b* including a single pad, and the fifth to eighth electrodes a5, a6, a7, and a8 may be connected to each other so as to receive the single control signal. That is, the fifth to eighth electrodes a5, a6, a7, and a8 may constitute a common electrode.

In addition, the upper board 2410 may receive four control signals from the controller via a upper connection board 2410*b* including four pads, and each of the first to fourth electrodes a1, a2, a3, and a4 may receive a corresponding one of the four control signals. That is, the first to fourth electrodes a1, a2, a3, and a4 may constitute four individual electrodes.

In another embodiment, the upper board may include a single pad, and the lower board may include four pads. Other elements may also be modified in response thereto.

Figure 25:
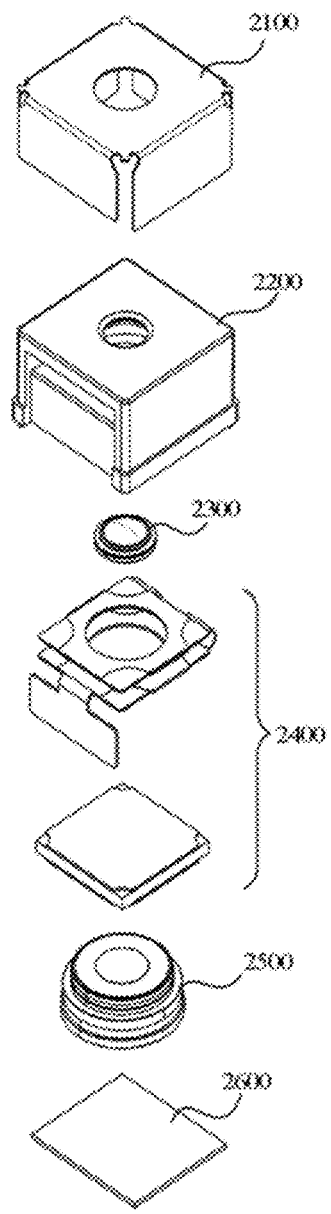
FIG. 25 is an exploded perspective view showing a camera module according to a second embodiment.
Figure 26:
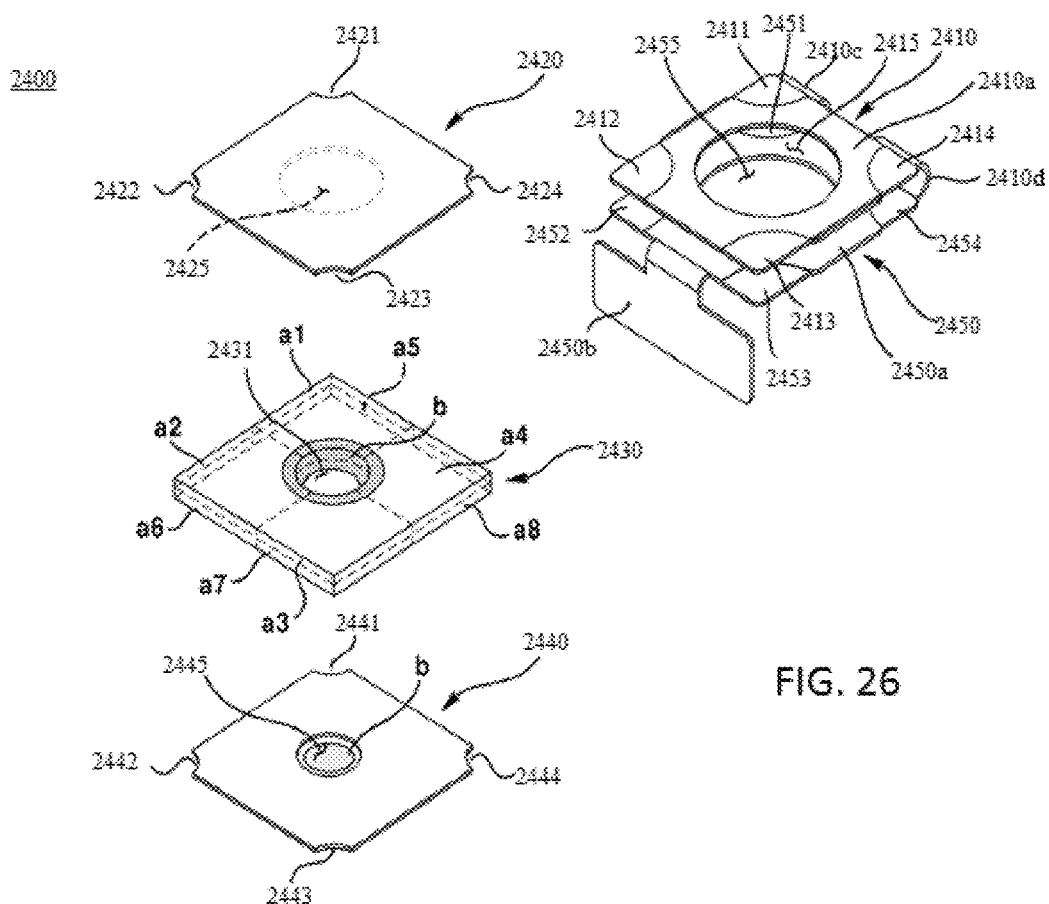
FIG. 26 is an exploded perspective view showing a liquid lens according to a second embodiment.
Figure 27:
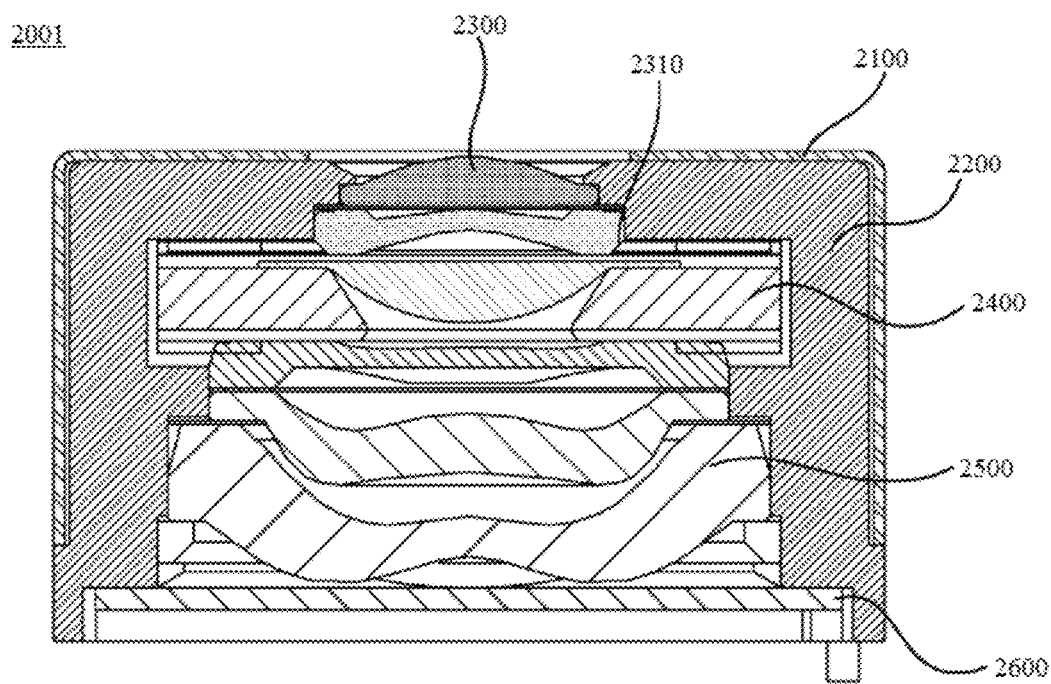
FIG. 27 is a sectional view showing the camera module according to the second embodiment.

Hereinafter, the structure of a camera module 2001 according to a second embodiment will be described with reference to the drawings. FIG. 25 is an exploded perspective view showing a camera module according to a second embodiment, FIG. 26 is an exploded perspective view showing a liquid lens according to a second embodiment, and FIG. 27 is a sectional view showing the camera module according to the second embodiment.

The structure of the camera module 2000 according to the first embodiment may be analogous with the structure of the camera module 2001 according to the second embodiment. The structure of the liquid lens 2400 of the camera module 2000 according to the first embodiment may be analogous with the structure of the liquid lens 2400 according to the second embodiment except for the upper and lower boards 2410 and 2450. Hereinafter, the structure of the upper and lower boards 2410 and 2450 of the second embodiment will be described based on the technical features thereof that are different from those of the upper and lower boards 2410 and 2450 of the first embodiment.

The liquid lens 2400 may be configured such that boards and plates are stacked. The liquid lens 2400 may include an upper board 2410, an upper plate 2420, a core plate 2430, a lower plate 2440, and a lower board 2450.

The upper board 2410 may include an upper circuit board 2410*a*, and the upper board 2410 and the lower board 2450 may be connected to each other via a first upper and lower connection board 2410*c* and a second upper and lower connection board 2410*d*. Unlike the upper board 2410 of the first embodiment, the upper connection board 2410*b* may be omitted. The reason for this is that the upper board may be connected to the main board 2700 via a lower connection board 2450*b* of the lower board 2450. In a modification (not shown), the upper board may include an upper connection board, and the lower connection board of the lower board may be omitted. In this case, therefore, the lower board may be connected to the main board 2700 via the upper connection board of the upper board. That is, in the case in which the first upper and lower connection board 2410*c* and/or the second upper and lower connection board 2410*d* is provided, as illustrated in the second embodiment and the modification thereof, any one selected from between the upper connection board and the lower connection board may be omitted. Furthermore, in the case in which the upper board 2410 and the lower board 2450 are integrally connected to each other, as in the second embodiment, the coating structure of the electrode unit a is simplified.

The upper circuit board 2410*a* may be a printed circuit board (PCB). The upper circuit board 2410*a* may be formed in the shape of a plate. The upper circuit board 2410*a* may be formed in the shape of a quadrangular plate.

The upper circuit board 2410*a* may be provided at the portion thereof corresponding to (opposite to) a cavity 2431, a description of which will follow, or the portion thereof radially extending from the portion thereof corresponding to (opposite to) the cavity 2431 with an upper guide hole 2415. Unlike the upper circuit board 2410*a* of the first embodiment, the upper guide hole 2415 may not extend to one side. When the liquid lens 2400 is inserted, therefore, the first upper and lower connection board 2410*c* and the second upper and lower connection board 2410*d* are introduced first, whereby the upper circuit board 2410*a* may be prevented from being worn or from being separated from the upper plate 2420 or the core plate 2430.

Unlike the first to fourth upper corners 2411, 2412, 2413, and 2414 of the first embodiment, the first to fourth upper corners 2411, 2412, 2413, and 2414 of the upper circuit board 2410*a* may not be located further inward than the corners of the core plate. When the liquid lens 2400 is inserted, therefore, the first upper and lower connection board 2410*c* and the second upper and lower connection board 2410*d* are introduced first, with the result that the first to fourth upper corners 2411, 2412, 2413, and 2414 may be prevented from being separated from the core plate 2430, whereby the upper circuit board 2410*a* may be prevented from being separated from the core plate 2430.

Each of the first and second upper and lower connection boards 2410*c* and 2410*d* may be a flexible printed circuit board (FPCB). The first and second upper and lower connection boards 2410*c* and 2410*d* may connect the upper circuit board 2410*a* to a lower circuit board 2450*a*. As a result, the main board 2700 may supply power to the first to fourth electrodes a1, a2, a3, and a4 via the lower circuit board 2450*a*, the first and second upper and lower connection boards 2410*c* and 2410*d*, and the upper circuit board 2410*a*.

The first and second upper and lower connection boards 2410*c* and 2410*d* may be spaced apart from each other. The first and second upper and lower connection boards 2410*c* and 2410*d* may be turned up at one side of the upper circuit board 2410*a* so as to be connected to one side of the lower circuit board 2450*a*. That is, the first and second upper and lower connection boards 2410*c* and 2410*d* may be curved. In this case, one side may be a side located at the entrance in the direction in which the liquid lens 2400 is inserted through the insertion hole 2232.

The lower board 2450 may include a lower circuit board 2450*a* and a lower connection board 2450*b*. The upper board 2410 and the lower board 2450 may be connected to each other via the first upper and lower connection board 2410*c* and the second upper and lower connection board 2410*d*. For the same reason as the upper board 2410, first to fourth lower corners 2451, 2452, 2453, and 2454 of the lower board 2450 may not be located further inward than corners of the core plate 2230, unlike the first to fourth lower corners 2451, 2452, 2453, and 2454 of the first embodiment.

Hereinafter, the AF and OIS functions of the camera module 2000 or 2001 according to the first or second embodiment will be described. The functions of the camera module 2000 or 2001 according to the first or second embodiment may be performed by changing the curvature of the interface between the conductive liquid L1 and the nonconductive liquid L2 received in the cavity 2431.

The conductive liquid L1 may be located in the upper portion of the cavity 2431. The conductive liquid L1 may be received in the upper portion of the cavity 2431 in the state of abutting the upper recess 2425, the first to fourth electrodes a1, a2, a3, and a4, the insulation layer b, and the nonconductive liquid L2. The conductive liquid L1 may be polar. For example, the conductive liquid L1 may be water.

The nonconductive liquid L2 may be located in the lower portion of the cavity 2431. The nonconductive liquid L2 may be received in the lower portion of the cavity 2431 in the state of abutting the insulation layer b and the conductive liquid L1. The nonconductive liquid L2 may be nonpolar. For example, the nonconductive liquid L2 may be oil. The nonconductive liquid L2 may be silicone.

The specific gravities of the conductive liquid L1 and the nonconductive liquid L2 may be similar or almost equal to each other. In a system in which the conductive liquid L1 and the nonconductive liquid L2 coexist, therefore, gravity may be ignored. That is, the system in which the conductive liquid L1 and the nonconductive liquid L2 exist is little affected by gravity but is greatly affected by surface tension.

The interface between the conductive liquid L1 and the nonconductive liquid L2 may be changed. More specifically, the curvature of the interface between the conductive liquid L1 and the nonconductive liquid L2 may be controlled to perform the AF and OIS functions.

An example of the AF function will be described. When voltage is applied such that the first to fourth electrodes a1, a2, a3, and a4, located at the upper portion of the cavity 2431, and the fifth to eighth electrodes a5, a6, a7, and a8, located at the lower portion of the cavity 2431, have different polarities, the conductive liquid L1, located in the upper portion of the cavity 2431, abuts the first to fourth electrodes a1, a2, a3, and a4 and is separated from the fifth to eighth electrodes a5, a6, a7, and a8 by the insulation layer b and the nonconductive liquid L2, whereby an electrowetting phenomenon occurs. Consequently, the curvature of the interface is changed depending on the magnitude of voltage, whereby the AF function is performed. The magnitude of voltage may be controlled by the controller, as previously described.

An example of the OIS function will be described. When voltage is applied such that some of the first to fourth electrodes a1, a2, a3, and a4, located at the upper portion of the cavity 2431, and the fifth to eighth electrodes a5, a6, a7, and a8, located at the lower portion of the cavity 2431, have different polarities, the curvature of the interface may be changed so as to be biased to one of the first to fourth electrodes a1, a2, a3, and a4. Consequently, the magnitude of voltage and some of the first to fourth electrodes a1, a2, a3, and a4 to which voltage is to be applied may be selected to perform the OIS function. The magnitude of voltage and the electrodes to which voltage is to be applied may be controlled by the controller, as previously described.

In a modification (not shown), the nonconductive liquid may be located in the upper portion of the cavity, and the conductive liquid may be located in the lower portion of the cavity. In this case, the insulation layer may be located in a reverse state. That is, a circular insulation layer may be coated on a portion of the upper recess, and a circular insulation layer may be coated on the lower surface of the core plate along the circumference of the cavity. In addition, no circular insulation layer may be coated on a portion of the lower recess, and no circular insulation layer may be coated on the upper surface of the core plate along the circumference of the cavity. In this structure, the operation of the first or second embodiment is reversely carried out to perform the AF and OIS functions.

Figure 28:
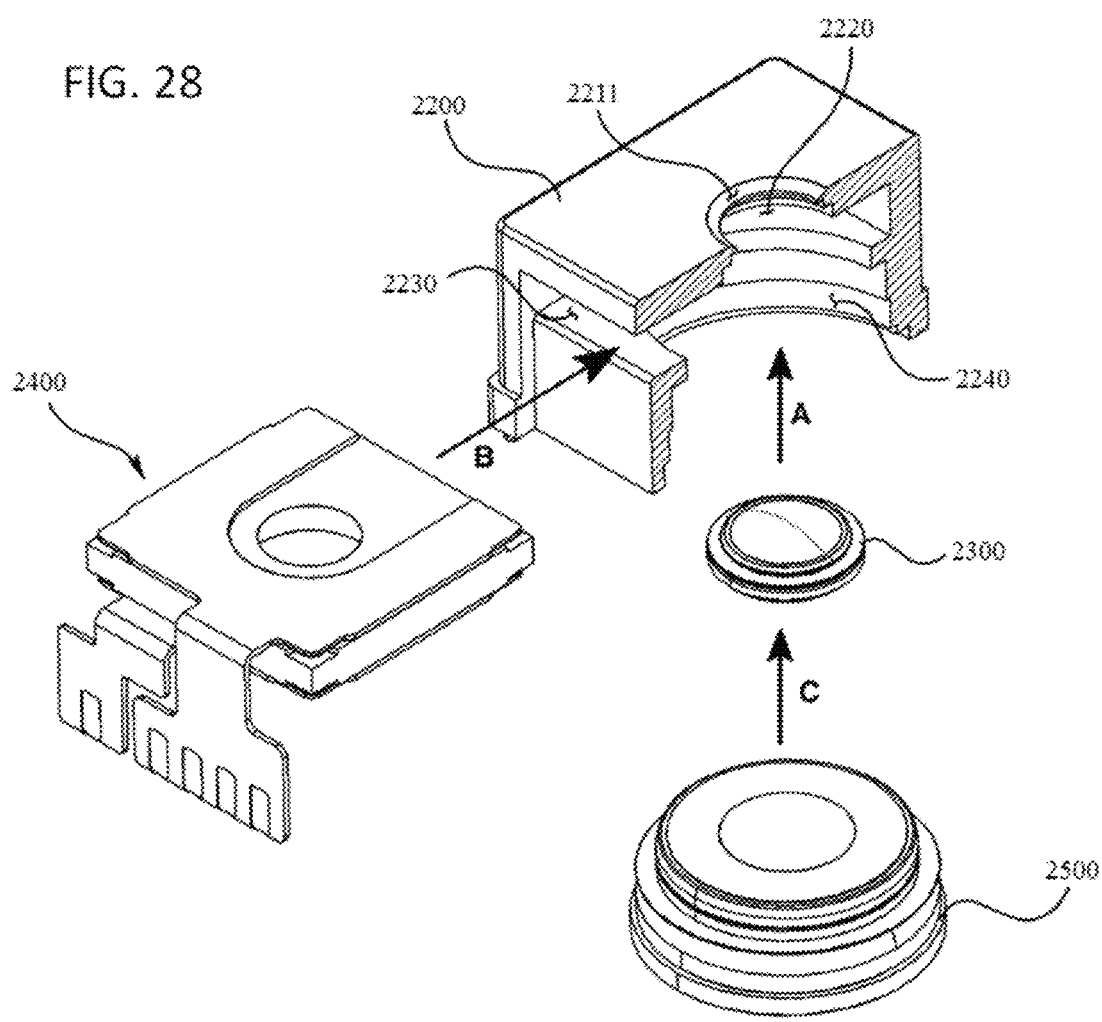
FIG. 28 is a conceptual view showing a method of manufacturing the lens module according to the first embodiment.
Figure 29:
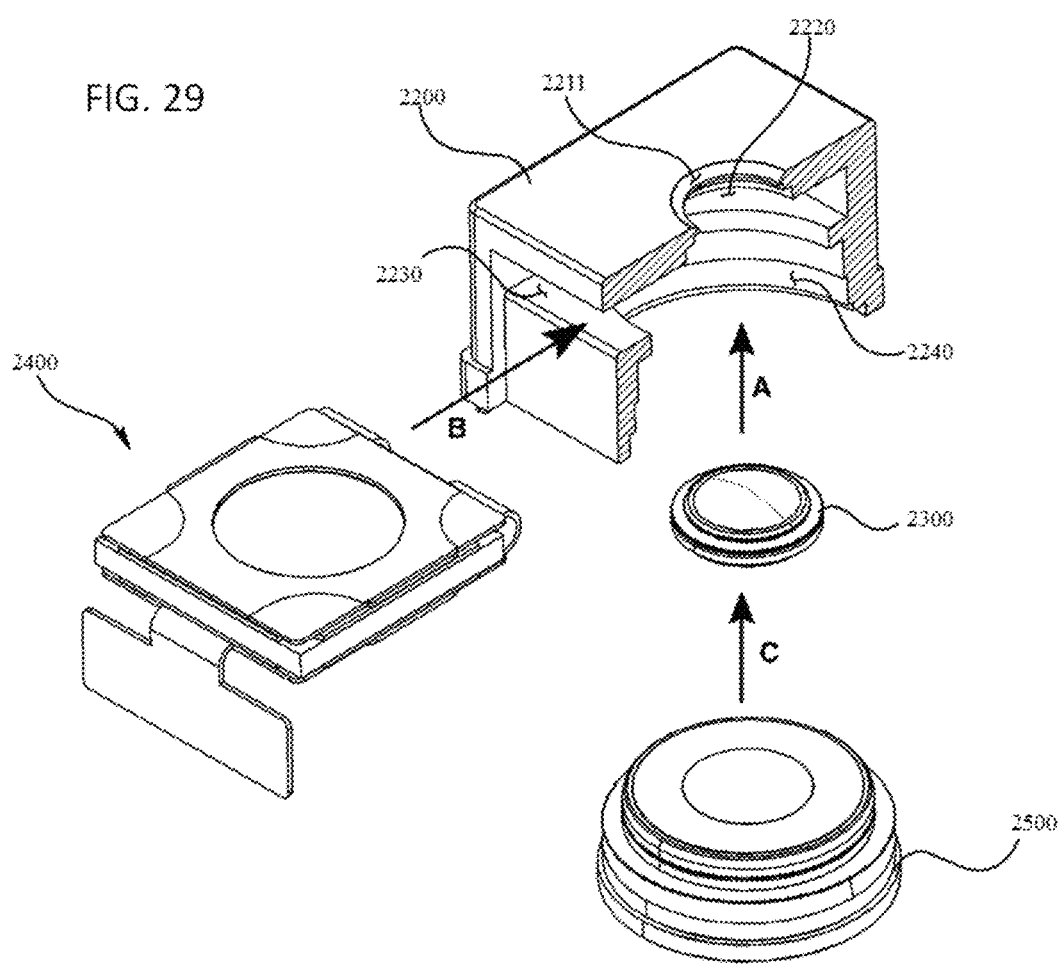
FIG. 29 is a conceptual view showing a method of manufacturing the lens module according to the second embodiment.
Figure 30:
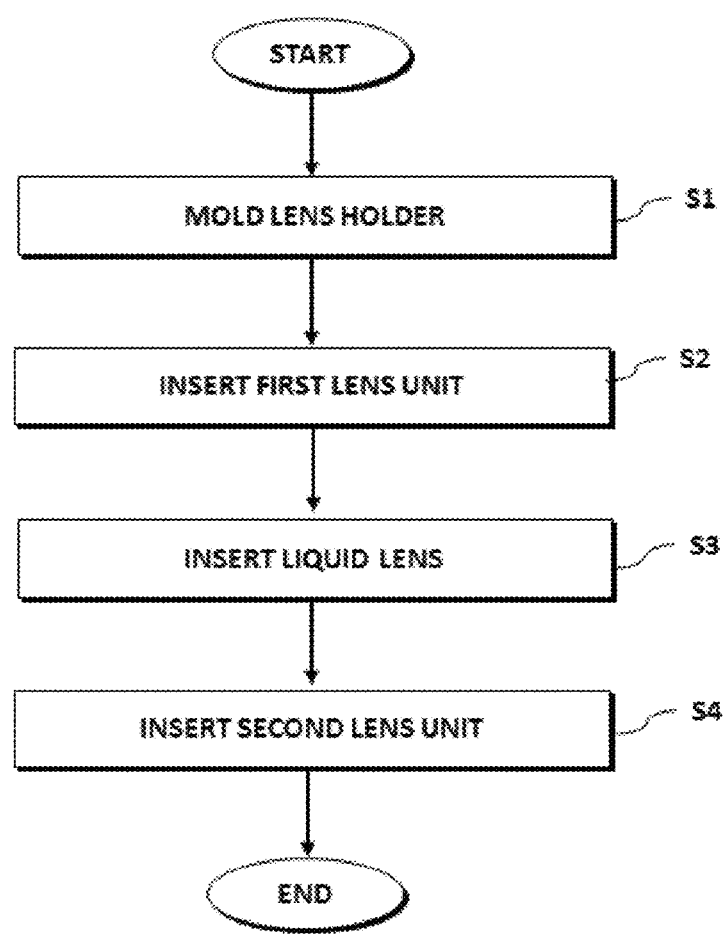
FIG. 30 is a flowchart showing the method of manufacturing the lens module according to the first or second embodiment.

Hereinafter, a method of manufacturing the lens module according to the first or second embodiment will be described with reference to the drawings. FIG. 28 is a conceptual view showing a method of manufacturing the lens module according to the first embodiment, FIG. 29 is a conceptual view showing a method of manufacturing the lens module according to the second embodiment, and FIG. 30 is a flowchart showing the method of manufacturing the lens module according to the first or second embodiment.

The method of manufacturing the lens module according to the first or second embodiment may include a first step (S1) of molding the lens holder 2200, a second step (S2) of inserting the first lens unit 2300, a third step (S3) of inserting the liquid lens 2400 through the insertion hole 2232, and a fourth step (S4) of inserting the second lens unit 2500.

The first step (S1) is a step of molding the lens holder 2200. The lens holder 2200 may be formed by plastic injection. The lens holder 2200 may be manufactured through a process of injecting molten plastic into a main mold (not shown) having a hole mold (not shown) corresponding to the hole 2210 and the insertion hole 2232 and solidifying the plastic.

The second step (S2) is a step of inserting the first lens unit 2300. The first lens unit 2300 may be inserted from bottom to top through the lower opening of the hole 2210 (in the direction indicated by arrow A). The first lens unit 2300 may be inserted into the hole 2210, and may be received and fixed in the first lens receiving hole 2220.

The third step (S3) is a step of inserting the liquid lens 2400. The liquid lens 2400 may be laterally inserted through the insertion hole 2232 (in the direction indicated by arrow B). The inwardly inclined portion 2310 may be formed along the outer circumference of the lower surface of the lowermost lens of the first lens unit 2300. As a result, the friction between the first lens unit and the upper plate 2420 may be reduced when the liquid lens 2400 is inserted. Furthermore, the first to fourth upper corners 2411, 2412, 2413, and 2414 and the first to fourth lower corners 2451, 2452, 2453, and 2454 of the liquid lens 2400 according to the first embodiment may be formed inward, and the upper guide hole 2415 may be formed in the upper board 2410 in the direction in which the liquid lens 2400 is inserted (in the direction indicated by arrow B). As a result, the first to fourth upper corners 2411, 2412, 2413, and 2414 and the first to fourth lower corners 2451, 2452, 2453, and 2454 may be prevented from being separated from the core plate 2430 when the liquid lens 2400 is inserted, whereby the upper circuit board 2410*a* may be prevented from being separated from the core plate. The liquid lens 2400 may be inserted into the hole 2210 through the insertion hole 2232, and may be received and fixed in the second lens receiving hole 2230. In addition, the liquid lens 2400 according to the second embodiment may have the first upper and lower connection board 2410*c* and the second upper and lower connection board 2410*d* in the direction in which the liquid lens is inserted (in the direction indicated by arrow B). Consequently, the same effect as the liquid lens 2400 according to the first embodiment may be obtained. The liquid lens 2400 may be inserted into the hole 2210 through the insertion hole 2232, and may be received and fixed in the second lens receiving hole 2230.

The fourth step (S4) is a step of inserting the second lens unit 2500. The second lens unit 2500 may be inserted from bottom to top through the lower opening of the hole 2210 (in the direction indicated by arrow C). The second lens unit 2500 may be inserted into the hole 2210, and may be received and fixed in the third lens receiving hole 2240.

In the method of manufacturing the lens module according to the first or second embodiment, the liquid lens 2400 may be inserted laterally. As a result, all of the first lens unit 2300, the liquid lens 2400, and the second lens unit 2500 may be received in the hole 2210, which is formed through a single process (first step) (S1). Consequently, the optical axes of the first lens unit 2300, the liquid lens 2400, and the second lens unit 2500 may be aligned with one another.

The core plate 2430, the upper plate 2420, and the lower plate 2440, described with reference to FIGS. 15 to 30, may also be defined as a first plate, a second plate, and a third plate, respectively.

Figure 31:
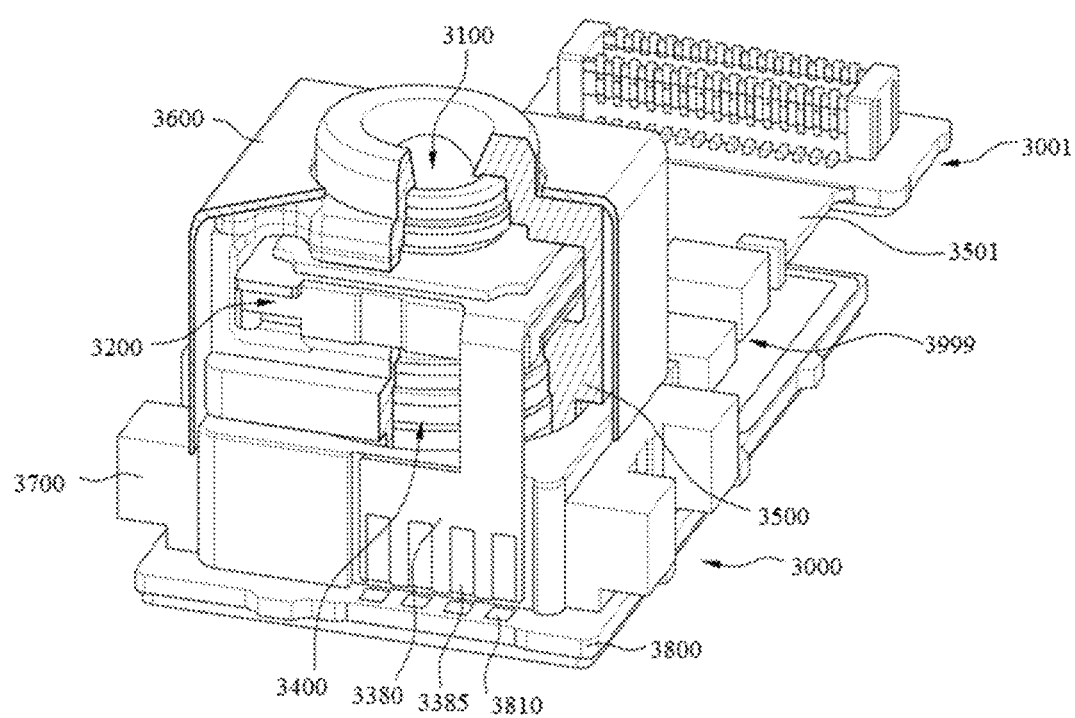
FIG. 31 is a view showing an embodiment of the camera module.

FIG. 31 is a view showing an embodiment of the camera module. The camera module may include a lens assembly 3000 and a control circuit 3999.

The lens assembly 3000 may include a liquid lens and/or a solid lens. The liquid lens may include a liquid, a plate, and an electrode. The liquid may include a conductive liquid and a nonconductive liquid. The electrode may be disposed on or under the plate. In addition, the electrode may include a common terminal and a plurality of individual terminals. A common terminal may be provided, and a plurality of individual terminals may be provided. The plate may include a first plate having a cavity in which the liquid is located. The plate may further include a second plate disposed on or under the first plate. In addition, the liquid lens may further include a third plate. The first plate may be disposed between the second plate and the third plate. The shape of the interface between the conductive liquid and the nonconductive liquid may be changed in response to a driving voltage applied between the common terminal and the individual terminals, whereby the focal distance may be changed. The control circuit 3999 may supply the driving voltage to the liquid lens, and may be disposed at a sensor board having an image sensor. The camera module may further include a connector 3001. The connector 3001 may be connected to the control circuit 3999 via a connection portion 3501, and the control circuit 3999 may be connected to an external power supply or another device.

The structure of the control circuit 3999 may be differently designed depending on the specification of an imaging device. Particularly, in order to reduce the magnitude of an operating voltage that is applied to the lens assembly 3000, the control circuit 3999 may be realized by a single chip. As a result, the size of a camera device mounted in a portable device may be further reduced.

The lens assembly 3000 may include a first lens unit 3100, a second lens unit 3400, a liquid lens 3300, a holder 3500, and a cover 3600. One of the first lens unit 3100 and the second lens unit 3400 may be omitted.

The structure of the lens assembly 3000 that is shown is merely an example, and the structure of the lens assembly 3000 may be changed depending on the specification of the camera device.

The first lens unit 3100 may be a region which is disposed in front of the lens assembly 3000 and on which light is incident from outside the lens assembly 3000. The first lens unit 3100 may be constituted by at least one lens. Alternatively, two or more lenses may be aligned along the central axis to constitute an optical system. Here, the central axis may be the same as the optical axis of the optical system.

The first lens unit 3100 may include two lenses. However, the disclosure is not limited thereto.

The upper portion and the lower portion of the holder 3500 may be open such that a through-hole is formed in the holder. The first lens unit 3100, the second lens unit 3400, and the liquid lens 3300 may be mounted in the through-hole formed in the holder 3500. The first and second lens unit 3100 and 3400 may be referred to as first and second solid lens units so as to be distinguished from the liquid lens 3300. Specifically, the first lens unit 3100 may be disposed in the upper portion of the holder 3500, and the second lens unit 3400 may be disposed and coupled in the lower portion of the holder 3500.

An exposure lens (not shown) may be provided at the front of the first lens unit 3100. A cover glass may be disposed in front of the exposure lens. Since the exposure lens protrudes to the outside and thus is exposed to the outside, the surface of the lens may be damaged. In the case in which the surface of the lens is damaged, the quality of images taken by the camera module may be deteriorated. In order to prevent or restrain damage to the surface of the exposure lens, the cover glass may be disposed, a coating layer may be formed, or the exposure lens may be made of a wear-resistant material for preventing damage to the surface of the exposure lens.

The second lens unit 3400 may be disposed at the rear of the first lens unit 3100 and the liquid lens 3300. Light incident on the first lens unit 3100 from the outside may pass through the liquid lens 3300 and may be incident on the second lens unit 3400. The second lens unit 3400 may be disposed in the through-hole formed in the holder 3500 so as to be spaced apart from the first lens unit 3100.

The liquid lens 3300 may be disposed under the first lens unit 3100, and the second lens unit 3400 may be disposed under the liquid lens 3300. The second lens unit 3400 may be constituted by at least one lens. Alternatively, two or more lenses may be aligned along the central axis to constitute an optical system.

The liquid lens 3300 may be disposed between the first lens unit 3100 and the second lens unit 3400. The structure of the liquid lens 3300 will be described below with reference to FIG. 32.

The liquid lens 3300, the first lens unit 3100, disposed on the liquid lens, and the second lens unit 3400, disposed under the liquid lens, may be disposed and fixed in the holder 3500. The liquid lens 3300 may also be aligned along the central axis in the same manner as the first lens unit 3100 and the second lens unit 3400.

First and second connection electrodes 3356 and 3346 (see FIG. 32B) of the liquid lens 3300 may be connected to a pad 3385 of a connection board 3380 exposed outside the holder 3500. For example, the connection board 3380 may be a flexible printed circuit board, and the pad 3385 may be connected to a pad 3810 of a circuit board 3800 disposed under the pad 3385.

The pads 3385 and 3810 may be terminals exposed from the connection board 3380 and the circuit board 3800, respectively.

Although not shown, conductive epoxy may be disposed between a first electrode 3355 and the first connection electrode 3356. In addition, conductive epoxy may be disposed between a second electrode 3345 and the second connection electrode 3346.

The first and second connection electrodes 3356 and 3346 may be disposed at the connection board 3380. The connection board 3380 may include a plurality of upper terminals and a plurality of lower terminals. The upper terminals may be connected to the first and second electrodes 3355 and 3345. The upper terminals may correspond to the first connection electrode 3356. The lower terminals may be connected to terminals of the sensor board. For example, the lower terminals may correspond to the pad 3385, and the terminals of the sensor board may correspond to the pad 3810 of the circuit board 3800.

The cover 3600 may be disposed so as to surround the first lens 3100, the second lens 3400, the liquid lens 3300, and the holder 3500. The cover 3600 and the holder 3500 may be disposed on a base 3700. The base 3700 may be omitted.

The circuit board 3800 may be disposed under the base 3700, and the pad 3810 may supply current to the first and second electrodes 3355 and 3345 (see FIG. 32) of the liquid lens 3300.

In addition, although not shown, a light receiving element, such as an image sensor, may be disposed under the second lens unit 3400. The light receiving element may be provided in the sensor board together with the circuit board 3800. The horizontal and/or vertical length of a unit pixel of an image sensor 3900 may be, for example, 2 micrometers (μm) or less.

Figure 32A:
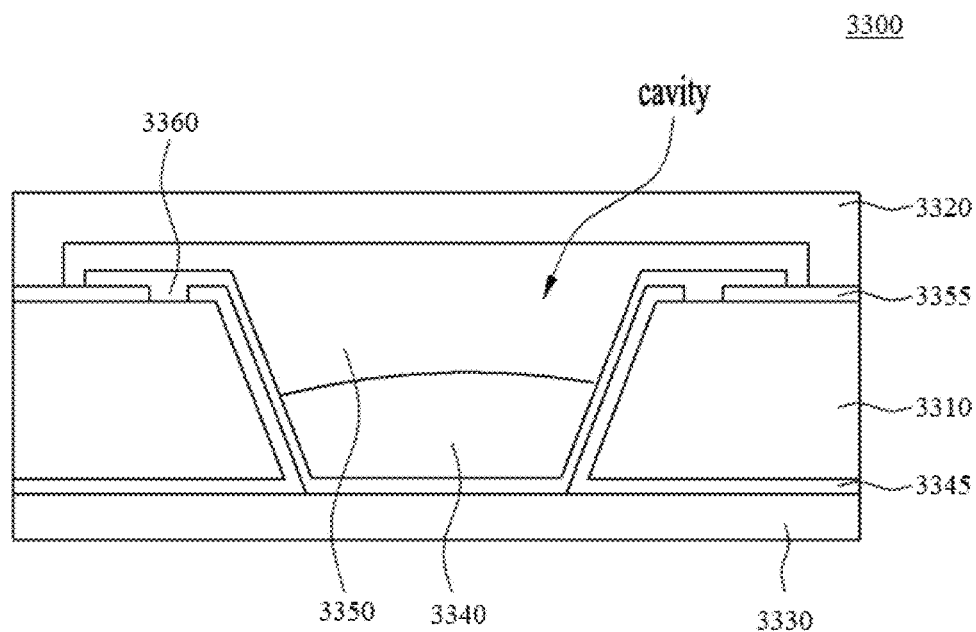
FIGS. 32A and 32B are views showing a liquid lens of the camera module of FIG. 31.
Figure 32B:
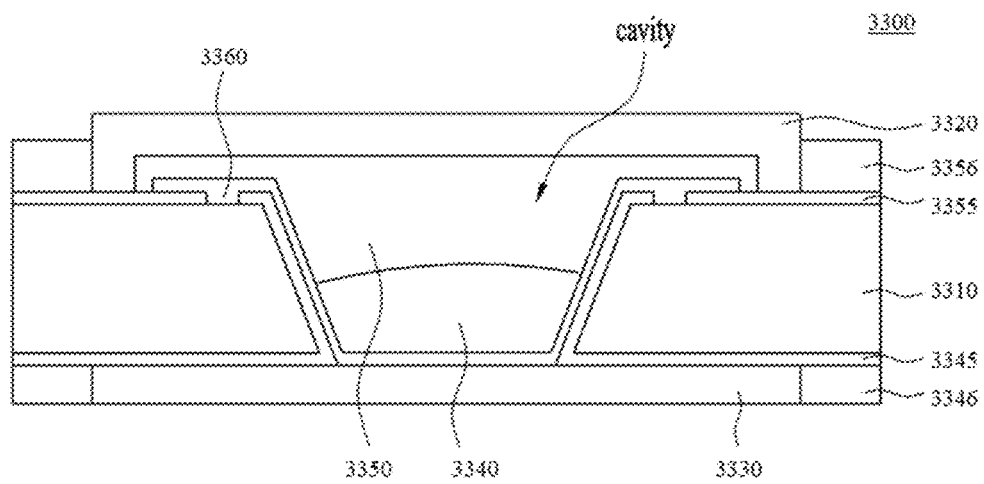

FIGS. 32A and 32B are views showing the liquid lens of the camera module of FIG. 31.

The liquid lens 3300 may include a first plate 3310 having therein a cavity for receiving a first conductive liquid 3350 and a second nonconductive liquid 3340, a first electrode 3355 disposed on the first plate 3310, a second electrode 3345 disposed under the first plate, a second plate 3320 disposed on the first electrode 3355, and a third plate 3330 disposed under the second electrode 3345.

The first plate 3310 may be disposed between the second plate 3320 and the third plate 3330, and may include upper and lower openings having a predetermined inclined surface (e.g. an inclined surface having an angle of about 59 to 61 degrees). A region defined by the inclined surface, the opening contacting the second plate 3320, and the opening contacting the third plate 3330 may be referred to as a 'cavity.'

The first plate 3310 is a structure for receiving the first and second liquids 3350 and 3340. The second plate 3320 and the third plate 3330 include regions through which light passes. The second plate 3320 and the third plate 3330 may be made of a light transmissive material such as glass. For the convenience in processing, the second plate 3320 and the third plate 3330 may be made of the same material.

In addition, the first plate 3310 may include impurities, which make light transmission difficult.

The second plate 3320 is a region on which light from the first lens unit 3100 is incident in order to be guided to the cavity, and the third plate 3330 is a region through which the light having passed through the cavity passes in order to be guided to the second lens unit 3400.

The cavity may be filled with the first liquid 3350 and the second liquid 3340, which exhibit different properties. An interface may be formed between the first liquid 3350 and the second liquid 3340. The curvature and inclination of the interface between the first liquid 3350 and the second liquid 3340 may be changed.

That is, in the case in which the surface tension of the first and second liquids 3350 and 3340 is changed using electricity, the size of the camera device is smaller than in the case in which the solid lenses are moved (the distance between the lenses is adjusted) to adjust the focal distance, and power consumption is lower than in the case in which the lenses are mechanically moved using a motor.

The second liquid 3340 may be a nonconductive liquid, such as phenyl-based silicone oil.

The first liquid 3350 may be a conductive liquid, such as a mixture of ethylene glycol and sodium bromide (NaBr).

Each of the first liquid 3350 and the second liquid 3340 may include at least one selected from between a disinfectant and an antioxidant. The antioxidant may be a phenyl-based antioxidant or a phosphorus (P)-based antioxidant. The disinfectant may be any one selected from among alcohol-based, aldehyde-based, and phenyl-based disinfectants.

The first electrode 3355 may be disposed on a portion of the upper surface of the first plate 3310, and may directly contact the first liquid 3350. The second electrode 3345 may be spaced apart from the first electrode 3355, and may be disposed on the upper surface, the side surface, and the lower surface of the first plate 3310.

The side surface of the first plate 3310 or the side surface of an insulation layer 3360 may constitute the inclined surface or the sidewall of the cavity. The first electrode 3355 may contact the first liquid 3350 and the second liquid 3340 in the state in which the insulation layer 3360, a description of which will follow, is disposed therebewteen.

An electrical signal from an external circuit board may be applied to the first electrode 3355 and the second electrode 3345 in order to control the interface between the first liquid 3350 and the second liquid 3340.

Each of the first electrode 3355 and the second electrode 3345 may be made of a conductive material. For example, each of the first electrode and the second electrode may be made of a metal, such as chrome (Cr). Chromium or chrome is a glossy silver rigid transition metal, which is not fragile, does not readily discolor, and has a high melting point.

Since an alloy including chromium exhibits high corrosion resistance and rigidity, chromium may be used in the state of being alloyed with a different metal. In particular, chrome (Cr) exhibits high resistance to the conductive liquid in the cavity, since chrome is not easily corroded or discolored.

The insulation layer 3360 may be disposed so as to cover the upper surface of the third plate 3330 on the bottom surface of the cavity, the second electrode 3345 disposed on the sidewall of the cavity, a portion of the first electrode 3355 on the upper surface of the first plate 3310, the first plate 3310, and the second electrode 3345. The insulation layer 3360 may be realized by, for example, a parylene C coating agent, and may further include a white dye. The white dye may increase the frequency at which light is reflected by the insulation layer 3360 disposed on the sidewall i of the cavity.

As shown, the second liquid 3340 may be in surface contact with the third plate 3330 in the state in which the insulation layer 3360 is disposed therebetween, and the first liquid 3350 may be in direct surface contact with the second plate 3320.

The cavity may include a first opening facing the second plate 3320 and a second opening facing the third plate 3330. The size in section of the first opening may be greater than the size in section of the second opening. In the case in which each opening has a circular section, the size of each of the first and second openings may be the radius. In the case in which each opening has a square section, the size of each of the first and second openings may be the length of one side.

The edge of each of the second plate 3320 and the third plate 3330 may be quadrangular. However, the disclosure is not limited thereto.

The first electrode 3355 may be exposed on at least a portion of the edge of the second plate 3320, and the second electrode 3345 may be exposed on at least a portion of the edge of the third plate 3330.

The first connection electrode 3356 may be disposed on the first electrode 3355 at the outer region of the second plate 3320, and the second connection electrode 3346 may be disposed on the second electrode 3345 at the outer region of the third plate 3330.

The first connection electrode 3356 and the second connection electrode 3346 may be integrally formed with the first electrode 3355 and the second electrode 3345, respectively.

The first connection electrode 3356 and the second connection electrode 3346 may be connected to the connection board 3380, which is a flexible printed circuit board, as previously described.

Figure 33:
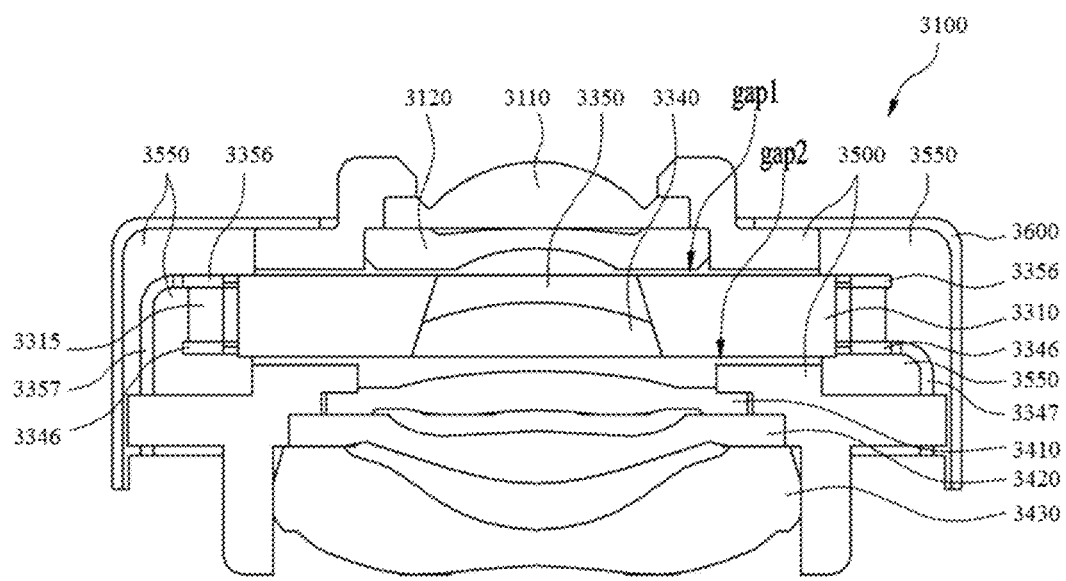
FIGS. 33 and 34 are sectional views showing a lens assembly of the camera module of FIG. 31.
Figure 34:
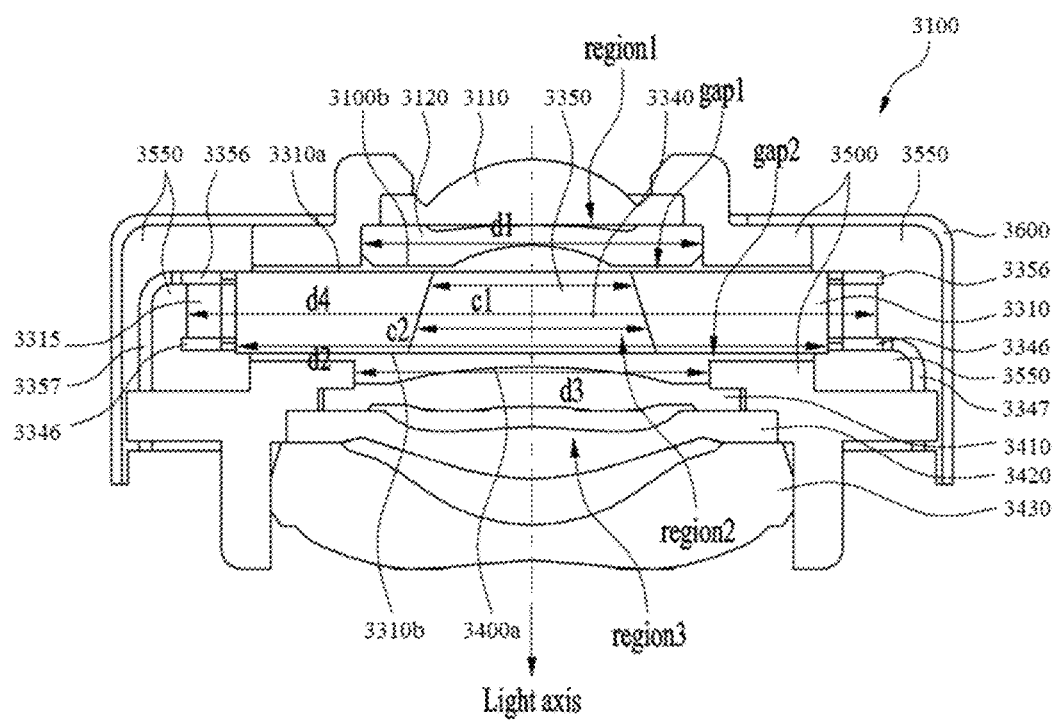
Figure 35:
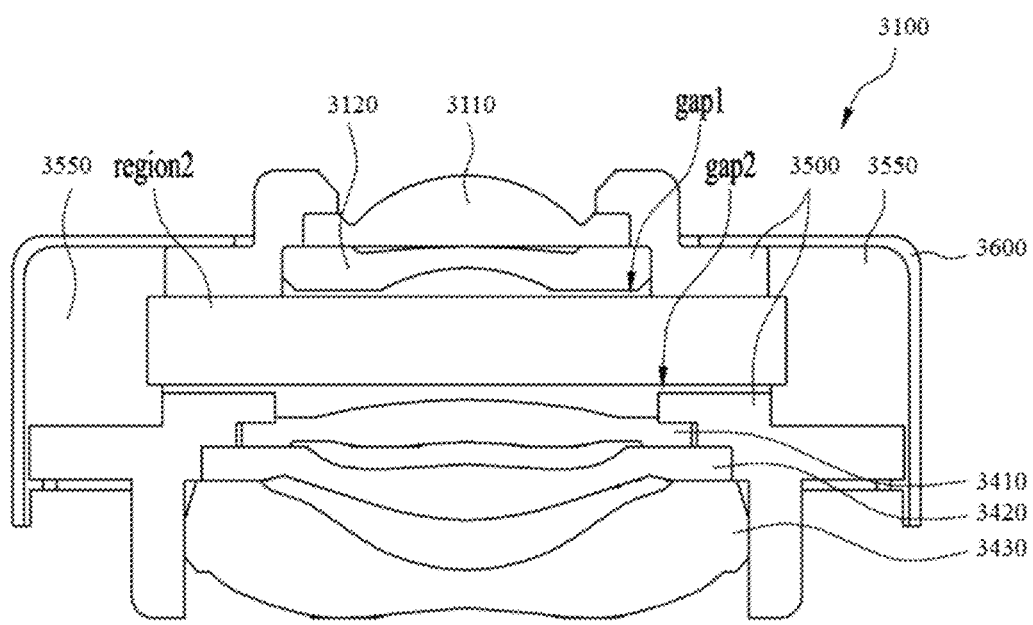
FIG. 35 is a view showing the structure of the lens assembly of the camera module of FIGS. 33 and 34, from which the liquid lens is removed.

FIGS. 33 and 34 are sectional views showing the lens assembly of the camera module of FIG. 31, and FIG. 35 is a view showing the structure of the lens assembly of the camera module of FIGS. 33 and 34, from which the liquid lens is removed. Hereinafter, the disposition of the first lens unit 3100, the liquid lens 3300, and the second lens unit 3400 in the lens assembly according to the embodiment will be described with reference to FIGS. 33 to 35.

First to third regions region1 to region3 may be provided in the holder 3500. The first lens unit 3100 may be inserted into the first region region1, the liquid lens 3300 may be disposed in the second region region2, and the second lens unit 3400 may be disposed in the third region region3. The first region region1 and the second region region2 may be spaced apart from each other by a first gap gap1, and the second region region2 and the third region region3 may be spaced apart from each other by a second gap gap2. The first gap gap1 may be the distance between the first lens unit 3100 and the liquid lens 3300, and the second gap gap2 may be the distance between the liquid lens 3300 and the second lens unit 3400.

The through-hole formed in the holder 3500 may include the first to third regions region1 to region3.

The holder 3500 may be disposed so as to surround the side surface and the front surface of the first region region1. A portion of the holder 3500 on the front surface of the first region facing the first lens unit 3100 may be removed to form an opening.

The holder 3500 may be disposed so as to surround the side surfaces of the second region region2 and the third region region3.

In the lens assembly 3000 according to the embodiment, the holder 3500 may be disposed so as to surround the through-hole formed therein.

FIG. 35 shows the state in which the first lens unit 3110 and 3120 and the second lens unit 3410, 3420, and 3430 are disposed in the first and third regions region1 and region3 in the holder 3500 and in which the second region region2 is empty.

The cover 3600 may be disposed so as to cover a portion of the side surface and the upper surface of the holder 3500. Openings formed in side surfaces of the holder 3500 for use as the entrances of the liquid lens 3300 may also be covered by the cover 3600.

The openings may be formed in two opposite side surfaces of the holder 3500 so as to be used as the entrances for the liquid lens 3300. The openings may be respectively referred to as a first hole and a second hole. Opposite ends of the liquid lens 3300 may protrude outward through the first and second holes formed in the opposite side surfaces of the holder 3500.

The holder may include a first hole formed in the surface thereof in the direction perpendicular to the optical-axis direction. The liquid lens may be inserted through the first hole such that at least a portion of the liquid lens is disposed in the first hole.

The holder may include a first side surface having a first hole and a second side surface having a second hole facing the first hole. The first lens unit and the second lens unit may be disposed in the holder. The liquid lens may be disposed between the first lens unit and the second lens unit, and at least a portion of the liquid lens may be disposed in the first hole and/or the second hole. The liquid lens, disposed between the first lens unit and the second lens unit, may protrude outward from the side surfaces of the holder through the first hole and the second hole. The thickness of the liquid lens may be less than the size of the first hole and/or the second hole in the optical-axis direction.

The holder may include a second region, in which the liquid lens is disposed, provided between the first hole and the second hole, and a first region, in which the first lens unit is disposed, provided on the second region. In addition, the holder may include a third region, in which the second lens unit is disposed, provided under the second region.

The length of the liquid lens may be greater than the length of the first lens unit and/or the second lens unit in the direction from the first hole to the second hole.

The liquid lens may include a first plate including a cavity, in which the first liquid and the second liquid are disposed, a first electrode disposed on the first plate, and a second electrode disposed under the first plate. In addition, the liquid lens may include a second plate disposed on the first electrode and a third plate disposed on the second electrode. The second plate and the third plate may be bonded to the holder using epoxy.

At least one of the second plate and the third plate may be spaced apart from at least one of the first region and the third region.

The first lens unit includes a plurality of lenses. The length of the lens of the first lens unit that is the closest to the liquid lens in the direction perpendicular to the optical axis may be greater than the diameter of the portion of the cavity that is the closest to the first region. The second lens unit includes a plurality of lenses. The length of the lens of the second lens unit that is the closest to the liquid lens in the direction perpendicular to the optical axis may be greater than the diameter of the portion of the cavity that is the closest to the third region.

In the first region, the inner wall of the holder may have a stair, and the first lens unit may contact the stair. In the third region, the inner wall of the holder may have a stair, and the second lens unit may contact the stair.

The first plate may include a through-hole formed through the first plate. At least a portion of the upper electrode and at least a portion of the lower electrode may be connected to each other via a conductive deposition layer disposed in the through-hole.

The cover 3600 may be disposed further outward so as to cover the protruding portions of the liquid lens 3300. The cover 3600 may cover at least a portion of the upper surface and the side surface of the holder, and may cover the first hole and the second hole.

The first and second holes may become the entrances of the liquid lens 3300 when the liquid lens 3300 is inserted after the optical performance of the first and second lens units 3100 and 3400 is evaluated in the state in which the first lens unit 3100 and the second lens unit 3400 are disposed in the holder 3500. In the lens assembly 3000 according to the embodiment, the horizontal length d4 of the second region region2 may be greater than the horizontal length d1 of the first region region1 and the horizontal length d3 of the third region. In addition, the horizontal length d2 of the second plate 3320 or the third plate 3330 of the liquid lens 3300 may be greater than the horizontal length d1 of the first region region1 and the horizontal length d3 of the third region.

The horizontal length d1 of the first region region1 may be the horizontal length of the region of the first lens unit 3100 that is adjacent to the liquid lens 3300, and may be greater than the horizontal length c1 of the region of the cavity that is adjacent to the first lens unit 3100. The horizontal length d3 of the third region region3 may be the horizontal length of the region of the second lens unit 3400 that is adjacent to the liquid lens 3300, and may be greater than the horizontal length c2 of the region of the cavity that is adjacent to the second lens unit 3400.

In this structure, when the liquid lens 3300 is inserted into the second region region2, the second plate 3320 and the third plate 3330 of the liquid lens 3300 may protrude further laterally than the first region region1 and the third region region3, respectively. Consequently, the upper surface of the second plate 3320 and the lower surface of the third plate 3330 of the liquid lens 3300 may be fixed in the state of being in surface contact with the holder 3500.

The second plate 3320 and the third plate 3330 may be bonded to the holder 3500 using an adhesive such as epoxy. At least a portion of the liquid lens 3300 may be spaced apart from the inner surface of the holder 3500.

In addition, the region in which the upper surface of the second plate 3320 of the liquid lens 3300 is in surface contact with the holder 3500 and the upper surface 3310a of the first plate 3310 may be disposed lower than the lower surface 3100b of the first lens unit 3100. The region in which the upper surface of the second plate 3320 of the liquid lens 3300 is in surface contact with the holder 3500 or the upper surface 3310a of the first plate 3310 may be spaced apart from the lower surface of the first lens unit 3100 by the first gap gap1.

The region in which the lower surface of the third plate 3330 of the liquid lens 3300 is in surface contact with the holder 3500 and the lower surface 3310b of the first plate 3310 may be disposed higher than the upper surface 3400a of the second lens unit 3400. The region in which the lower surface of the third plate 3330 of the liquid lens 3300 is in surface contact with the holder 3500 or the lower surface 3310b of the first plate 3310 may be spaced apart from the upper surface of the second lens unit 3400 by the second gap gap2.

In FIGS. 33 and 34, the first and second connection electrodes 3356 and 3346 may be connected to first and second contact electrodes 3357 and 3347, and the first and second contact electrodes 3357 and 3347 may be connected to the connection board 3380. Alternatively, the first and second connection electrodes 3356 and 3346 may be directly connected to the connection board 3380.

The space between the holder 3500 and the cover 3600 may be filled with a second holder 3550. The holder 3500 and the second holder 3550 may be made of the same material, and may be integrally formed.

The first lens unit 3100 may include two lenses 3110 and 3120. The holder 3500 may have a stair structure at the inner wall of the first region region1, in which the first lens unit 3100 is received. The edges of the lenses 3110 and 3120 may be fixed in the state of being in surface contact with the stair structure.

The second lens unit 3400 may include three lenses 3410, 3420, and 3430. The holder 3500 may have a stair structure at the inner wall of the third region region3, in which the second lens unit 3400 is received. The edges of the lenses 3410, 3420, and 3430 may be fixed in the state of being in surface contact with the stair structure.

In the camera module including the liquid lens according to the embodiment, the conductive liquid and the nonconductive liquid may be received in the cavity, and the conductive liquid and the nonconductive liquid may not be mixed with each other so as to form the interface therebetween. The interface between the conductive liquid and the nonconductive liquid may be changed by the driving voltage applied to the first and second electrodes 3355 and 3345 from the outside, whereby the curvature and the focal distance of the liquid lens 3300 may be changed.

As the curvature of the interface is controlled, the liquid lens 3300 and the lens assembly 3000 and the imaging device including the same may perform an optical zooming function, an auto focusing (AF) function, and a handshake compensation or optical image stabilization (OIS) function. In this case, the size of the camera module may be reduced. In addition, AF or OIS may be performed using electricity, whereby power consumption may be lower than in the case in which the lenses are mechanically moved.

The liquid lens is inserted into the holder. The upper and lower surfaces of the liquid lens are in surface contact with the holder. The liquid lens is spaced apart from the first and second lens by the first and second gaps gap1 and gap2, respectively. Consequently, it is possible to easily align the optical axes of the lenses in the camera module and to easily prevent tilting of the lenses.

In the case in which the camera module is manufactured, the holder may be configured such that the upper and lower portions of the holder are open and such that the first hole and the second hole opposite to the first hole are formed in the side surface of the holder, the first lens unit may be coupled to the upper portion of the holder, the second lens unit may be coupled to the lower portion of the holder, and the liquid lens may be inserted through the first hole and/or the second hole. At this time, the liquid lens may protrude further outward than the side surface of the holder.

When the position of the liquid lens is adjusted in the state in which the side surface of the liquid lens, which protrudes further outward than the side surface of the holder, is supported, the position of the liquid lens may be adjusted to align the center of the liquid lens (e.g. the optical axis of the liquid lens or the center of the region in which the liquids are disposed) with the center of the first lens unit or the second lens unit (e.g. the center or the optical axis of the lens).

The position of the liquid lens may be moved in the plane perpendicular to the optical axis such that the center of the liquid lens is aligned with the optical axis while the portions of the liquid lens protruding outward through the first and second holes formed in the side surface of the holder are held. Alternatively, the liquid lens may be rotated in the plane perpendicular to the optical axis. Whether the optical axis of the liquid lens is tilted may be checked, and the tilting of the optical axis of the liquid lens may be adjusted such that the optical axis of the liquid lens is aligned with the optical axis of the lens assembly.

The liquid lens may be coupled to the holder using an adhesive such as epoxy. For example, the second plate and the third plate of the liquid lens may be bonded to the holder using epoxy. When the camera module is manufactured, at least some of the above steps may be combined, or the sequence of the steps may be changed. For example, the liquid lens may be disposed in the holder first, and then the first lens unit or the second lens unit may be disposed in the holder.

When tilting or other problems are observed after the optical performance of the first and second lens unit and the liquid lens is evaluated, the liquid lens may be replaced through one of the first hole and the second hole.

The camera module according to the embodiment may include all of the technical feature of the embodiment described with reference to FIGS. 1 to 6 (first feature), the technical feature of the embodiment described with reference to FIGS. 9 to 14 (second feature), the technical feature of the embodiment described with reference to FIGS. 15 to 30 (third feature), and the technical feature of the embodiment described with reference to FIGS. 31 to 35 (fourth feature).

For example, the camera module may include all of a feature in which the electrode layer disposed on the upper surface of the first plate is connected to the electrode layer disposed on the lower surface of the first plate via the through hole formed in the first plate (an example of the first feature), a feature in which the liquid lens is inserted through the insertion hole formed in the side surface of the holder (an example of the second feature), a structure or manufacturing method for applying voltage necessary to control the interface of the liquid lens using the upper board and the lower board, which are integrally or individually formed (an example of the third feature), and a feature in which the liquid lens is disposed so as to protrude outward from the side surface of the holder through the first hole and the second hole and the liquid lens is spaced apart from the inner surface of the holder ((an example of the fourth feature).

In a camera module according to another embodiment, one or two of the first to fourth features may be omitted as needed.

In other words, the camera module according to the embodiment may include any one of the first to fourth features, or may include a combination of at least two of the first to fourth features.

The camera module including the liquid lens may be mounted in various digital devices, such as a digital camera, a smartphone, a laptop computer, and a tablet PC. In particular, the camera module may be mounted in mobile devices to realize an ultra-thin high-performance zoom lens.

For example, a digital device or an optical device, configured such that the camera module, including the liquid lens, the first and second lens units, the filter, and the light receiving element, converts an image incident from the outside into an electrical signal, may include a display module including a plurality of pixels, the colors of which are changed by the electrical signal. The display module and the camera module may be controlled by the controller.

Although embodiments have been described with reference to a number of illustrative embodiments thereof, it should be understood that numerous other modifications and applications may be devised by those skilled in the art that will fall within the intrinsic aspects of the embodiments. More particularly, various variations and modifications are possible in concrete constituent elements of the embodiments. In addition, it is to be understood that differences relevant to the variations and modifications fall within the spirit and scope of the present disclosure defined in the appended claims.

INDUSTRIAL APPLICABILITY

Embodiments relate to a lens, which is applicable to a camera module including a liquid lens and an optical device including the same.

The invention claimed is:
1. A camera module comprising:
a holder having a hole;
a first lens unit disposed in the holder;
a second lens unit disposed in the holder;
a liquid lens disposed between the first lens unit and the second lens unit, at least a portion of the liquid lens being disposed in the hole of the holder;
a connection board disposed on the liquid lens; and
a sensor board having an image sensor;
wherein the connection board electrically connects the liquid lens and the sensor board through the hole,
wherein the liquid lens has a first plate, a first electrode disposed on the first plate, and a second electrode disposed under the first plate,
wherein the hole has a first hole and a second hole,
wherein the connection board comprises a first connection board and a second connection board, and
wherein the first connection board electrically connects the first electrode and the sensor board through the first hole, and the second connection board electrically connects the second electrode and the sensor board through the second hole.
2. A camera module comprising:
a holder having a hole;
a first lens unit disposed in the holder;
a second lens unit disposed in the holder;
a liquid lens disposed between the first lens unit and the second lens unit, at least a portion of the liquid lens being disposed in the hole of the holder;
a connection board disposed on the liquid lens; and
a sensor board having an image sensor;
wherein the connection board electrically connects the liquid lens and the sensor board through the hole,
wherein the liquid lens has a first plate, a first electrode disposed on the first plate, and a second electrode disposed under the first plate,
wherein the hole has a first hole and a second hole,
wherein the first hole is disposed corresponding to the second hole, and wherein the connection board comprises a first connection board disposed on the first electrode and a second connection board is-disposed under the second electrode.

3. A camera module comprising:
a holder having a hole;
a first lens unit disposed in the holder;
a second lens unit disposed in the holder;
a liquid lens disposed between the first lens unit and the second lens unit, at least a portion of the liquid lens being disposed in the hole of the holder;
a connection board disposed on the liquid lens;
a sensor board having an image sensor;
a base disposed between the sensor board and the holder; and
a cover covering at least a portion of the hole,
wherein the connection board electrically connects the liquid lens and the sensor board through the hole, and
wherein the liquid lens has a first plate, a first electrode disposed on the first plate, and a second electrode disposed under the first plate.

4. The camera module according to claim 1,
wherein the liquid lens is protruded outwardly through the hole.

5. The camera module according to claim 1, wherein a length of the liquid lens is greater than a length of the first lens unit and greater than a length of the second lens unit in a direction from the first hole to the second hole.

6. The camera module according to claim 1,
wherein the first plate comprises a cavity in which a first liquid and a second liquid are disposed.

7. The camera module according to claim 1, wherein the liquid lens further comprises:
a second plate disposed on the first electrode; and
a third plate disposed under the second electrode,
wherein the second plate and the third plate are bonded to the holder using epoxy.

8. The camera module according to claim 1, wherein the liquid lens is spaced apart from at least one of the first lens unit and the second lens unit.

9. The camera module according to claim 1,
wherein the connection board comprises a first portion and a second portion bended form the first portion,
wherein the second portion of the connection board is connected with the sensor board.

10. The camera module according to claim 2,
wherein at least a portion of the liquid lens protrudes outward from the holder through the first hole and the second hole, and
wherein the liquid lens is spaced apart from at least one of the first lens unit and the second lens unit.

11. The camera module according to claim 2, further comprising a cover for covering at least a portion of side surfaces of the holder and at least a portion of an upper surface of the holder,
wherein the cover covers the first hole and the second hole.

12. The camera module according to claim 2, wherein a length of the liquid lens is greater than a length of the first lens unit and greater than a length of the second lens unit in a direction from the first hole to the second hole.

13. The camera module according to claim 2, wherein the liquid lens further comprises:
a second plate disposed on the first electrode; and
a third plate disposed under the second electrode,
wherein the second plate and the third plate are bonded to the holder using epoxy, and
wherein the first plate comprises a cavity in which a first liquid and a second liquid are disposed.

14. The camera module according to claim 2, wherein the liquid lens is spaced apart from at least one of the first lens unit and the second lens unit.

15. The camera module according to claim 13,
wherein a diameter of an upper portion of the cavity is smaller than a diameter of a lower portion of the cavity, and
wherein the first liquid is a conductive liquid and the second liquid is a nonconductive liquid.

16. The camera module according to claim 13,
wherein the first liquid directly contacts one of the first electrode and the second electrode.

17. The camera module according to claim 13,
wherein a thickness of a center of the liquid lens is less than a size of the first hole or the second hole in an optical-axis direction of the camera module.

18. The camera module according to claim 3,
wherein the hole has a first hole and a second hole, and
wherein at least a portion of the liquid lens protrudes outward from the holder through the first hole and the second hole.

19. The camera module according to claim 3,
wherein the hole has a first hole and a second hole,
wherein the holder comprises a first side wall and a second side wall corresponding to the first side wall, and
wherein the first side wall comprises the first hole and the second side wall comprises the second hole corresponding to the first hole.

* * * * *